(12) United States Patent
Okumoto et al.

(10) Patent No.: US 8,510,019 B2
(45) Date of Patent: Aug. 13, 2013

(54) CONTROL DEVICE OF AUTOMATIC ENGINE STOP AND START

(75) Inventors: Kazushige Okumoto, Kariya (JP); Tatsuya Fujita, Obu (JP); Hideya Notani, Kariya (JP)

(73) Assignee: Denso Corporation, Kariya (JP)

( * ) Notice: Subject to any disclaimer, the term of this patent is extended or adjusted under 35 U.S.C. 154(b) by 322 days.

(21) Appl. No.: 13/005,956

(22) Filed: Jan. 13, 2011

(65) Prior Publication Data

US 2011/0178695 A1 Jul. 21, 2011

(30) Foreign Application Priority Data

Jan. 20, 2010 (JP) .................................. 2010-009678
Jan. 20, 2010 (JP) .................................. 2010-009679
Nov. 29, 2010 (JP) .................................. 2010-265587

(51) Int. Cl.
*F02D 41/30* (2006.01)
*F02D 45/00* (2006.01)

(52) U.S. Cl.
USPC .................... 701/103; 701/112; 123/179.4

(58) Field of Classification Search
USPC ...... 701/102, 103, 110, 112–114; 123/179.1,
123/179.3, 179.4, 179.25, 198 D, 198 DB;
73/114.59, 114.61; 290/30 R, 31, 36 A, 36 R,
290/38 B, 38 R, 48; 322/37
See application file for complete search history.

(56) References Cited

U.S. PATENT DOCUMENTS

| | | | |
|---|---|---|---|
| 6,807,934 B2 * | 10/2004 | Kataoka et al. ............ | 123/179.4 |
| 7,051,693 B2 * | 5/2006 | Tetsuno et al. ............. | 123/179.5 |
| 8,311,725 B2 * | 11/2012 | Yamaguchi ................... | 701/112 |
| 2002/0017260 A1 | 2/2002 | Saito et al. | |
| 2004/0036296 A1 * | 2/2004 | Blackburn et al. .............. | 290/48 |
| 2004/0262411 A1 * | 12/2004 | Tsukamoto et al. ...... | 236/101 C |
| 2008/0127927 A1 | 6/2008 | Hirning et al. | |
| 2009/0020100 A1 * | 1/2009 | Sakaigaki et al. ............. | 123/350 |
| 2009/0241883 A1 * | 10/2009 | Nagoshi et al. ............ | 123/179.4 |

(Continued)

FOREIGN PATENT DOCUMENTS

| JP | A-2002-70699 | 3/2002 |
|---|---|---|
| JP | B2 4211208 | 3/2002 |

(Continued)

OTHER PUBLICATIONS

May 28, 2013 Official Communication issued in Application No. 2010-009679 (with English Translation).

*Primary Examiner* — John Kwon
*Assistant Examiner* — Johnny Hoang
(74) *Attorney, Agent, or Firm* — Oliff & Berridge, PLC

(57) ABSTRACT

In a control device, an engine self-restart means tries the engine restart when an engine restart request is issued while the engine rotation speed is within a first rotation speed range. A pre-gear synchronizing control means executes gear rotation speed synchronization between pinion and ring gears, and then retries the engine restart when the engine restart request is issued while the engine rotation-speed is within a second rotation speed range. A pre-gear meshing control means executes gear-meshing between the pinion and ring gears and then retries the engine restart when the engine restart request is issued while the engine rotation speed is within a third rotation speed range. On detecting the engine-restart failure of the engine self-restart control, the control device prohibits the execution of pre-gear synchronizing control until a predetermined time counted form the failure detection time is elapsed, and executes the pre-gear meshing control after the predetermined time period is elapsed.

17 Claims, 17 Drawing Sheets

(56) References Cited

U.S. PATENT DOCUMENTS

| | | | |
|---|---|---|---|
| 2010/0094526 A1* | 4/2010 | Ando et al. | 701/103 |
| 2011/0004396 A1* | 1/2011 | Yamaguchi | 701/113 |
| 2011/0239974 A1* | 10/2011 | Shoda et al. | 123/179.4 |
| 2011/0270512 A1* | 11/2011 | Hayashi et al. | 701/112 |

FOREIGN PATENT DOCUMENTS

| | | |
|---|---|---|
| JP | A 2002-122059 | 4/2002 |
| JP | A 2005-330813 | 12/2005 |
| JP | A-2007-16618 | 1/2007 |
| JP | A-2008-510099 | 4/2008 |
| JP | A-2009-2999598 | 12/2009 |

* cited by examiner

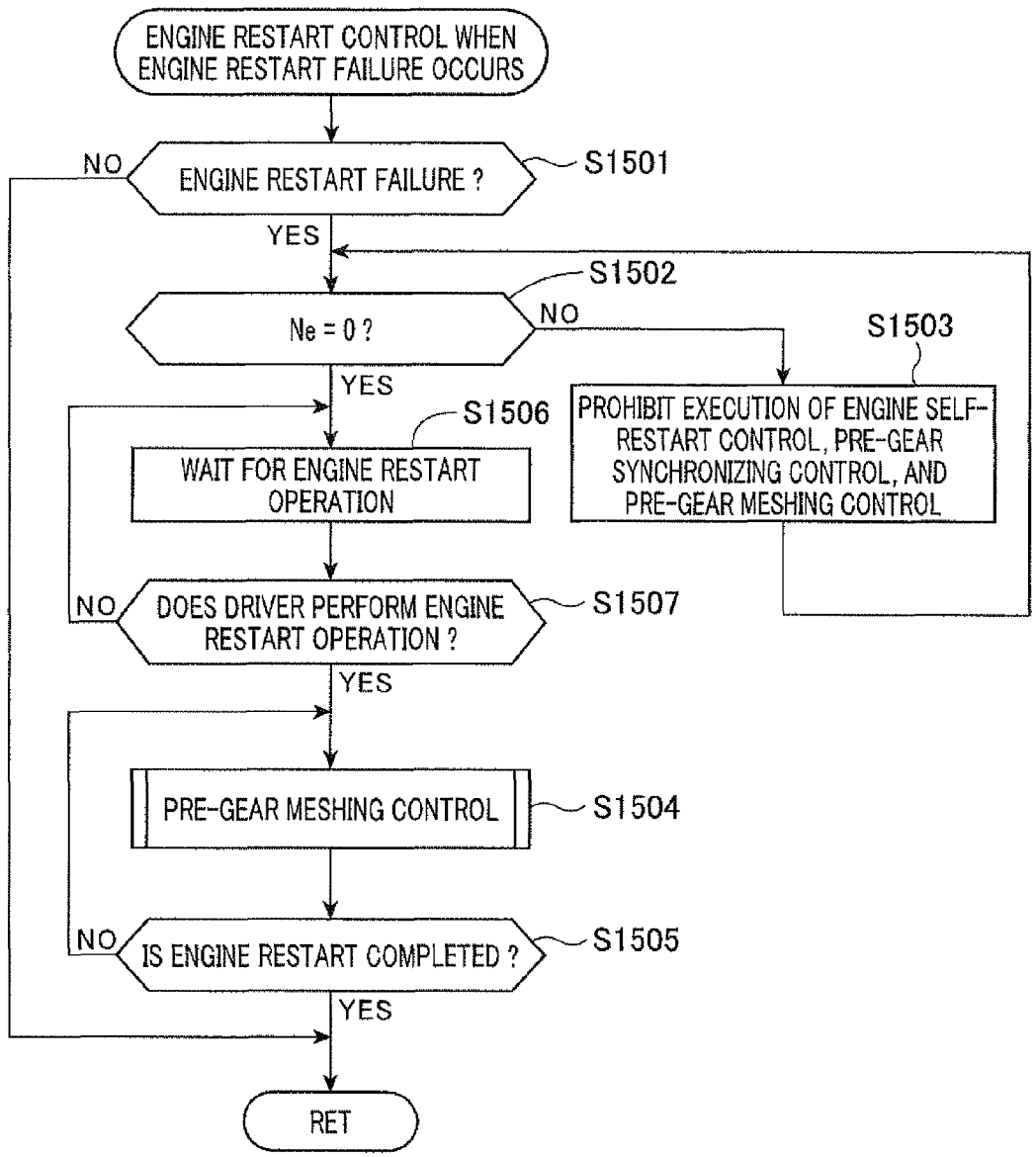

CONTROL DEVICE OF AUTOMATIC ENGINE STOP AND START

CROSS-REFERENCE TO RELATED APPLICATION

This application is related to and claims priority from Japanese Patent Applications No. 2010-009678 filed on Jan. 20, 2010, No. 2010-009679 filed on Jan. 20, 2010, and No. 2010-265587 filed on Nov. 29, 2010, the contents of which are hereby incorporated by reference.

BACKGROUND OF THE INVENTION

1. Field of the Invention

The present invention relates to control devices for controlling automatic engine stop and start. The control device is capable of automatically stopping the internal combustion engine of a vehicle on receiving an automatic engine stop request, and automatically restarting the internal combustion engine on receiving an engine restart request.

2. Description of the Related Art

There is a recent trend for vehicles to be equipped with an automatic engine control system capable of automatically stopping and starting the internal combustion engine of a vehicle in order to improve fuel consumption and reduce exhaust gas emission. Such an automatic engine control system is called the "engine idle stop control system". The engine idle stop control system can automatically stop the engine when the driver intends to stop the vehicle, and automatically restart the engine when the driver of the vehicle performs various operation units in order to restart the engine, for example, the driver of the vehicle depresses the clutch pedal, releases the brake pedal, and operates the shift lever of the vehicle.

In general, the engine starter mounted to the internal combustion engine of a vehicle is comprised of an electric motor for pushing the pinion gear to a ring gear which is fixed to the internal combustion engine in order to engage the pinion gear with the ring gear. This makes it possible for the pinion gear to be cranked with the ring gear fixed to the rotary shaft of the internal combustion engine. However, when the rotation speed of the pinion gear is different from the rotation speed of the ring gear, that is, when there is no synchronization of rotation speed between these gears, there is a possibility of generating large gear meshing noise and damage between these gears because the pinion gear cannot be smoothly meshed with the ring gear due to such a large difference of rotation speed between these gears.

Conventional patent documents, for example, Japanese patent laid open publication No. JP 2002-122059 has disclosed a conventional technique which restarts the internal combustion engine of a vehicle by the following steps (a1) and (a2) when an engine restart request is generated while the rotation speed of the internal combustion engine is dropping due to the automatic engine stop, in particular, immediately when the internal combustion engine is automatically stopped caused by the generation of an automatic engine stop request:

(a1) The pinion gear is meshed with the ring gear which is fixed to the crank shaft of the internal combustion engine after the rotation speed of the internal combustion engine (or the rotation speed of the ring gear) is almost zero before completely stops; and (a2) After the step (a1), the starter motor rotates the pinion gear in order to start the cranking.

The above engine restart control will be referred to as "pre-gear meshing control".

However, because the pre-gear meshing control starts the cranking after the rotation speed of the internal combustion engine is almost stopped when the engine restart request is issued while the rotation speed of the internal combustion engine is dropping due to the automatic engine stop, a delay time period counted from the time when such the engine restart request is issued to the time when the internal combustion engine is actually restarted. This delay time period gives uncomfortable drive to the driver of the vehicle.

In order to solve the above conventional drawback, there are other conventional techniques disclosed in Japanese patent laid open publications No. JP 2005-330813 and JP 2002-70699, which restart the internal combustion engine of a vehicle by the following steps (b1) and (b2) when the engine restart request is issued while the rotation speed of the internal combustion engine is dropping due to the automatic engine stop by the automatic engine stop request:

(b1) The pinion gear is meshed with the ring gear which is fixed to the crank shaft of the internal combustion engine after the rotation speed of the pinion gear is synchronized with the rotation speed of the ring gear so as to decrease a difference in rotation speed between these gears; and (b2) After the step (b1), the starter motor drives the pinion gear to start to rotate in order to perform the cranking.

The above engine restart control will be referred to as "pre-gear synchronizing control".

When the rotation speed of the internal combustion engine is relatively high when the engine restart request is issued while the rotation speed of the internal combustion engine is dropping due to the automatic engine stop, it is possible for the control device to restart the internal combustion engine without performing the cranking by the starter. The above engine restart control will be referred to as the "engine self-restart control".

When the engine restart request is issued while the rotation speed of the internal combustion engine is dropping due to the automatic engine stop, the conventional technique disclosed in JP 2002-70699 executes:

(X1) the engine self-restart control when the rotation speed of the internal combustion engine has a value within a first rotation speed range which is higher than a first rotation speed;

(X2) the pre-gear synchronizing control when the rotation speed of the internal combustion engine is not more than the first rotation speed and within a second rotation speed range which is higher than a second rotation speed; and (X3) the pre-gear-meshing control when the rotation speed of the internal combustion engine is within a third rotation speed range which is not more than the second rotation speed.

However, there is a possibility for the control device to cause a failure of the engine restart even if performing the engine self-restart control. For example, there is a high possibility for the control device to cause a failure of the engine restart when the dropping rate of the rotation speed of the internal combustion engine is high. In the conventional control method disclosed in JP 2002-70699, the pre-gear synchronizing control is executed when the rotation speed of the internal combustion engine is decreased within the second rotation speed range after the engine self-restart control causes a failure of the engine restart.

However, as shown in FIG. 6, the rotation speed of the internal combustion engine oscillates forwardly and backwardly after the automatic engine stop. That is, the rotation speed of the internal combustion engine is greatly decreased at the time of the engine compression stroke, and the rotation speed of the internal combustion engine is slightly increased during a period other than the engine compression stroke.

Accordingly, there is a possibility that the rotation speed of the internal combustion engine becomes a value which is higher than the second rotation speed range when the control device performs the pre-gear synchronizing control at the time t20 when the rotation speed of the internal combustion engine is decreased within the second rotation speed range after the time t10 when the control device fails in engine self-restart control.

In this case, because the pinion gear is pushed to the ring gear side while the rotation speed of the ring gear is greatly larger than that of the pinion gear (that is, under the condition where the rotation speed of the ring gear is not synchronized with that of the pinion gear), it becomes difficult to smoothly perform the gear meshing operation between the pinion gear and the ring gear. This generates large gear meshing noise and abrasion of the ring gear and the pinion gear, and causes large impact to the starter.

When the control device fails in performing one of the engine self-restart control, the pre-gear synchronizing control, and the pre-gear meshing control, there is a possibility that the rotation speed of the internal combustion engine becomes a value within the rotation speed range which corresponds to the above control which causes the engine restart failure. In this case, the control device executes the same control again, and this has a high probability of causing the same engine restart failure.

By the way, there is a possibility of causing the engine restart failure due to an engine trouble such as a difficulty of performing the desired engine combustion even if the control device executes the engine self-restart control. Further, there is a possibility of causing the gear meshing failure by pushing the pinion gear to the ring gear when no gear synchronization of rotation speed between the pinion gear and the ring gear is obtained even if the control device executes the pre-gear synchronizing control.

Further, there is a possibility of causing the engine restart failure on the basis of the gear meshing failure due to aging deterioration of the pinion gear or the ring gear.

Still further, there is a possibility of causing the gear meshing failure due to aging deterioration even if the control device executes the pre-gear meshing control.

For example, the conventional technique disclosed in JP 2002-70699 executes the pre-gear synchronizing control when the rotation speed of the internal combustion engine is decreased within the second rotation speed range due to the engine restart failure caused by the engine self-restart control. However, it is generally difficult to estimate the motion of the rotation speed of the internal combustion engine immediately after the engine restart failure occurs. Further, because the starter motor rotates by momentum, it is difficult for the control device to detect the rotation speed of the starter motor with high accuracy. Accordingly, while the rotation speed of the internal combustion engine is dropping due to the failure of the engine restart control, it is extremely difficult for the control device to detect the gear synchronizing time and execute the pre-gear synchronizing control drive at the gear synchronizing time in order to drive the electromagnetic actuator to mesh the pinion gear with the ring gear. This causes damage to and causes deterioration of the ring gear and the pinion gear because the control device and the electromagnetic actuator cannot smoothly mesh the pinion gear with the ring gear.

Still further, in the case where the control device executes the pre-gear meshing control when the rotation speed of the internal combustion engine is decreased within the third rotation speed range after the engine restart failure caused by the pre-gear synchronizing control, there is a possibility for the control device to drive the electromagnetic actuator to push the pinion gear to the ring gear when the rotation speed of the internal combustion engine is within the second rotation speed range because it is difficult to estimating the rotation speed of the internal combustion engine immediately after the engine restart failure. This also causes damage to and causes deterioration of the ring gear and the pinion gear because the control device and the electromagnetic actuator cannot smoothly mesh the pinion gear with the ring gear.

Still further, in the case where the control device executes the engine self-restart control again when the rotation speed of the internal combustion engine is within the first rotation speed range after the engine restart failure caused by the engine self-restart control, there is a possibility for the control device to executes the engine self-restart control when the rotation speed of the internal combustion engine is within the second rotation speed range because it is difficult to estimate the rotation speed of the internal combustion engine immediately after the engine restart failure. This would cause the engine restart failure again.

SUMMARY OF THE INVENTION

It is an object of the present invention to provide a control device for controlling automatic engine stop and start capable of smoothly meshing a pinion gear with a ring gear which is fixed to the crank shaft of an internal combustion engine even if an engine restart failure occurs when an engine restart request is generated while the rotation speed of the internal combustion engine is dropping due to the automatic engine stop.

It is other object of the present invention to provide a control device for controlling automatic engine stop and start capable of avoiding the same engine restart failure from occurring when the engine restart failure caused by one of the engine self-restart control, the pre-gear synchronizing control, and the pre-gear meshing control occurs.

It is other object of the present invention to provide a control device for controlling automatic engine stop and start capable of smoothly performing the engine restart after an engine restart failure occurs.

In accordance with a first aspect of the present invention, there is provided a control device for controlling automatic engine stop and start. The control device is comprised of a starter, a detection means, and at least two control means selected from an engine self-restart control means, a pre-gear synchronizing control means, and a pre-gear meshing control means. The starter is comprised of a starter motor for rotating a pinion gear and an actuator such as an electromagnetic actuator capable of pushing the pinion gear to a ring gear in order to mesh the pinion gear with the ring gear. The ring gear is fixed to the crank shaft of an internal combustion engine. The starter independently drives the starter motor and the actuator, respectively. The control device stops the internal combustion engine when an automatic engine stop request is issued, and restarts the internal combustion engine when an engine restart request is issued.

In particular, the engine self-restart control means executes an engine self-restart control of restarting the internal combustion engine by restarting a fuel injection without performing a cranking by the starter when the engine restart request is issued while a current rotation speed of the internal combustion engine is within a first rotation speed range which is higher than a first rotation speed and the rotation speed of the internal combustion engine is dropping due to the automatic engine stop. The pre-gear synchronizing control means executes a pre-gear synchronizing control of restarting the internal combustion engine by performing the cranking by the starter after driving the starter motor to synchronize a rotation speed of the pinion gear with a rotation speed of the ring gear, and then driving the actuator to mesh the pinion gear with the ring gear when the engine restart request is issued while the current rotation speed of the internal combustion engine is within a second rotation speed range which is not more than the first rotation speed and higher than a second rotation speed and while the rotation speed of the internal combustion engine is dropping due to the automatic engine stop. The pre-gear meshing control means executes a pre-gear meshing control of restarting the internal combustion engine by performing the cranking of the starter in which the pre-gear meshing control means drives the starter motor to rotate the pinion gear after or during a gear engagement between the pinion gear and the ring gear when the engine restart request is issued while the current rotation speed of the internal combustion engine is within a third rotation speed range which is not more than the second rotation speed and while the rotation speed of the internal combustion engine is dropping due to the automatic engine stop.

The detection means detects an engine restart failure caused by the engine restart control performed by one control means in the engine self-restart control means, the pre-gear synchronizing control means, and the pre-gear meshing control means. When the detection means detects the engine restart failure, the control device drives the control means which causes the engine restart failure to prohibit or halt the execution of its engine restart control until the predetermined time period is elapsed, which is counted from the detection time of the engine restart failure.

For example, when the engine restart failure occurs while the engine self-restart control is executed, the control device drives the engine self-restart control means to prohibit the execution of the engine restart control under the engine self-restart control until the predetermined time period is elapsed, which is counted from the failure detection time.

Further, when the engine restart failure occurs while the pre-gear synchronizing control is executed, the control device drives the pre-gear synchronizing control means to prohibit the execution of the engine restart control under the pre-gear synchronizing control until the predetermined time period is elapsed, which is counted from the failure detection time.

Still further, when the engine restart failure occurs while the pre-gear meshing control is executed, the control device drives the pre-gear meshing control means to prohibit the execution of the engine restart control under the pre-gear meshing control until the predetermined time period is elapsed, which is counted from the failure detection time. It is therefore possible to avoid the engine restart failure from repeatedly occurring.

In accordance with a second aspect of the present invention, there is provided a control device for controlling automatic engine stop and start. The control means has the starter, the detection means, and at least two control means selected from the engine self-restart control means, the pre-gear synchronizing control means, and the pre-gear meshing control means. In particular, when the detection means detects the engine restart failure, the control device according to the second aspect of the present invention instructs the control means which causes the engine restart failure to prohibit or halt the execution of its engine restart control until the rotation speed of the internal combustion engine is decreased to less than a predetermined threshold value.

For example, when the engine restart failure occurs while the execution of the engine self-restart control is executed, the control device instructs the engine self-restart control means to prohibit the execution of the engine restart under the engine self-restart control until the rotation speed of the internal combustion engine is decreased to less than the predetermined threshold value.

Further, when the engine restart failure occurs while the pre-gear synchronizing control is executed, the control device instructs the pre-gear synchronizing control means to prohibit the execution of the engine restart under the pre-gear synchronizing control until the rotation speed of the internal combustion engine is decreased to less than a predetermined threshold value.

Still further, when the engine restart failure occurs while the pre-gear meshing control is executed, the control device instructs the pre-gear meshing control means to prohibit the execution of the engine restart under the pre-gear meshing control until the rotation speed of the internal combustion engine is decreased to less than a predetermined threshold value. It is therefore possible to avoid the engine restart failure from repeatedly occurring.

In accordance with a third aspect of the present invention, there is provided a control device for controlling automatic engine stop and start. The control device is comprised of a starter, and a detection means. The starter is comprised of a starter motor for rotating a pinion gear and an actuator such as an electromagnetic actuator capable of pushing the pinion gear to a ring gear in order to mesh the pinion gear with the ring gear which is fixed to the crank shaft of an internal combustion engine. The starter independently drives the starter motor and the actuator, respectively. The control device is capable of stopping the internal combustion engine when an automatic engine stop request is issued, and restarting the internal combustion engine when an engine restart request is issued. The detection means detects an engine restart failure. In particular, when the detection means detects the engine restart failure, the control device prohibits or halts the execution of the engine restart control of the internal combustion engine while a time period counted from the engine restart failure detection time detected by the detection means to the time when the rotation speed of the internal combustion engine reaches zero.

The control device according to the third aspect of the present invention prohibits the execution of the engine restart control while the rotation speed of the internal combustion engine is dropping due to the automatic engine stop. During this state, it is generally difficult for the control device to detect the current rotation speed of the internal combustion engine and the rotation speed of the starter motor with high accuracy immediately after the engine restart failure occurs. This engine restart control of the control device according to the third aspect of the present invention makes it possible to smoothly perform the gear engagement between the pinion gear and the ring gear (that is, to smoothly mesh the pinion gear with the ring gear) when the engine restart is executed again after the engine restart failure occurs. Thus, the control device according to the third aspect of the present invention avoids the difficulty of performing the gear engagement, and avoids abrasion of the pinion gear and the ring gear from occurring, and avoid the pinion gear and the ring gear from being damaged.

The control device according to the third aspect of the present invention is applied to a first case in which the engine restart request is issued while the rotation speed of the internal combustion engine is dropping due to the automatic engine stop, and further applied to a second case in which the engine restart request is issued when the rotation speed of the internal combustion engine is completely stopped. In the second case, the control device prohibits the execution of the engine restart control during a time period counted from the first time to the second time, where the rotation speed of the internal combustion engine is slightly increased at the first time by the engine restart control which drops in failure, and the rotation speed of the internal combustion engine is decreased to zero at the second time.

By the way, the control device according to the third aspect of the present invention executes the engine self-restart control, the pre-gear synchronizing control, and the pre-gear meshing control only when the engine restart request is issued while the rotation speed of the internal combustion engine is dropping due to the automatic engine stop.

On the other hand, when the engine restart request is issued while the internal combustion engine does not rotate (while the internal combustion engine completely stops), the control device drives the actuator to push the pinion gear to the ring gear and to mesh these gears together, and finally drives the starter motor to rotate the pinion gear in order to restart the internal combustion engine, as in the case for the pre-gear meshing control. This control will be referred to as the "usual control".

In addition, the "pre-set control" is known, in which the control device drives the actuator to push the pinion gear to the ring gear in order to mesh these gears together when the rotation speed of the internal combustion engine is decreased to a predetermined rotation speed immediately before the internal combustion engine completely stops (that is, immediately before the engine rotation speed becomes zero) while the rotation speed of the internal combustion engine is dropping due to the automatic engine stop. The control device only drives the starter motor to rotate the pinion gear in order to restart the internal combustion engine when the engine restart request is issued after the execution of the pre-set control. This makes it possible to reduce the time period which is necessary to restart the internal combustion engine because it can eliminate the time period to push the pinion gear to the ring gear which is necessary for the usual control to perform the gear meshing.

However, the above usual control executed by the control device sometimes causes the engine restart failure due to aged deterioration of the pinion gear and the ring gear and a gear-meshing failure. Still further, the execution of the pre-set control sometimes causes the gear meshing failure due to aged deterioration of the pinion gear and the ring gear. In general, because it is difficult to detect the rotation speed of the internal combustion engine or the rotation speed of the starter motor immediately after the gear meshing failure, it is difficult to smoothly mesh the pinion gear with the ring gear by the usual control or the pre-set control immediately after the gear meshing failure. This often causes significant abrasion and damage to the ring gear or the pinion gear.

In order to solve the above problem, a fourth aspect of the present invention provides a control device for controlling automatic engine stop and start. The control device according to the fourth aspect of the present invention is comprised of a starter, a pre-set control means, and the detection means. The starter is comprised of the starter motor and the actuator such as an electromagnetic actuator. The pre-set control means executes a pre-set control which drives the actuator to mesh the pinion gear with the ring gear when the rotation speed of the internal combustion engine is decreased to a predetermined value which is close to zero before the engine restart request is issued while the rotation speed of the internal combustion engine is dropping due to the automatic engine stop. The detection means detects a failure of the gear engagement between the pinion gear and the ring gear by the pre-set control. When the detection means detects the engine restart failure, the control means instructs the pre-set control means to prohibit or halt the pre-set control during a time period counted form the detection time engine restart failure to the time when the rotation speed of the internal combustion engine reaches zero.

Because the control device according to the fourth aspect of the present invention drives the pre-set control means to prohibit the execution of the pre-set control immediately after the gear meshing failure occurs under the pre-set control while the rotation speed of the internal combustion engine is dropping due to the automatic engine stop, during which it is difficult for the control device to detect the engine rotation speed and the rotation speed of the starter motor with high accuracy. It is thereby possible for the control device according to the fourth aspect of the present invention to avoid the pinion gear and the ring gear from being worn and damaged by the gear meshing failure between the pinion gear and the ring gear caused when the pre-set control is executed again after the occurrence of the gear meshing failure caused by the pre-set control.

BRIEF DESCRIPTION OF THE DRAWINGS

A preferred, non-limiting embodiment of the present invention will be described by way of example with reference to the accompanying drawings, in which:

FIG. 17 is a flow chart showing an engine restart control routine executed by the control device according to a sixth embodiment of the present invention when an engine restart control failure occurs.

DETAILED DESCRIPTION OF THE PREFERRED EMBODIMENTS

Figure 1:
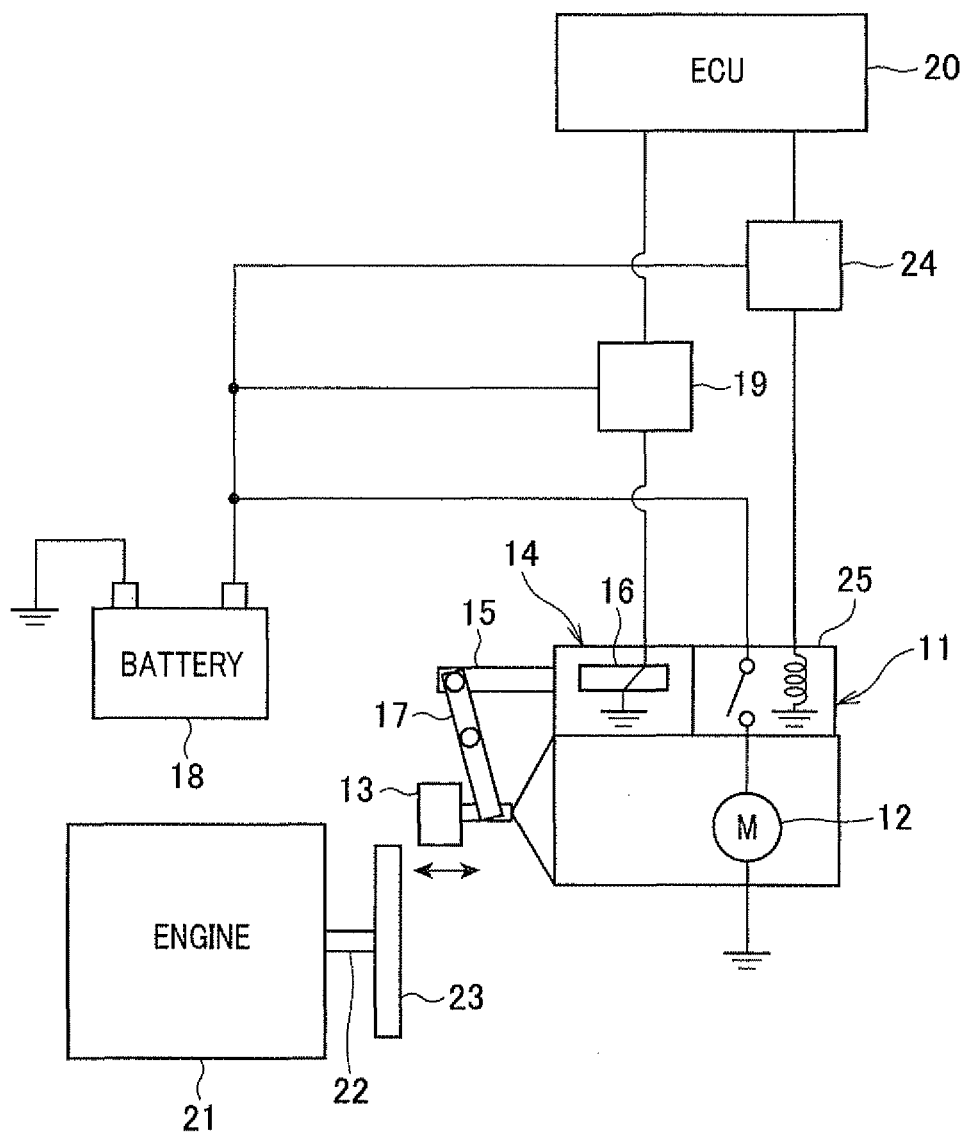
FIG. 1 is a view showing a schematic configuration of an engine start control system having a control device for executing an automatic engine stop and start routine according to first to sixth embodiments of the present invention.

Hereinafter, various embodiments of the present invention will be described with reference to the accompanying drawings. In the following description of the various embodiments, like reference characters or numerals designate like or equivalent component parts throughout the several diagrams.

First Embodiment

A description will be given of the engine control device according to a first embodiment of the present invention with reference to FIG. 1 to FIG. 7.

FIG. 1 is a view showing a schematic configuration of the engine start control system having the control device for executing the automatic engine stop and start routine according to first to sixth embodiments of the present invention.

A starter 11 has a mechanism for pushing a pinion gear 13 to a ring gear 23 in order to mesh these gears and start the cranking when the internal combustion engine 21 is started to work. The starter 11 has a mechanism for pushing the pinion gear 13 to the ring gear 23 in order to perform the gear engagement between these gears when the internal combustion engine 21 is started and restarted. The ring gear 23 is fixed to the crank shaft 22 of the internal combustion engine 21. The starter 11 is comprised of a starter motor 12, the pinion gear 13, and an electromagnetic actuator 14. The pinion gear 13 is driven by the starter motor 12. The electromagnetic actuator 14 pushes the pinion gear 13 so as to mesh the pinion gear 13 with the ring gear 23 when the starter 11 starts the internal combustion engine 21.

The pinion gear 13 is arranged to move in the axial direction of the starter 11 in parallel to the axial direction of the crank shaft 22 of the internal combustion engine 21. The electromagnetic actuator 14 is equipped with a plunger 15 and a solenoid 16. The driving force of the plunger 15 is transmitted to the pinion gear 13 through the lever 17, etc. when the starter 11 starts the internal combustion engine 21.

A relay 19 is placed between the battery 18 and the electromagnetic actuator 14. When an engine control circuit (ECU) 20 drives the relay 19 to be electrically turned on, the plunger 15 is moved in the direction so as to push the pinion gear 13 to the ring gear 23. The pinion gear 13 is thereby meshed with the ring gear 23 which is fixed to the crank shaft 22 of the internal combustion engine 21.

A mechanical relay 25 and a switching element 24 are placed between the battery 18 and the starter motor 12. When the ECU 20 drives the switching element 24 to be electrically turned on, the mechanical relay 25 is thereby turned on, and the electric power of the battery 18 is supplied to the starter motor 12. When receiving the electric power, the starter motor 12 rotates the pinion gear 13.

The ECU 20 is comprised of a microcomputer. The microcomputer has a built-in read only memory (ROM) in which various types of engine control programs are stored. The ECU 20 executes these engine control programs in order to adjust a quantity of fuel injection and an ignition period of time when the fuel is injected into cylinders of the internal combustion engine 21.

The ECU 20 executes an automatic engine stop and start control routine (not shown) in order to execute the automatic engine stop and start control (that is, the engine idle stop control).

This automatic engine stop and start control automatically stops the combustion of the internal combustion engine 21 in order to automatically stop the operation of the internal combustion engine 21 when the driver stops the vehicle or a speed reduction request is issued during the vehicle running on a road by the following driver's operations, for example:

(c1) The driver of a vehicle releases the acceleration pedal; or (c2) The driver depresses the brake pedal.

After this, the ECU 20 judges the generation of the engine restart request when the speed reduction request is released during the running of the vehicle or the driver of the vehicle performs the following operations (d1), (d2), or (d3):

(d1) The driver of the vehicle releases the brake pedal;

(d2) The driver of the vehicle operates the shift lever; or (d3) The driver of the vehicle depresses the acceleration pedal.

Figure 5:
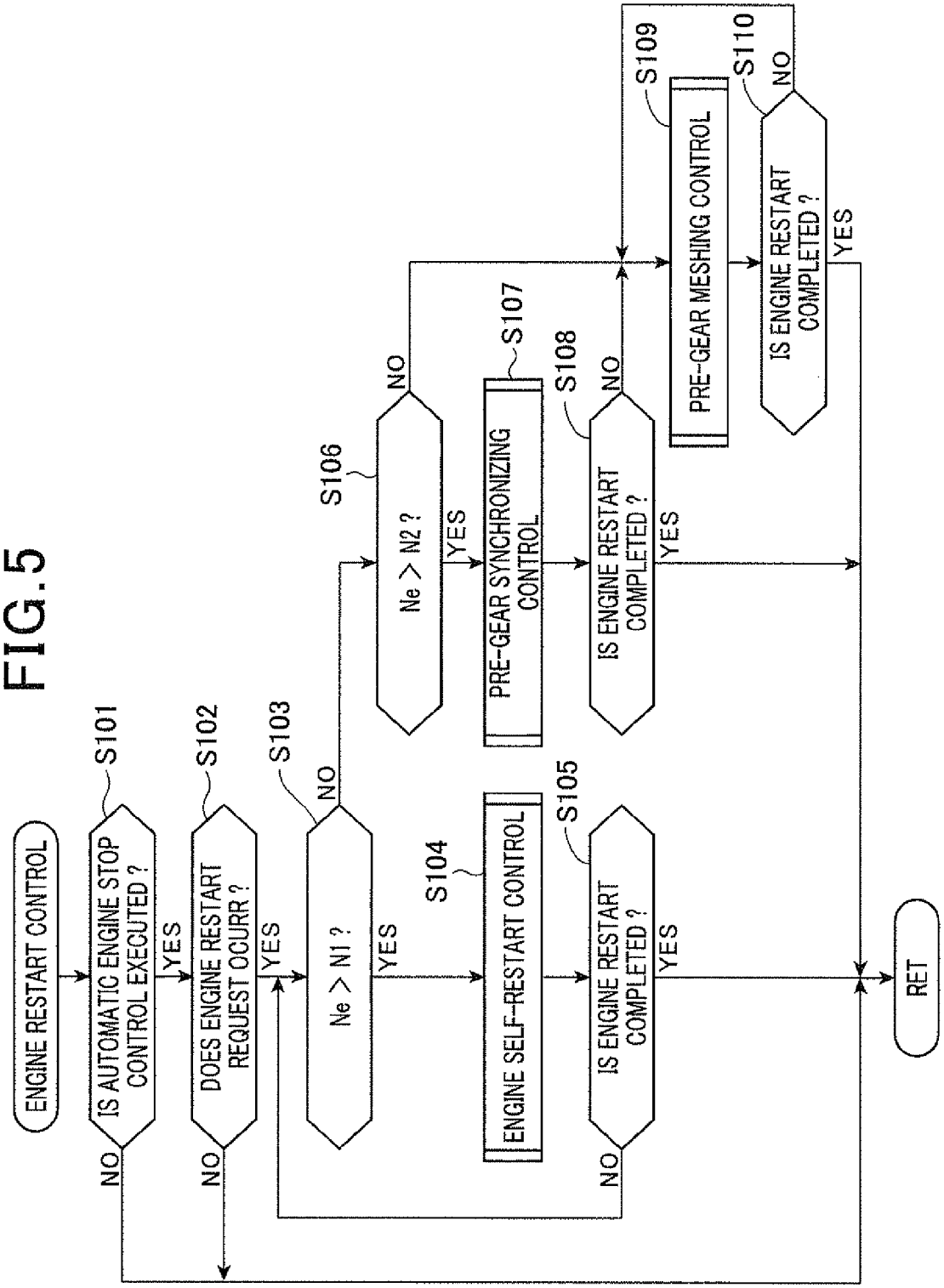
FIG. 5 is a flow chart showing an engine restart control routine executed by the control device according to the first embodiment of the present invention.

FIG. 5 is a flow chart showing the engine restart control routine executed by the ECU 20 in the control device according to the first embodiment of the present invention.

When detecting the above operations (c1), (c2), (d1), (d2), or (d3), the ECU 20 in the control device executes the engine restart control routine shown in FIG. 5 by the following procedures.

Figure 2:
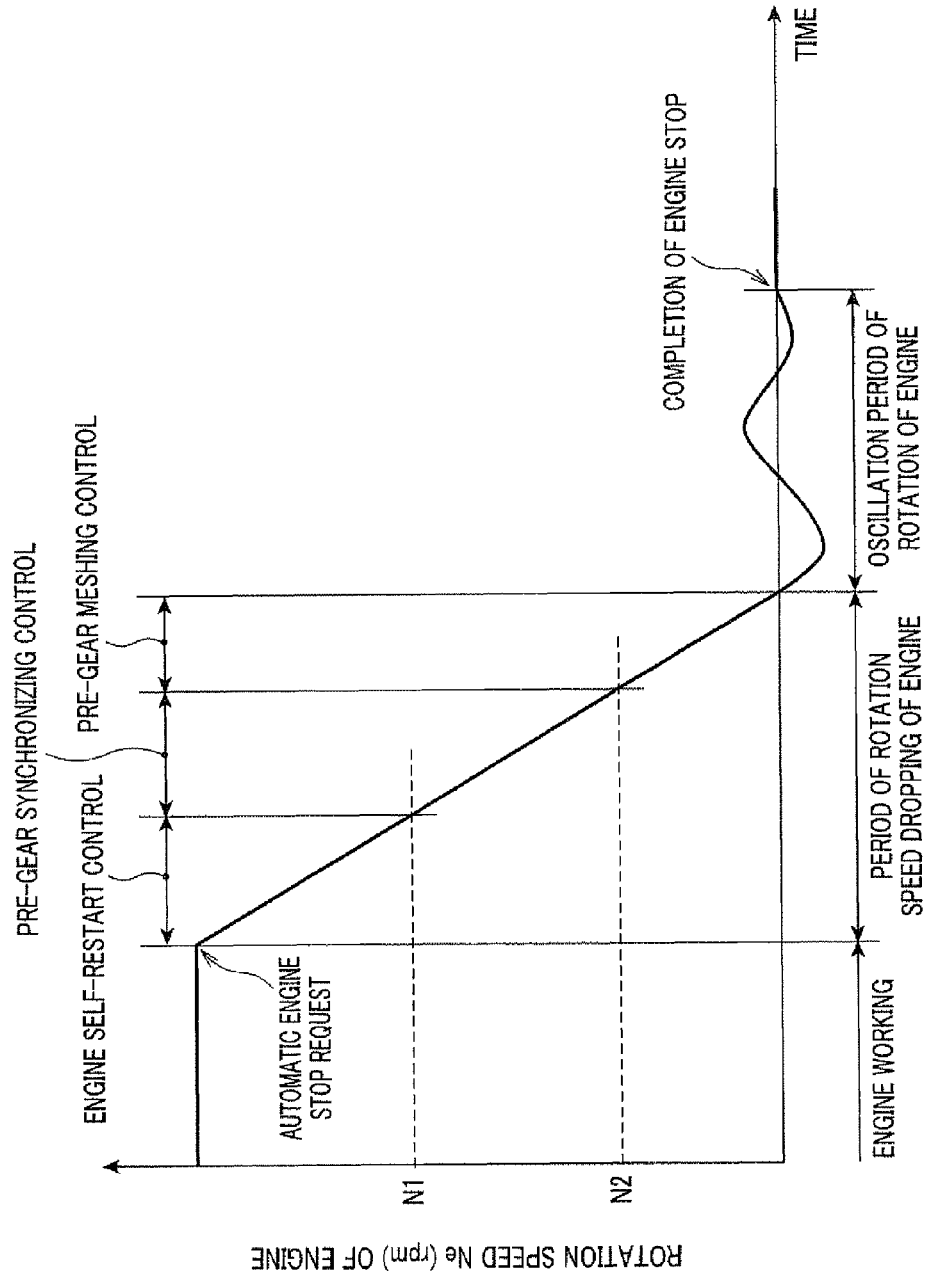
FIG. 2 is a timing chart showing an engine restart control performed by the control device in the engine start control system according to a first embodiment shown in FIG. 1.

FIG. 2 is a timing chart showing the engine restart control performed by the control device according to the first embodiment shown in FIG. 1.

As shown in FIG. 2, when the automatic engine stop request is issued, the fuel combustion is stopped in order to automatically stop the internal combustion engine 21 working.

<Engine Self-Restart Control>

While the rotation speed Ne of the internal combustion engine 21 is dropping due to the automatic engine stop of the internal combustion engine 21, when the engine restart request is issued in a first rotation speed range in which the rotation speed Ne of the internal combustion engine 21 is higher than the first rotation speed N1 (e.g. 500 rpm), the ECU 20 judges that it is possible to restart the internal combustion engine 21 without performing the cranking operation by the starter 11, and the ECU 20 executes the engine self-restart control.

That is, in the engine self-restart control, the ECU 20 in the control device drives the injectors to inject combustion fuel into the cylinders of the internal combustion engine 21 and ignite the combustion fuel in order to restart the internal combustion engine 21.

This control makes it possible to smoothly restart the combustion of the internal combustion engine 21 immediately when the engine restart request is issued. Because this control does not require any cranking of the pinion gear 13 and the ring gear 23 by the starter 11, it is possible for the starter 11 to have zero power consumption, and to avoid the engagement between the pinion gear 13 and the ring gear 23 when there is a large difference in rotation speed between the pinion gear 13 and the ring gear 23. This control thereby prevents gear meshing noise from being generated.

<Pre-Gear Synchronizing Control>

While the rotation speed of the internal combustion engine is dropping due to the automatic engine stop, when the engine restart request is issued in a second rotation speed range in which the rotation speed Ne of the internal combustion engine 21 is lower than the first rotation speed N1 and higher than the second rotation speed N2 (e.g., 250 rpm), the ECU 20 executes a pre-gear synchronizing control because the ECU 20 judges that it is difficult to smoothly mesh the pinion gear 13 with the ring gear 23 unless the rotation speed of the pinion gear 13 is synchronized with the rotation speed of the ring gear 23. In the pre-gear synchronizing control, the ECU 20 in the control device executes the following control:

(e1) The starter motor 12 increases the rotation speed of the pinion gear 13 in order to synchronize the rotation speed of the pinion gear 13 with the rotation speed of the ring gear 23; and (e2) After the step (e1), the ECU 20 drives the electromagnetic actuator 14 to start the cranking in order to mesh the pinion gear 13 with the ring gear 23. After this gear meshing control, the internal combustion engine 21 is restarted.

Figure 3:
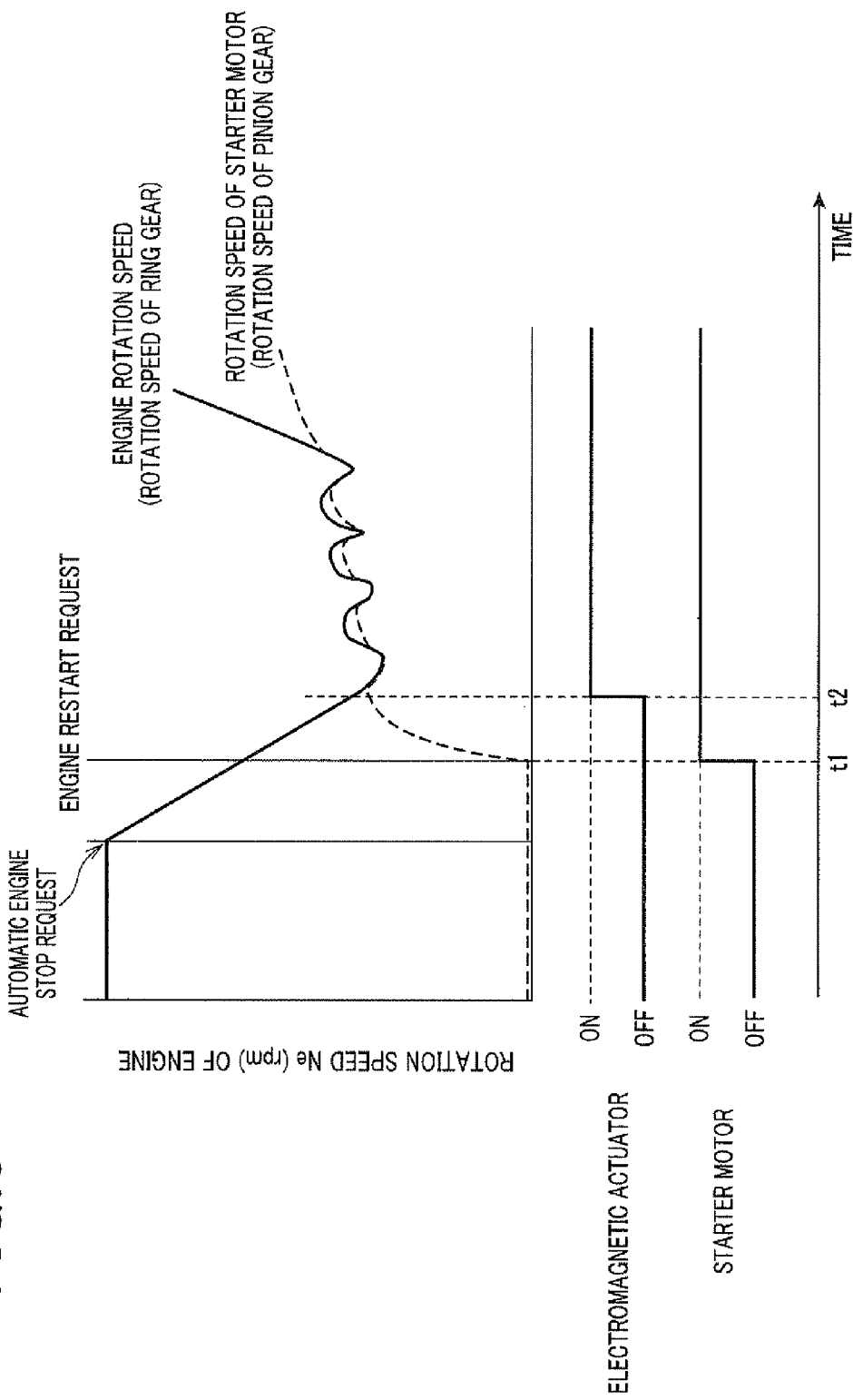
FIG. 3 is a timing chart showing a pre-gear synchronizing control executed by the control device according to the first embodiment of the present invention.

FIG. 3 is a timing chart showing the pre-gear synchronizing control executed by the control device according to the first embodiment of the present invention;

In particular, as shown in FIG. 3, the ECU 20 drives the starter motor 12 to be electrically turned on in order to rotate the pinion gear 13 at the time t1 when the engine restart request is issued in the second rotation speed range of the rotation speed Ne of the internal combustion engine 21. The ECU 20 judges that the rotation speed of the pinion gear 13 is synchronized with the rotation speed of the ring gear 23 at the time t2 when the difference in rotation speed between the ring gear 23 and the pinion gear 13 is within a range of ±200 rpm. The ECU 20 drives the electromagnetic actuator 14 to be electrically turned on and drives the starter 11 to start the cranking in which the pinion gear 13 is completely meshed with the ring gear 23 in order to restart the internal combustion engine 21. The difference in rotation speed between the ring gear 23 and the pinion gear 13 is equal in meaning to the difference of the rotation speed which is a reduced value of the crank shaft 22.

The above control makes it possible to decrease the delay counted from the time when the engine restart request is issued to the time when the internal combustion engine 21 is restarted while smoothly meshing the pinion gear 13 with the ring gear 23 and suppressing gear meshing noise from being generated.

Further, the above engine start control does not need to detect the rotation speed of the pinion gear 13 and the ring gear 23 with high accuracy when the ECU 20 judges the synchronization in rotation speed between the pinion gear 13 and the ring gear 23. It is thereby possible for the control device to be equipped with a usual rotation speed sensor without any expensive crank angle sensor and rotation speed sensor with high accuracy. This feature can reduce the manufacturing cost which is a recent important technical issue.

In the first embodiment described above in detail, the ring gear is 300 mm in diameter (outer diameter of tooth tip) and the pinion gear 13 is 30 mm in diameter (outer diameter of tooth tip). For example, when the ring gear rotates at the rotation speed of 300 rpm, and the pinion gear rotates at the rotation speed of 1000 rpm, the difference in rotation speed between the ring gear 23 and the pinion gear 13 is 200 rpm, where the difference in rotation speed is the different value which is a reduced value of the rotation speed of the crank shaft 22. Because the ring gear 23 is 300 mm in diameter and rotates at 300 rpm, the circumferential speed at the pitch circle (as a virtual circle which is contacted with the tooth of the pinion gear 13) of the ring gear 23 is approximately 4.7 m/sec.

Further, because the pinion gear 13 is 30 mm in diameter, and rotates at 1000 rpm, the circumferential speed at the pitch circle (as a virtual circle which is contacted with the tooth of the ring gear 23) of the pinion gear 13 is approximately 1.6 m/sec. The difference in circumferential speed between the pitch circle of the ring gear 23 and the pitch circle of the pinion gear 13 is approximately 3.1 m/sec. The following condition (f1) is therefore equal to the following condition (f2):

(f1) The difference in rotation speed between the ring gear 23 and the pinion gear 13 is within a range of ±200 rpm; and (f2) The difference in circumferential speed between the pitch circle of the ring gear 13 and the pitch circle of the pinion gear 13 is within a range of ±3.1 m/sec.

The inventors of the present invention did the experiment of detecting gear meshing noise when the pinion gear 13 is meshed with the ring gear 23.

The experiment detected gear meshing noise generated between the ring gear 13 of 300 mm diameter and the pinion gear 13 of 30 mm diameter by changing the difference in rotation speed between the ring gear 23 and the pinion gear 13 which are meshed together. The gear meshing noise were detected by a microphone which was separated in distance from the pinion gear 13 and the ring gear 23.

The experimental results clearly show that it is possible to adequately reduce the gear meshing noise when the pinion gear 13 is meshed with the ring gear 23 under the following conditions:

(g1) The difference in rotation speed between the ring gear 23 and the pinion gear 13 is within a range of ±250 rpm; and (g2) More preferably, the difference in rotation speed between the ring gear 23 and the pinion gear 13 is within a range of ±200 rpm (that is, the difference in circumferential speed between the pitch circle of the pinion gear 13 and the pitch circle of the ring gear 23 is within a range of ±3.1 m/sec).

The rotation power of the starter motor 12 is transmitted to the pinion gear 13 in the direction of rotation of the internal combustion engine 21. In a system in which a one-way clutch is placed between the pinion gear 13 and the starter motor 12, it is acceptable for the ECU 20 to judge that the rotation speed of the pinion gear 13 is synchronized with the rotation speed of the ring gear 23 when the rotation speed of the ring gear 23 is higher than the rotation speed of the pinion gear 13 and a difference in rotation speed between the ring gear 23 and the pinion gear 13 is not more than a predetermined value (e.g. 200 rpm) while the ECU 20 executes the pre-gear synchronizing control.

The following condition (f1) is therefore equal to the following condition (f2):

(f1) The difference in rotation speed between the ring gear 23 and the pinion gear 13 is within a range of ±200 rpm; and
(f2) The difference in circumferential speed between the pitch circle of the ring gear 13 and the pitch circle of the pinion gear 13 is within a range of ±3.1 m/sec.

In the case when the ECU 20 judges that the rotation speed of the pinion gear 13 is synchronized with the rotation speed of the ring gear 23, the pinion gear 13 is meshed with the ring gear 23 when the rotation speed of the ring gear 23 is higher than that of the pinion gear 13. It is thereby possible for the one-way clutch to race in order to release a shock applied to the starter 11 when the pinion gear 13 is meshed with the ring gear 23. After this step, the rotation speed of the internal combustion engine 21 (or the rotation speed of the ring gear 23) is decreased by friction, and the rotation speed of the starter motor 12 (or the rotation speed of the pinion gear 13) is increased. When the difference in rotation speed between the ring gear 23 and the pinion gear 13 is thereby zero, the one-way clutch is locked, and the rotation power of the starter motor 12 is transmitted to the pinion gear 13. These steps can smoothly mesh the pinion gear 13 with the ring gear 23 without generating gear meshing noise and suppressing shock to the components of the starter motor 11 from being decreased. This can improve and maintain the durability of the components such as the ring gear 23 and the pinion gear 13 of the starter 11.

<Pre-Gear Meshing Control>

While the rotation speed of the internal combustion engine is dropping due to the automatic engine stop control, when the engine restart request is issued in a third rotation speed range in which the rotation speed Ne of the internal combustion engine 21 is lower than a third rotation speed range which is lower than the second rotation speed N2, the ECU 20 executes a pre-gear meshing control because the rotation speed of the ring gear 23 is low, and the ECU 20 judges that it is possible to smoothly mesh the pinion gear 13 with the ring gear 23 without performing any synchronization between the pinion gear 13 and the ring gear 23.

In the pre-gear meshing control, the ECU 20 in the control device executes the following control. After the ECU 20 drives the electromagnetic actuator 14 to mesh the pinion gear 13 with the ring gear 23 or during the gear meshing operation of the pinion gear 13 and the ring gear 23 by the electromagnetic actuator 14, the ECU 20 drives the starter motor 12 to rotate the pinion gear 13 in order to restart the internal combustion engine 21 by performing the cranking.

Figure 4:
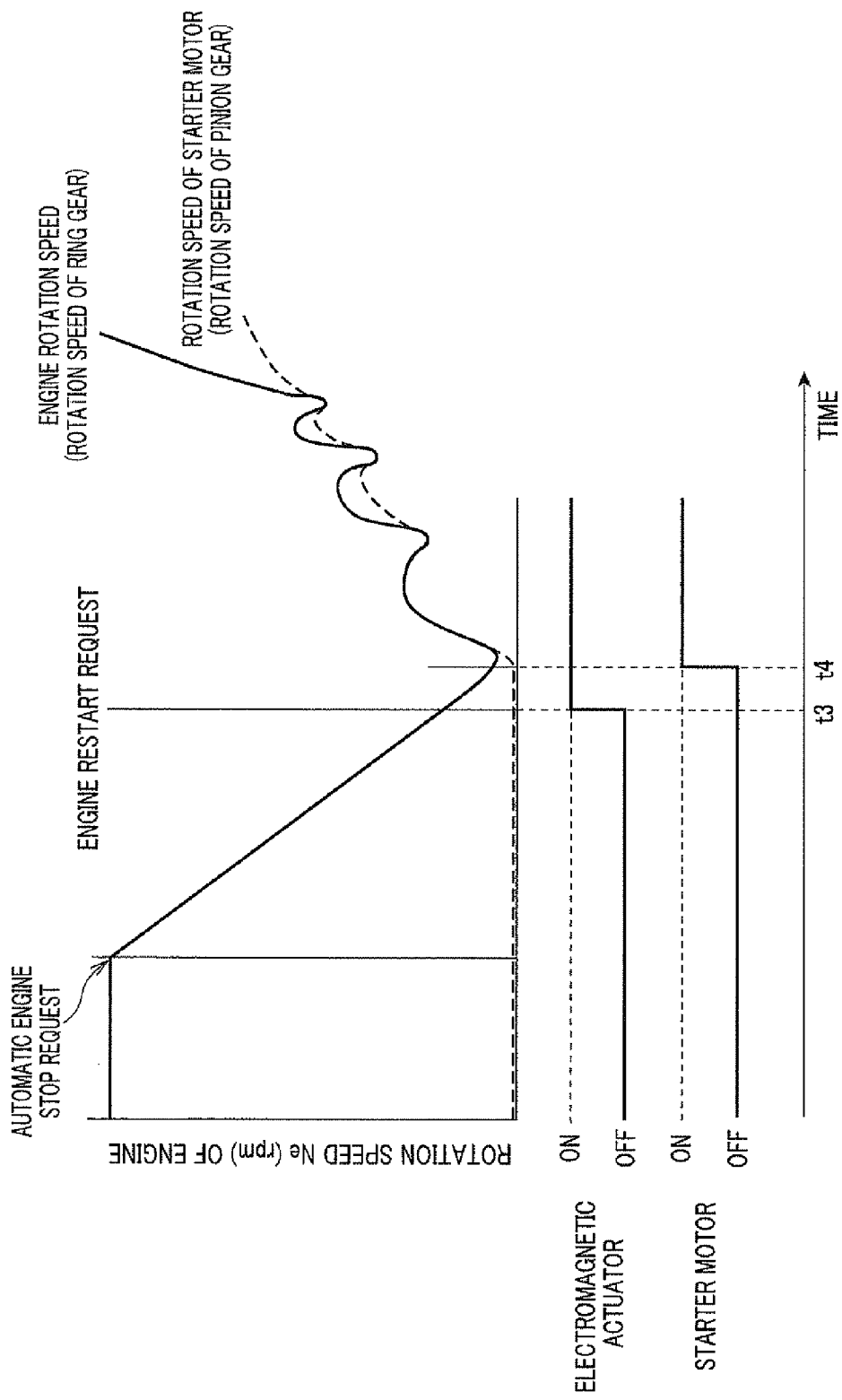
FIG. 4 is a timing chart showing a pre-gear meshing control executed by the control device according to the first embodiment of the present invention.

FIG. 4 is a timing chart showing the pre-gear meshing control executed by the ECU 20 in the control device according to the first embodiment. Specifically, as shown in FIG. 4, the ECU 20 drives the electromagnetic actuator 14 to be electrically turned on at the time t3 in order to mesh the pinion gear 13 with the ring gear 23. After completion of the gear meshing between them at the time t4 or during the gear meshing operation of the pinion gear 13 and the ring gear 23 by the electromagnetic actuator 14, the electric power is supplied to the starter 11 in order to start the cranking and the internal combustion engine 21 is thereby restarted.

The third engine restart control described above makes it possible to avoid the synchronization in rotation speed between the pinion gear 13 and the ring gear 23 while the pinion gear 13 is smoothly meshed with the ring gear 23 and preventing or suppressing gear meshing noise from being generated. This makes it possible to rapidly perform the cranking by the starter 11 and rapidly restart the internal combustion engine 21, and decrease the power consumption of the starter 11.

When the internal combustion engine 21 is restarted, the ECU 20 estimates the rotation speed Ne of the internal combustion engine 21 by referring to a map showing the relationship between a rotation speed Ne of the internal combustion engine 21 and an elapsed time period counted from the time when the engine restart request is issued. This estimated rotation speed Ne of the internal combustion engine 21 corresponds to the elapsed period of time which is counted from the time when the automatic engine stop request (or the combustion stop request of the internal combustion engine 21) occurs. This map is made in advance on the basis of the experimental data items and statistical data items, and stored in a memory device such as a read only memory (ROM).

In general, because the rotation speed Ne of the internal combustion engine 21 is gradually decreased according to the elapsed time period counted from the time when the combustion of the internal combustion engine 21 is stopped, it is possible to easily estimate the rotation speed Ne of the internal combustion engine 21 on the basis of the elapsed time period counted from the time when the automatic engine stop request is issued.

Still further, the rotation speed of the pinion gear 13 is estimated or calculated corresponding to the relationship between the period of time to supply the electric power to the starter motor 12 and the magnitude of a current flowing through the starter motor 12 by referring the rotation speed map of the pinion gear 13 which shows the relationship between parameters such as the power supplying period of time to the starter motor 13 and the magnitude of current to be supplied (such as a duty ratio). This rotation speed map is made in advance on the basis of experimental data items and design data items. The rotation speed map is stored in the ROM in the ECU 20.

In general, the rotation speed of the starter motor 12 is increased according to the elapsed period of time counted from the time when the electric power is supplied to the starter motor 12, and the rotation speed of the pinion gear 13 is thereby increased. The more the current to be supplied to the starter motor 12 is increased, the more the rotation speed of the starter motor 12 is increased and the more the rotation speed of the pinion gear 23 is thereby increased. It is therefore possible to estimate the rotation speed of the pinion gear 13 on the basis of the electric power supplying period of time and the magnitude of the supplying current to the starter motor 12.

The ECU 20 in the control device according to the first embodiment executes the engine restart control routine shown in FIG. 5 in order to control the restart of the internal combustion engine 21.

The ECU 20 periodically executes the engine restart control routine shown in FIG. 5 with a predetermined period of time during the power-on of the ECU 20.

First, in step S101, the ECU 20 detects whether or not the automatic engine stop control is executed (for example, during the period of time counted from the combustion-stop of the internal combustion engine 21 to the engine restart).

When the detection result in step S101 indicates that the internal combustion engine 21 is not in the automatic engine stop control ("NO" in step S101), the ECU 20 completes the engine restart control routine shown in FIG. 5 without performing any step other than step S101.

When the detection result indicates that the automatic engine stop control is executed ("YES" in step S101), the ECU 20 starts to execute the engine restart control shown in step S102 and other following steps.

Firstly, in step S102, the ECU 20 detects whether or not the engine restart request is issued. When the detection result indicates that the engine restart request is issued ("YES" in step S102), the operation flow progresses to step S103. In step S103, the ECU 20 detects whether or not the current engine speed of the internal combustion engine 21 is higher than the first rotation speed N1. That is, the detection in step S103 detects whether or not the current rotation speed Ne of the internal combustion engine 21 is within the first rotation speed range.

For example, the first rotation speed N1 has a value within the range of 300 to 700 rpm. In the control device according to the first embodiment, the first rotation speed N1 is 500 rpm.

When the rotation speed Ne of the internal combustion engine 21 is higher than the first rotation speed N1 while the rotation speed of the internal combustion engine is dropping, the internal combustion engine 21 can be restarted without performing the cranking and only by restarting its combustion (only by performing its fuel injection and ignition). The current rotation speed Ne is within the range which allows to restart the internal combustion engine 21 only by performing the fuel injection and ignition without performing the cranking by the starter 11 because the current rotation speed Ne of the internal combustion engine 21 is higher than the first rotation speed N1 when a value within the rotation speed range of 300 to 700 rpm is set to the first rotation speed N1.

When the judgment result in step S103 indicates that the current rotation speed Ne of the internal combustion engine is higher than the first rotation speed N1, (that is, when the engine restart request is issued when the current rotation speed Ne is within the first rotation speed range), the ECU 20 judges for the internal combustion engine 21 to be restarted without performing the cranking by the starter 11. The operation flow progresses to step S104 (which executes the engine self-restart control).

In step S104, the ECU 20 executes the engine self-restart control in which the ECU 20 performs the fuel injection and ignition in order to restart the internal combustion engine 21 without performing the cranking by the starter 11.

After this, the operation flow progresses to step S105. In step S105, the ECU 20 detects whether or not the internal combustion engine 21 is restarted on the basis of the current rotation speed Ne of the internal combustion engine 21. That is, the ECU 20 detects whether or not the current rotation speed Ne of the internal combustion engine 21 exceeds an engine restart completion judgment value Nsc (see FIG. 6).

When the detection result in step S105 indicates that the internal combustion engine 21 is not restarted, the operation flow is returned to step S103. In step S103, the ECU 20 continues the first engine restart control when the current rotation speed Ne of the internal combustion engine 21 is within the first rotation speed range (steps S103 and S104). After this, when the ECU 20 detects that the internal combustion engine 21 has been restarted in step S105, the ECU 20 completes the engine restart control routine shown in FIG. 5.

On the other hand, when the detection result in step S103 indicates that the current rotation speed Ne of the internal combustion engine 21 is not more than the first rotation speed N1, the operation flow goes to step S106.

In step S106, the ECU 20 detects whether or not the current rotation speed Ne of the internal combustion engine 21 is higher than the second rotation speed N2. This detects whether the current rotation speed Ne of the internal combustion engine 21 is within the second rotation speed range or within the third rotation speed range.

In the first embodiment, this second rotation speed N2 is within a range of 50 rpm to 450 rpm (the second rotation speed N2 is 250 rpm in the first embodiment).

When the rotation speed Ne of the internal combustion engine 21 is decreased to not more than the second rotation speed N2 while the rotation speed of the internal combustion engine 21 is dropping due to the automatic engine stop, it is possible to smoothly mesh the pinion gear 13 with the ring gear 23 without synchronizing the rotation speed of the pinion gear 13 with the rotation speed of the ring gear 23. That is, it is possible to smoothly mesh the pinion gear 13 with the ring gear 23 without synchronizing the rotation speed of the pinion gear 13 to the rotation speed of the ring gear 23 when a value within the range of 50 rpm to 450 rpm is set as the second rotation speed N2. In this case, the third rotation speed range which is not more than the second rotation speed N2 (within the range of 50 rpm to 450 rpm) is the range capable of smoothly meshing the pinion gear 13 with the ring gear 23 without synchronizing the rotation speed of the pinion gear 13 with the rotation speed of the ring gear 23.

In step S106, when detecting that the current rotation speed Ne of the internal combustion engine 21 is higher than the second rotation speed N2 (when the engine restart request is issued while the current rotation speed Ne of the internal combustion engine 21 is within the second rotation speed range), the ECU 20 judges it is difficult to smoothly mesh the pinion gear 13 with the ring gear 23 unless the gear synchronization between the pinion gear 13 and the ring gear 23 is performed because the rotation speed of the ring gear 23 is relatively high. The operation flow thereby goes to step S107. In step S107, the ECU 20 executes the pre-gear synchronizing control.

In the pre-gear synchronizing control, the ECU 20 calculates the elapsed time period counted from the time when the automatic engine stop occurs to the time when the rotation speed of the pinion gear 23 is synchronized with the rotation speed of the ring gear 13 on the basis of the map regarding the rotation speed Ne and the map regarding the rotation speed of the pinion gear 13.

The ECU 20 drives the starter motor 12 to rotate the pinion gear 13 when the automatic engine stop request is issued, and drives the electromagnetic actuator 14 to push the pinion gear 13 to the ring gear 23 in order to mesh the pinion gear 13 with the ring gear 23 at the time to reach the elapsed time period calculated above.

This makes it possible for the starter motor 12 to synchronize the rotation speed of the pinion gear 13 with the ring gear 23 in order to decrease the difference of the rotation speed between these gears 13 and 23. After this, the electromagnetic actuator 14 meshes the pinion gear 13 with the ring gear 23, and the starter 11 starts the cranking. This restarts the operation of the internal combustion engine 21.

After this, in step S108, the ECU 20 detects whether or not the engine start is completed. When the detection result in step S108 indicates the internal combustion engine 21 has restarted ("YES" in step S108), the ECU 20 completes the engine restart control shown in FIG. 5.

On the other hand, when the detection result in step S108 indicates the internal combustion engine 21 has not restarted ("NO" in step S108), the operation flow goes to step S109. In step S109, the ECU 20 executes the pre-gear meshing control.

By the way, in step S106, when the detection result in step S106 indicates that the current rotation speed Ne of the internal combustion engine 21 is not more than the second rotation speed N2 ("NO" in step S106, that is, when the engine restart request is issued while the current rotation speed Ne of the internal combustion engine 21 is within the third rotation speed range), the ECU 20 judges that it is possible to smoothly mesh the pinion gear 13 with the ring gear 23 without performing any gear synchronization in which the rotation speed of the pinion gear 13 is synchronized with the rotation speed of the ring gear 23 because the rotation speed of the ring gear 23 is relatively low. The operation step progresses to step S109.

In step S109, the ECU 20 executes the pre-gear meshing control. In the pre-gear meshing control, the ECU 20 drives the electromagnetic actuator 14 to mesh the pinion gear with the ring gear 23 when the automatic engine stop request is issued. That is, the pinion gear 13 is pushed to the ring gear 23 side by the electromagnetic actuator 14 in order to mesh them. The ECU 20 drives the starter motor 12 to rotate the pinion gear 13 in order to perform the cranking by the starter 11 after or during the gear meshing process. This restarts the internal combustion engine 21.

After this, the operation flow goes to step S110, the ECU 20 detects whether or not the engine restart operation is completed. When the detection result in step S110 indicates that the engine restart operation has not already be done ("NO" in step S110), the operation flow returns to step S109.

On the other hand, when the detection result in step S110 indicates that the engine restart operation has already be done ("YES" in step S110), the ECU 20 completes the engine restart control routine shown in FIG. 5.

In summary, in the engine restart control process shown in FIG. 5, the ECU 20 executes:

(h1) the engine self restart control in which the ECU 20 performs fuel injection and ignition without driving the starter 11 to perform any cranking when the engine restart request is issued while the rotation speed Ne of the internal combustion engine is within the first rotation speed range;

(h2) the pre-gear synchronizing control in which the ECU 20 instructs the starter motor 12 to rotate the pinion gear 12 in order to synchronize the rotation speed of the pinion gear 13 with the rotation speed of the ring gear 23, the drives the electromagnetic actuator 14 to mesh the pinion gear 13 with the ring gear 23, and then drives the starter 11 to perform the cranking in order to restart the internal combustion engine 21 when the engine restart request is issued while the rotation speed Ne of the internal combustion engine is within the second rotation speed range; and (h3) the pre-gear meshing control in which the ECU 20 drives the starter motor 12 to rotate the pinion gear 13 in order for the starter 11 to perform the cranking after or during the electromagnetic actuator 14 to mesh the pinion gear 13 with the ring gear 23 when the engine restart request is issued while the rotation speed Ne of the internal combustion engine is within the third rotation speed range.

It is possible for the ECU 20 in the control device according to the present invention to execute the optimum engine restart control on the basis of the rotation speed Ne of the internal combustion engine when the engine restart request is issued while the rotation speed of the internal combustion engine 21 is dropping due to the automatic engine stop control. This makes it possible to prevent the engine restart from being delayed when the engine restart request is issued, and gear meshing noise from being generated, and the electric power consumption of the starter 11 from being decreased.

In the engine restart control process shown in FIG. 5, when performing the engine restart control, the ECU 20 estimates the rotation speed of the internal combustion engine 21 on the basis of the elapsed time period counted from the time when the automatic engine stop request (or when the combustion of the internal combustion engine 21 is stopped). This makes it possible for the control device to avoid using any expensive crank angle sensor capable of detecting the rotation speed Ne when the rotation speed Ne is dropping due to the automatic engine stop. Further, because the ECU 20 estimates the rotation speed Ne of the pinion gear 13 on the basis of the current supplying period to supply current into the starter motor 12 and the magnitude of the current. It is thereby possible to avoid any sensor capable of detecting the rotation speed of the starter motor 12 (or the rotation speed of the pinion gear 13). This makes it possible to decrease the manufacturing cost which is one of important technical problems to be solved.

However, there is a possibility of causing an engine restart failure even if the ECU 20 executes the engine self-restart control because a desired combustion cannot be done. In particular, there is a possibility of causing the engine restart failure when the rotation speed Ne of the internal combustion engine 21 is rapidly dropped. When the engine restart failure occurs during the execution of the engine restart control shown in FIG. 5, the ECU 20 executes the pre-gear synchronizing control when the rotation speed Ne of the internal combustion engine 21 is dropped to within the second rotation speed range.

Figure 6:
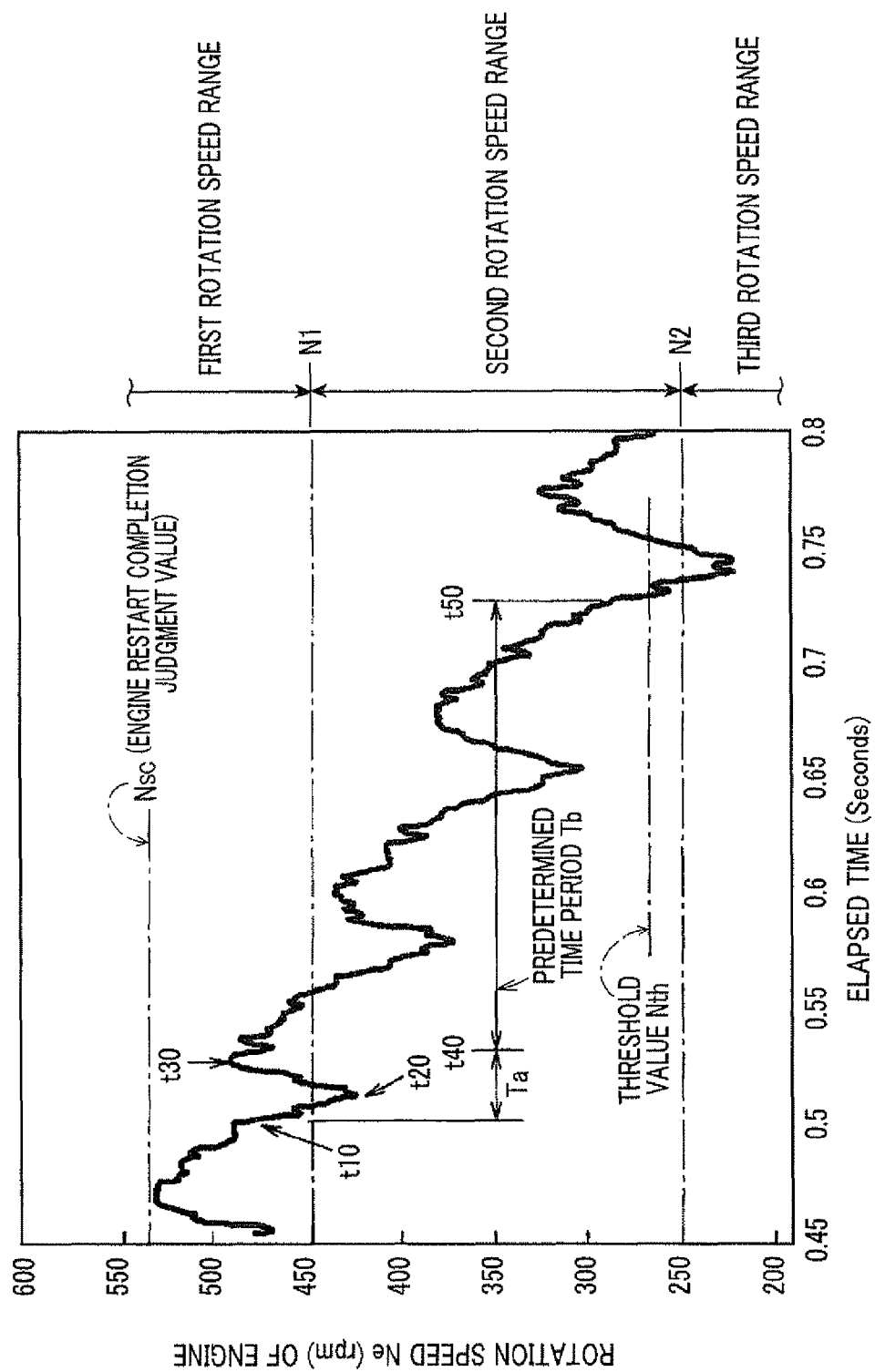
FIG. 6 is a timing chart showing an oscillation state of the rotation speed of the internal combustion engine in which the rotation speed of the internal combustion engine is oscillated, namely, increased and decreased after the engine restart failure occurs during the engine self-restart control occurs.

However, a following problem also occurs. FIG. 6 is a timing chart showing a state in which the rotation speed Ne of the internal combustion engine 21 is oscillated and gradually decreased after failure of the engine self-restart control.

As shown in FIG. 6, the rotation speed Ne of the internal combustion engine 21 is oscillated by increasing and decreasing after the automatic engine stop. In the case in which the ECU 20 executes the engine self-restart control and then fails in this engine restart while the rotation speed Ne of the internal combustion engine 21 is within the first rotation speed range, when the ECU 20 executes the pre-gear synchronizing control at the time t20 when the rotation speed Ne of the internal combustion engine 21 is within the second rotation speed range, there is a possibility that the rotation speed Ne of the internal combustion engine 21 is higher than the second rotation speed range at the time when the electromagnetic actuator 14 to push the pinion gear 13 to the ring gear 23 during the pre-gear synchronizing control. In this situation, because the rotation speed of the ring gear 23 is higher than the rotation speed of the pinion gear 13 (in the state of not reaching any gear synchronization) and the pinion gear 13 is pushed to the ring gear 23 in order to perform the gear meshing operation, it is difficult to smoothly perform the gear-meshing operation between the pinion gear 13 and the ring gear 23. This would cause severe damage to both the ring gear 23 and the pinion gear 13.

In order to avoid the above problem, as shown in FIG. 6, the ECU 20 in the control device according to the first embodiment prohibits or halts the execution of the pre-gear synchronizing control until a predetermined time period Tb is elapsed, and the ECU 20 executes the pre-gear meshing control at the time t50 when the predetermined time period Tb is elapsed, where the predetermined time period Tb is counted from the time t40 when the engine restart failure occurs under the engine self-restart control.

Figure 7:
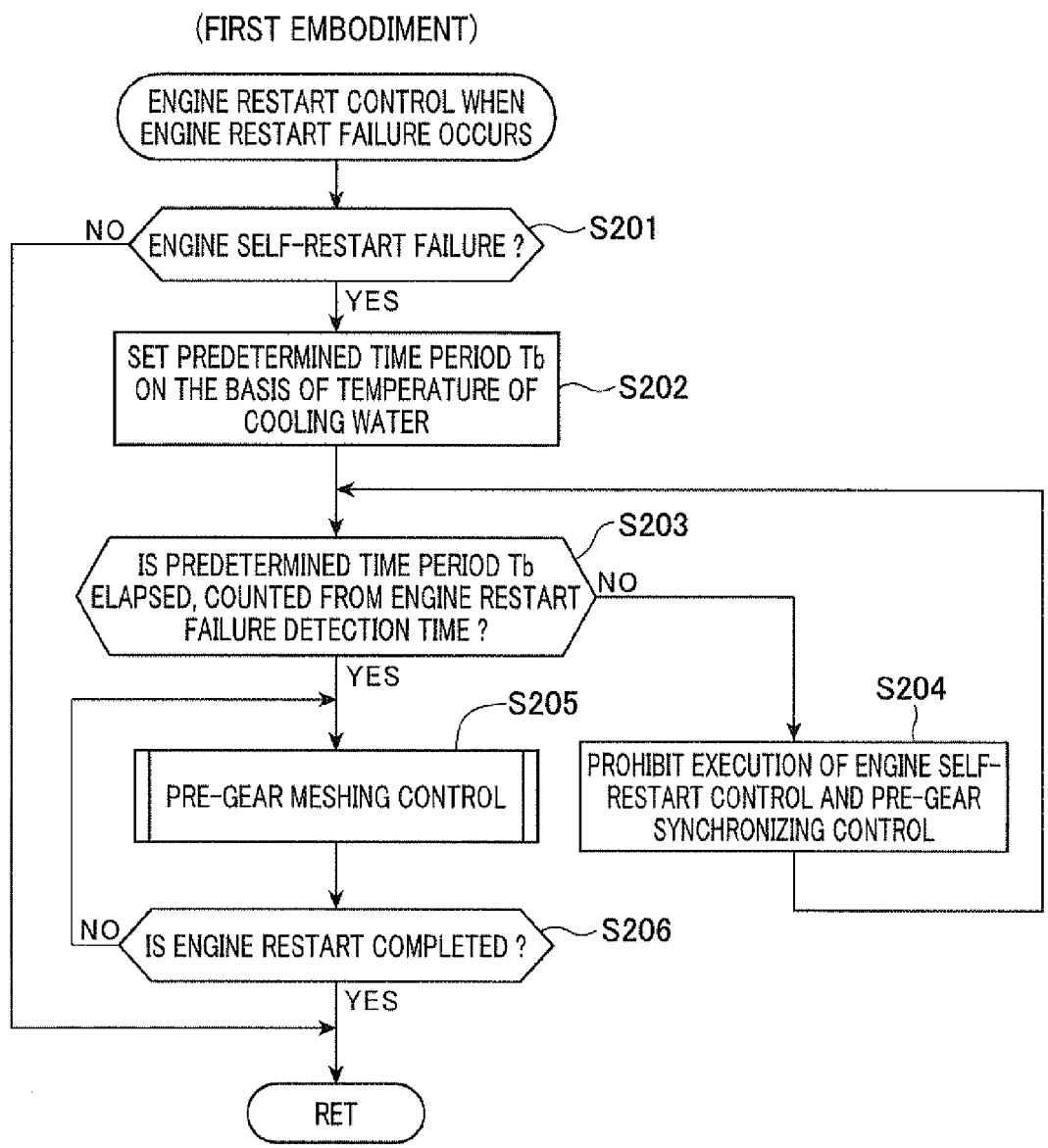
FIG. 7 is a flow chart showing an engine restart control routine executed by the control device according to the first embodiment when an engine restart failure occurs during the engine self-restart control.

FIG. 7 is a flow chart showing the engine restart control routine executed by the ECU 20 in the control device according to the first embodiment when an engine restart failure occurs under the engine restart control while the ECU 20 executes the engine self-restart control.

A description will now be given of the engine restart control routine shown in FIG. 7 executed by the ECU 20 when a failure of the engine restart control occurs.

The ECU 20 repeatedly executes the engine restart control routine every a predetermined time interval during the turned-on state of the ECU 20 when a failure of the engine restart control occurs.

On starting the engine restart control routine shown in FIG. 7, the ECU 20 detects in step S201 (which corresponds to a detection means) whether or not a failure of the engine restart by the engine self-restart control occurs. For example, the ECU 20 detects the failure of the engine restart when the rotation speed Ne of the internal combustion engine 21 does not excess the engine restart completion detection value Nsc during a predetermined time period Ta counted from the start time of the engine self-restart control. The time t40 shown in FIG. 6 indicates the engine restart failure time, where the time t40 is elapsed by the predetermined time period Ta when the engine restart failure is detected. The time t40 will be referred to as "failure detection time t40".

When the detection result in step S201 indicates that the ECU 20 detects no engine restart failure ("NO" in step S201), the ECU 20 completes the engine restart control routine shown in FIG. 7.

On the other hand, when the detection result in step S201 indicates that the ECU 20 detects that the engine restart failure occurs under the engine self-restart control ("YES" in step S201), the ECU 20 calculates a predetermined time period Tb (shown in FIG. 6) on the basis of a temperature of the internal combustion engine 21 (or the temperature of cooling water of the internal combustion engine 21) and the rotation speed Ne of the internal combustion engine 21. The ECU 20 sets the calculated predetermined time period Tb into a register or RAM (not shown).

The predetermined time period Tb is determined, with which the rotation speed Ne of the internal combustion engine 21 is decreased to a rotation speed (for example, the second rotation speed N2) which allows the gear meshing between the pinion gear 13 and the ring gear 23 without performing the gear synchronization between the pinion gear 13 and the ring gear 23, that is, in which the rotation speed of the pinion gear 13 is synchronized with the rotation speed of the ring gear 23.

Because the viscosity of the engine oil decreases due to the decreasing of the engine temperature, the driving friction of the internal combustion engine 21 is increased when the engine temperature decreases. Accordingly, the dropping rate of the rotation speed Ne of the internal combustion engine 21 increases after the engine restart failure occurs under the engine self-restart control. In this viewpoint, the ECU 20 sets the predetermined time period Tb so that the more the engine temperature decreases, the more the predetermined time period Tb is decreased.

Further, the more the rotation speed Ne of the internal combustion engine 21 at the failure detection time t40 when a failure of the engine restart occurs, the more the predetermined time period Tb is decreased.

For example, the ECU 20 sets the predetermined time period Tb so that the more the rotation speed Ne of the internal combustion engine 21 is decreased at the failure detection time t40 when the ECU 20 detects the engine restart failure, the more the predetermined time period Tb is decreased.

For example, it is possible for the ECU 20 to determine the predetermined time period Tb by referring a map which stores the relationship between the engine temperature, the rotation speed Ne of the internal combustion engine 21, and the predetermined time period Tb.

Still further, it is possible for the ECU 20 to calculate the predetermined time period Tb by a formula regarding the relationship between the engine temperature, the rotation speed Ne of the internal combustion engine 21, and the predetermined time period Tb.

In step S203, the ECU 20 detects whether or not the predetermined time period Tb calculated in step S202 has been elapsed. This predetermined time period Tb is the time period counted from the failure detection time t40.

When the detection result in step S203 indicates that the predetermined time period Tb has not elapsed ("NO" in step S203), the operation flow goes to step S204. In step S204, the ECU 20 prohibits the execution of the engine self-restart control (which corresponds to step S104 shown in FIG. 5) and the pre-gear synchronizing control (which corresponds to step S107 shown in FIG. 5). The operation flow then returns to step S203.

In step S203, the ECU 20 detects whether or not the predetermined time period Tb has been elapsed. When the detection result in step S203 indicates that the predetermined time period Tb has already been elapsed ("YES" in step S203), the operation flow goes to step S205. In step S205, the ECU 20 executes the pre-gear meshing control, as in the case for step S109 shown in FIG. 5. Specifically, in step S205, the ECU 20 drives the electromagnetic actuator 14 to be electrically turned on at the time t50 when the predetermined time period Tb is elapsed, in order to push the pinion gear 13 to the ring gear 23, and mesh the pinion gear 13 with the ring gear 23.

The operation flow goes to step S206. In step S206, the ECU 20 detects whether or not the engine restart of the internal combustion engine 21 is completed. When the detection result in step S206 indicates that the engine restart has not been completed ("NO" in step S206), the operation flow returns to step S205. After this, when the detection result in step S206 indicates that the engine restart has been completed ("YES" in step S206), the ECU 20 completes the engine restart control routine shown in FIG. 7.

It is sufficient for the ECU 20 to detect the completion of the engine restart of the internal combustion engine 21 when the rotation speed Ne of the internal combustion engine 21 exceeds the engine restart completion judging value N3 during the predetermined time period from the execution of the pre-gear meshing control by the ECU 20.

As described above in detail according to the various types of the engine restart control performed by the control device equipped with the ECU 20 of the first embodiment, the ECU 20 prohibits the execution of the pre-gear synchronizing control immediately when a failure of the engine self-restart control occurs.

The ECU 20 can avoid the execution of the gear meshing to push the pinion gear 23 to the ring gear 23 and mesh the pinion gear 13 with the ring gear 23 under the condition in which the rotation speed of the pinion gears 13 are not synchronized with the rotation speed of the ring gear 23 at the time t30 when the rotation speed Ne of the internal combustion engine 21 is increased to a value within the first rotation speed range after the rotation speed Ne of the internal combustion engine 21 is decreased within the second rotation speed range due to the occurrence of the engine restart failure by the engine self-restart control.

The ECU 20 then executes the pre-gear meshing control at the time t50 which is elapsed counted from the failure detection time t40 by the predetermined time period Tb (as a waiting time period). This makes it possible for the ECU 20 to drive the electromagnetic actuator 40 to smoothly mesh the pinion gear 13 with the ring gear 23 at the time when the rotation speed Ne of the internal combustion engine 21 is decreased within the second rotation speed range N2 (or the boundary of the second rotation speed range N2) after the engine restart failure.

As described in detail, the control device equipped with the ECU 20 can smoothly mesh the pinion gear 13 with the ring gear 23 even if the engine restart failure occurs under the engine self-restart control. This makes it possible to avoid severe damage to both the ring gear 23 and the pinion gear 13.

Still further, the control device equipped with the ECU 20 according to the first embodiment sets the predetermined time period Tb which is more decreased due to the engine temperature more decreased and the rotation speed Ne of the internal combustion engine 21 more decreased, where the execution of the pre-gear synchronizing control is prohibited or halted during the predetermined time period Tb. This makes it possible for the ECU 20 to execute the pre-gear meshing control in order to correctly perform the restart of the internal combustion engine 21 as earlier time as possible after an engine restart failure occurs under the engine self-restart control.

Second Embodiment

A description will be given of the engine restart control executed by the ECU 20 in the control device according to a second embodiment of the present invention with reference to FIG. 8.

Figure 8:
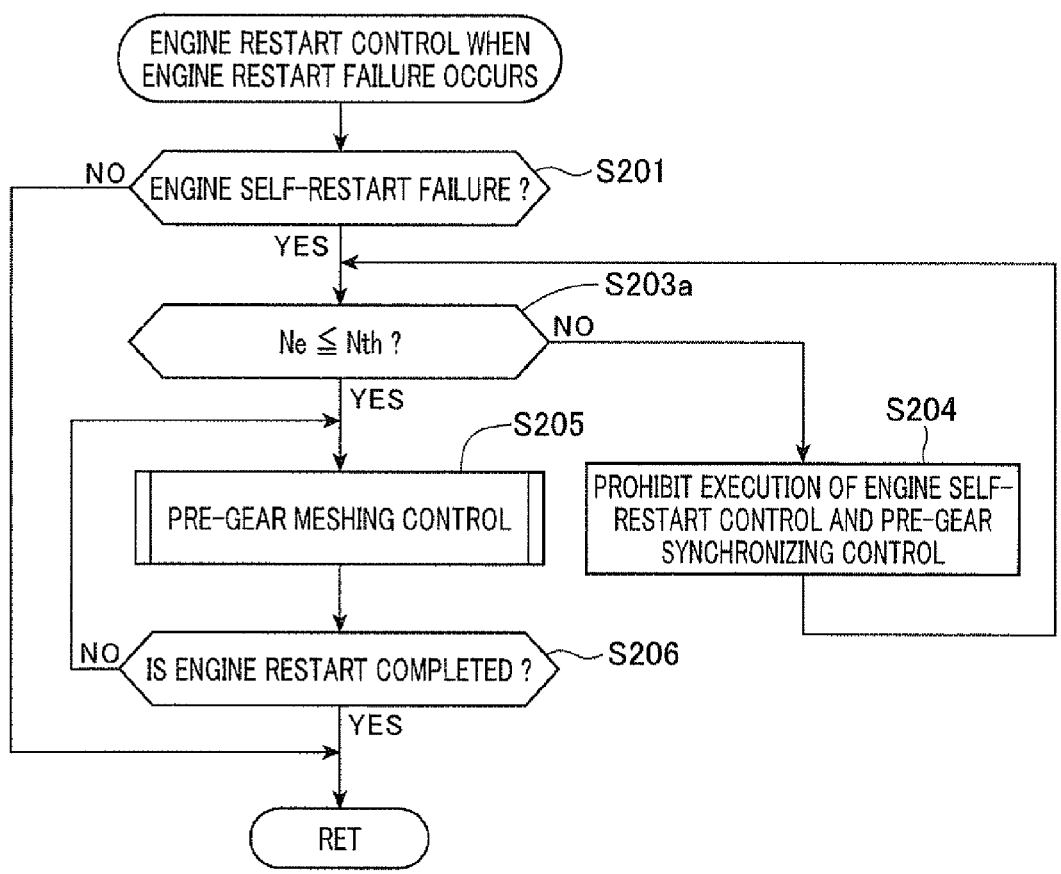
FIG. 8 is a flow chart showing an engine restart control routine executed by the control device according to a second embodiment when an engine restart failure occurs during the engine self-restart control.

FIG. 8 is a flow chart showing an engine restart control routine executed by the ECU 20 in the control device according to the second embodiment when a failure of the engine self-restart control occurs.

In the engine restart control according to the first embodiment previously described, the ECU 20 prohibits or halts the execution of the pre-gear synchronizing control during the predetermined time period Tb which is counted from the failure detection time t40. The ECU 20 executes the pre-gear meshing control at the time t50 which is elapsed from the failure detection time t40 by the predetermined time period Tb.

On the other hand, in the second embodiment, the ECU 20 prohibits the execution of the pre-gear synchronizing control until the rotation speed Ne of the internal combustion engine 21 becomes lower than a threshold value Nth (shown in FIG. 6) after the failure detection time t40. The ECU 20 executes the pre-gear meshing control when the rotation speed Ne of the internal combustion engine 21 reaches the threshold value Nth while the rotation speed Ne of the internal combustion engine 21 is dropping due to the automatic engine stop.

The ECU 20 in the control device according to the second embodiment executes the engine restart control routine shown in FIG. 8 when the engine restart failure occurs.

A description will now be given of the engine restart control routine when the engine restart failure occurs with reference to the flow chart shown in FIG. 8.

The ECU 20 periodically executes the engine restart control routine shown in FIG. 8 with a predetermined period of time during the power-on period of the ECU 20.

On starting the engine restart control routine shown in FIG. 8, the ECU 20 detects in step S201 (which corresponds to a detection means) whether or not the engine restart failure occurs under the engine self-restart control.

When the detection result in step S201 indicates that the ECU 20 detects no engine restart failure ("NO" in step S201), the ECU 20 completes the engine restart control routine shown in FIG. 8 without performing step S203a, step S204, step S205, and step S206.

On the other hand, when the detection result in step S201 indicates that the ECU 20 detects that a failure of the engine restart by the engine self-restart control occurs ("YES" in step S201), the operation flow goes to step S203a. In step S203a, the ECU 20 detects whether or not the current rotation speed Ne of the internal combustion engine 21 is not more than the predetermined threshold value Nth (see FIG. 6). In the second embodiment, a value which is lower than the first rotation speed N1 is set to the threshold value Nth in advance. Further, this predetermined threshold value Nth is slightly higher than the second rotation speed N2 (se FIG. 6).

When the detection result in step S203a indicates that the current rotation speed Ne of the internal combustion engine 21 is more than the threshold value Nth ("NO" in step S203a), the operation flow goes to step S204. In step S204, the ECU 20 prohibits the execution of the engine self-restart control (which corresponds to step S104 shown in FIG. 5) and the pre-gear synchronizing control (which corresponds to step S107 shown in FIG. 5). The operation flow then returns to step S203a.

On the other hand, when the detection result in step S203a indicates that the current rotation speed Ne of the internal combustion engine 21 is not more than the threshold value Nth ("YES" in step S203a), the operation flow goes to step S205. In step S205, as in the case for step S109 shown in FIG. 5, the ECU 20 executes the pre-gear meshing control. That is, step S205 corresponds to step S109 shown in FIG. 5. After this, the operation flow goes to step S206.

In step S206, the ECU 20 detects whether or not the restart of the internal combustion engine 21 has been completed.

When the detection result in step S206 indicates that no engine restart is completed ("NO" in step S206), the operation flow returns to step S205 in order to continue the execution of the pre-gear meshing control.

On the other hand, when the detection result in step S206 indicates that no engine restart is completed ("YES" in step S206), namely, the engine restart is completed, the ECU 20 completes the engine restart control shown in FIG. 8.

According to the engine restart control of the second embodiment described above, the ECU 20 prohibits the execution of the pre-gear synchronizing control immediately when the engine restart failure occurs under the engine self-restart control. This makes it possible to avoid the gear meshing operation between the pinion gear 13 and the ring gear 23 from being executed by pushing the pinion gear 13 to the ring gear 23 under the state without the rotation-speed synchronization between the pinion gear 13 and the ring gear 23 at the time t30. That is, the rotation speed Ne of the internal combustion engine 21 is increased to the first rotation speed range at the time t30 after it has decreased to the second rotation speed range due to the engine restart failure caused by the engine-self control.

Because the ECU 20 executes the pre-gear meshing control at the time when the rotation speed Ne of the internal combustion engine 21 is decreased and reaches the predetermined threshold value Nth (Nth<N1) after detecting the engine restart failure caused by the engine self-restart control, it is possible for the ECU 20 to drive the electromagnetic actuator 14 to smoothly mesh the pinion gear 13 with the ring gear 23 at the time when the rotation speed Ne of the internal combustion engine 21 reaches the predetermined threshold value Nth.

According to the engine restart control of the second embodiment, even if the engine restart failure occurs under the engine self-restart control, it is possible for the ECU 20 to perform the gear engagement operation to smoothly mesh the pinion gear 13 with the ring gear 23 after the engine restart failure. This makes it possible to prevent gear meshing noise from being generated and increased, and prevent the pinion gear 13 and the ring gear 23 from being markedly worn and damaged.

Further, according to the engine restart control in the second embodiment, because the ECU 20 uses the predetermined threshold value Nth which is slightly higher than the second rotation speed N2, it is possible to start the engine restart by the pre-gear meshing control at an earlier time after the engine restart failure caused by the engine self-restart control when compared with the execution time of the engine restart when the predetermined threshold value Nth and the second rotation speed N2 have the same value.

Third Embodiment

A description will be given of the engine restart control executed by the ECU 20 in the control device according to a third embodiment of the present invention with reference to FIG. 9.

In the first and second embodiments previously described, the ECU 20 executes the engine self-restart control, the pre-gear synchronizing control, and the pre-gear meshing control, respectively, according to the first rotation speed range, the second rotation speed range, and the third rotation speed range.

On the other hand, the ECU 20 according to the third embodiment does not execute the pre-gear synchronizing control which corresponds to step S105 shown in FIG. 5. In the third embodiment, the ECU 20 executes one of the engine self-restart control and the pre-gear meshing control according to the first rotation speed range and the third rotation speed range.

Figure 9:
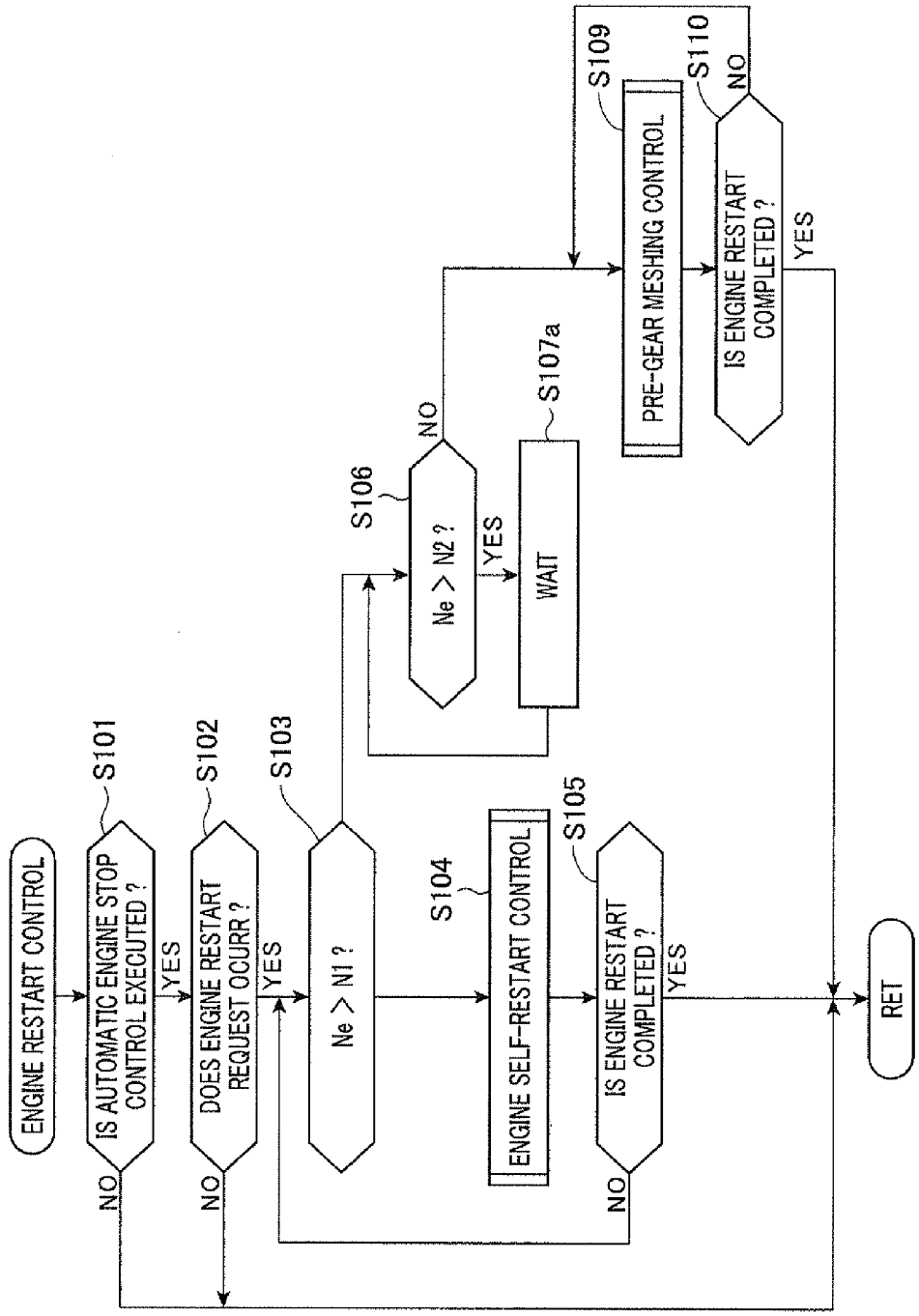
FIG. 9 is a flow chart showing an engine restart control routine executed by the control device according to a third embodiment of the present invention.
Figure 10:
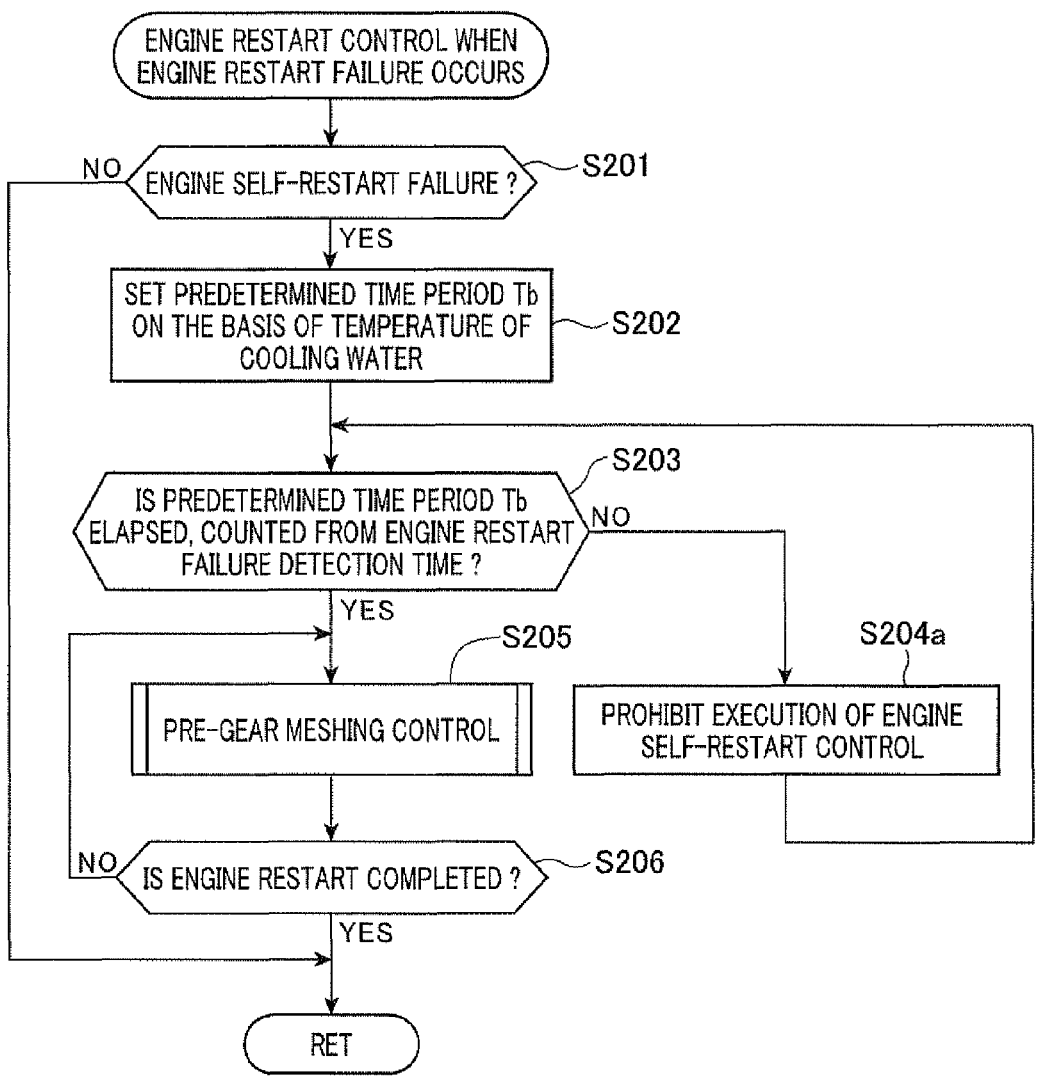
FIG. 10 is a flow chart showing an engine restart control routine executed by the control device according to the third embodiment of the present invention when an engine restart failure occurs during the engine self-restart control.

FIG. 9 is a flow chart showing the engine restart control routine executed by the ECU 20 in the control device according to the third embodiment. FIG. 10 is a flow chart showing the engine restart control routine executed by the control device according to the third embodiment when an engine restart failure occurs under the engine self-restart control. The explanation for the same steps between the first embodiment shown in FIG. 5 and FIG. 7 and the third embodiment shown in FIG. 9 and FIG. 10 is omitted here for brevity.

In step S106 shown in FIG. 9, when the ECU 20 detects that the current rotation speed Ne of the internal combustion engine 21 is higher than the second rotation speed N2 ("YES" in step S106), that is, when the engine restart request is issued while the current rotation speed Ne of the internal combustion engine 21 is within the second rotation speed range, the operation flow goes to step S107a. In step S107a, the ECU 20 waits for the current rotation speed Ne of the internal combustion engine 21 to be not more than the second rotation speed N2. That is, the ECU 20 waits without executing any engine self-restart control and pre-gear meshing control until the current rotation speed Ne of the internal combustion engine 21 becomes within the third rotation speed range.

By the way, when the detection result in step S106 indicates that the current rotation speed Ne of the internal combustion engine 21 is not less than the second rotation speed N2 ("NO" in step S106), that is, when the engine restart request is issued while the current rotation speed Ne of the internal combustion engine 21 is within the third rotation speed range, or when the current rotation speed Ne of the internal combustion engine 21 is decreased within the third rotation speed range after the engine restart request is issued when the rotation speed Ne of the internal combustion engine 21 is within the second rotation speed range, the operation flow goes to step S109. In step S109, the ECU 20 executes the pre-gear meshing control.

In step S203 shown in FIG. 10, the ECU 20 detects whether or not the predetermined time period Tb calculated in step S202 is elapsed. The predetermined time period Tb is the time period counted from the failure detection time t40.

When the detection result in step S203 indicates that the predetermined time period Tb has not been elapsed ("NO" in step S203), the operation flow goes to step S204a. In step S204a, the ECU 20 prohibits the execution of the engine self-restart control (which corresponds to step S104 shown in FIG. 9). The operation flow then returns to step S203.

On the other hand, the detection result in step S203 indicates that the predetermined time period Tb has already been elapsed ("YES" in step S203), the operation flow goes to step S205. In step S205, the ECU 20 executes the pre-gear meshing control, as in the case for step S109 shown in FIG. 9.

According to the engine restart control of the third embodiment, even if the engine restart failure occurs under the engine self-restart control, because the ECU 20 prohibits or halts the re-execution of the engine self-restart control, it is possible to avoid the engine restart failure of the engine self-restart control from repeatedly occurring.

Fourth Embodiment

A description will be given of the engine restart control executed by the ECU 20 in the control device according to a fourth embodiment of the present invention with reference to FIG. 11.

Figure 11:
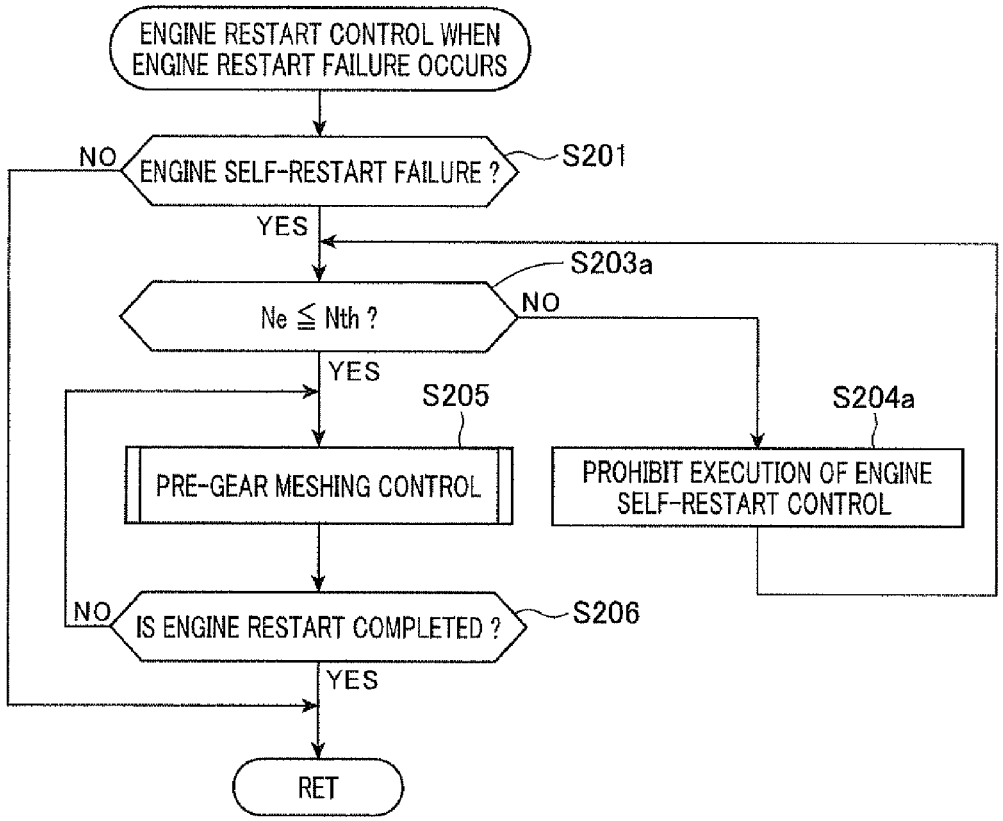
FIG. 11 is a flow chart showing an engine restart control routine executed by the control device according to a fourth embodiment of the present invention when an engine restart failure occurs during the engine self-restart control.

FIG. 11 is a flow chart showing the engine restart control routine executed by the ECU 20 in the control device according to the fourth embodiment when the engine restart failure of the engine self-restart control occurs.

In the fourth embodiment, the ECU 20 does not execute the pre-gear synchronizing control, as in the case for the third embodiment shown in FIG. 9 previously described, the ECU 20 executes the engine self-restart control and the pre-gear meshing control according to the first rotation speed range and the third rotation speed range.

In the third embodiment previously described, the ECU 20 prohibits or halts the execution of the engine self-restart control until the predetermined time period Tb is elapsed, which is counted from the failure detection time t40. The ECU 20 then executes the pre-gear meshing control at the time t50 when the predetermined time period Tb is elapsed.

On the other hand, the ECU 20 waits to execute the engine self-restart control and the pre-gear meshing control until the rotation speed Ne of the internal combustion engine 21 is decreased to lower than the predetermined threshold value Nth (see FIG. 6) after detecting the engine restart failure of the engine self-restart. The ECU 20 executes the pre-gear meshing control at the time when the rotation speed Ne of the internal combustion engine 21 is decreased to the predetermined threshold value Nth.

A description will now be given of the engine restart control according to the fourth embodiment with reference to FIG. 11.

The explanation for the same steps between the flow chart shown in FIG. 8 and the flow chart shown in FIG. 11 is omitted here for brevity.

When the detection result in step S201 shown in FIG. 11 indicates the occurrence of an engine restart failure by the engine self-restart, the operation flow goes to step S203a. In step S203a, the ECU 20 detects whether or not the current rotation speed Ne of the internal combustion engine 21 is not more than the predetermined threshold value Nth (see FIG. 6). In the fourth embodiment, the predetermined threshold value Nth is lower than the first rotation speed N1, but slightly higher than the second rotation speed N2 as shown in FIG. 6.

When the detection result in step S203a indicates that the rotation speed Ne of the internal combustion engine 21 is more than the predetermined threshold value Nth ("NO" in step S203a), the operation flow goes to step S204a.

In step S204a, the ECU 20 prohibits or halts the execution of the engine self-restart control until the rotation speed Ne of the internal combustion engine 21 is not more than the predetermined threshold value Nth. The operation flow returns to step S203a.

On the other hand, when the detection result in step S203a indicates that the rotation speed Ne of the internal combustion engine 21 is not more than the predetermined threshold value Nth ("YES" in step S203a), the operation flow goes to step S205.

In step S205, the ECU 20 executes the pre-gear meshing control, as in the case for step S109 shown in FIG. 9.

According to the engine restart control of the fourth embodiment, even if the engine restart failure occurs under the engine self-restart control, because the ECU 20 prohibits the re-execution of the engine self-restart control, it is possible to avoid the engine restart failure of the engine self-restart control from repeatedly occurring.

Because the ECU 20 according to the fourth embodiment executes the pre-gear meshing control when the rotation speed Ne of the internal combustion engine 21 reaches the predetermined threshold value Nth (Nth<N1), it is possible to smoothly mesh the pinion gear 13 with the ring gear 23 at the time when the rotation speed Ne of the internal combustion engine 21 is decreased to the predetermined threshold value Nth after the occurrence of the engine restart failure of the engine self-restart control.

Further, according to the fourth embodiment, because the predetermined threshold value Nth is higher than the second rotation speed N2, it is possible for the ECU 20 to execute the pre-gear meshing control and restart the internal combustion engine 21 at an earlier time, rather than the time obtained when the predetermined threshold value Nth is equal to the second rotation speed N2, after the engine restart failure occurs under the engine self-restart control.

(Other Modifications)

In the second embodiment previously described, the predetermined threshold value Nth is higher than the second rotation speed N2. However, the concept of the present invention is not limited by the second embodiment. It is possible for the predetermined threshold value Nth to have the same value of the second rotation speed N2. This makes it possible to execute the pre-gear meshing control with high accuracy, when compared with the case of the second embodiment, at the time when the rotation speed Ne of the internal combustion engine 21 is decreased within the third rotation speed range after the failure of the engine restart by the engine self-restart control. It is also possible for the predetermined threshold value Nth to have zero or a value of more than zero.

The control device according to the present invention can be applied to various types of internal combustion engines such as ignition type petrol engines (gasoline engines), and compression and self-ignition type engines (diesel engines). When the control device according to the present invention is applied to the diesel engines, because the rotation speed of the engine is dropping, as shown in FIG. 6, with greatly oscillated and decreased, the conventional engine restart control causes various problems previously described. For example, the conventional engine restart control often causes a problem in which the control device drives an electromagnetic actuator to push the pinion gear to the ring gear under the gear non-engagement condition in which the engine rotation speed is not synchronized with the rotation speed of the ring gear at the time t30 when the engine rotation speed reaches the first rotation speed range after the engine rotation speed is decreased to the second rotation speed range due to the engine restart failure by the engine self-restart control. Therefore a diesel engine equipped with the control device according to the present invention can avoid the above problem.

The control device according to the first embodiment shown in FIG. 5 can execute the engine self-restart control, the pre-gear synchronizing control, and the pre-gear meshing control. Further, the control device according to the second embodiment shown in FIG. 9 can execute the engine self-restart control and the pre-gear meshing control.

The present invention is not limited by the embodiments previously described. It is also possible for the control device to execute the engine self-restart control and the pre-gear synchronizing control, not execute the pre-gear meshing control. In this modification, it is sufficient for the control device to prohibit the execution of the engine self-restart control until the predetermined time period Tb is elapsed or until the engine rotation speed is decreased to the predetermined threshold value Nth after the engine restart failure occurs under the engine self-restart control.

Further, it is possible for the control device to execute the pre-gear synchronizing control and the pre-gear meshing control, not to execute the engine self-restart control. In this modification, it is sufficient for the control device to prohibit the execution of the pre-gear synchronizing control until the predetermined time period Tb is elapsed or until the engine rotation speed is decreased to the predetermined threshold value Nth after the engine restart failure occurs under the pre-gear synchronizing control. This makes it possible to avoid the engine restart failure under the pre-gear synchronizing control form repeatedly occurring.

Fifth Embodiment

A description will be given of a schematic configuration of the system equipped with the control device according to the fifth embodiment with reference to FIG. 1, FIG. 3, and FIG. 12 to FIG. 16.

As in the case for the first to fourth embodiments, previously described, the starter 11 has a mechanism for pushing the pinion gear 13 to the ring gear 23 in order to perform the gear engagement between the pinion gear 13 and the ring gear 23, and to start the cranking by the starter 11 when the internal combustion engine 21 is started to work. The ring gear 23 is fixed to the crank shaft 22 of the internal combustion engine 21. The starter 11 is comprised of the starter motor 12, the pinion gear 13, and the electromagnetic actuator 14. The pinion gear 13 is driven by the starter motor 12. The electromagnetic actuator 14 pushes the pinion gear 13 so as to mesh the pinion gear 13 with the ring gear 23, and the starter 11 starts to rotate the internal combustion engine 21.

The pinion gear 13 is arranged to move in the axial direction of the starter 11 in parallel to the axial direction of the crank shaft 22 of the internal combustion engine 21. The electromagnetic actuator 14 is equipped with a plunger 15 and a solenoid 16. The driving force of the plunger 15 is transmitted to the pinion gear 13 through the lever 17, etc. when the starter 11 starts the internal combustion engine 21.

The relay 19 is placed between the battery 18 and the electromagnetic actuator 14. When the ECU 20 drives the relay 19 to be electrically turned on, the plunger 15 is moved in the direction so as to push the pinion gear 13 to the ring gear 23. The pinion gear 13 is thereby meshed with the ring gear 23 which is fixed to the crank shaft 22 of the internal combustion engine 21.

The mechanical relay 25 and the switching element 24 are placed between the battery 18 and the starter motor 12. When the ECU 20 drives the switching element 24 to be electrically turned on, the mechanical relay 25 is thereby turned on, and the electric power of the battery 18 is supplied to the starter motor 12. When receiving the electric power, the starter motor 12 rotates the pinion gear 13.

As in the case for the first to fourth embodiments previously described, the ECU 20 is comprised of the microcomputer. The microcomputer has the built-in read only memory (ROM) in which various types of engine control programs are stored. The ECU 20 executes these engine control programs in order to adjust a quantity of fuel injection and an ignition period of time when the fuel is injected into cylinders of the internal combustion engine 21.

The ECU 20 executes an automatic engine stop and start control routine (not shown) in order to execute the automatic engine stop and start control (that is, the engine idle stop control).

The automatic engine stop and start control automatically stops the combustion of the internal combustion engine 21 in order to automatically stop the operation of the internal combustion engine 21 when the driver stops the vehicle or a speed reduction request is issued during the vehicle running on a road by the following driver's operations, for example:

(c1) The driver of a vehicle releases the acceleration pedal; or (c2) The driver depresses the brake pedal.

After this, the ECU 20 judges the generation of the engine restart request when the speed reduction request is released during the running of the vehicle or the driver of the vehicle performs the following operations (d1), (d2), or (d3):

(d1) The driver of the vehicle releases the brake pedal;

(d2) The driver of the vehicle operates the shift lever; or (d3) The driver of the vehicle depresses the acceleration pedal.

Figure 13:
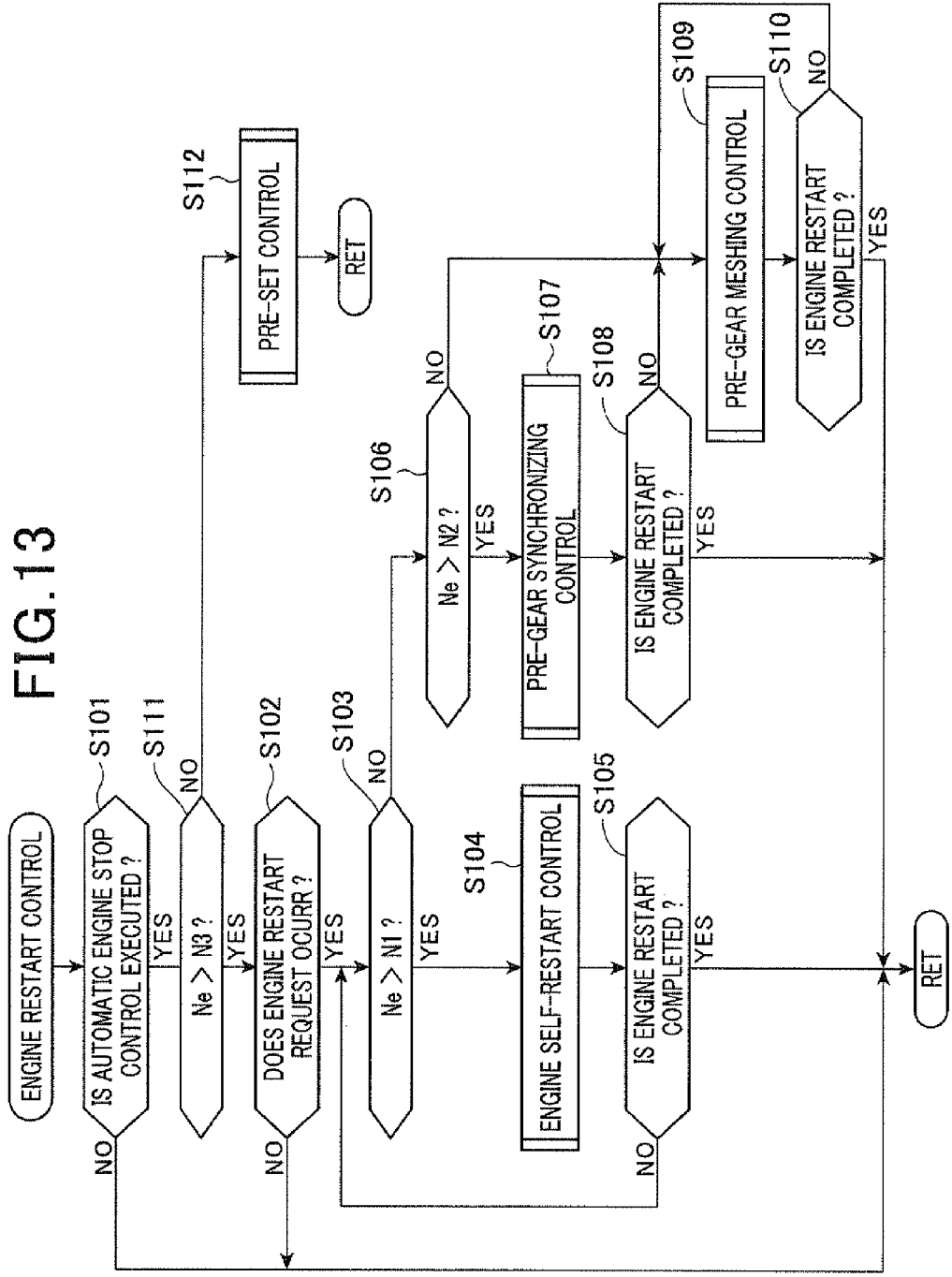
FIG. 13 is a flow chart showing an engine restart control routine executed by the control device according to the fifth embodiment of the present invention.

FIG. 13 is a flow chart showing the engine restart control routine executed by the ECU 20 in the control device according to the fifth embodiment.

When detecting the above operations (c1), (c2), (d1), (d2), or (d3), the ECU 20 in the control device executes the engine restart control routine shown in FIG. 5 by the following procedures.

Figure 12:
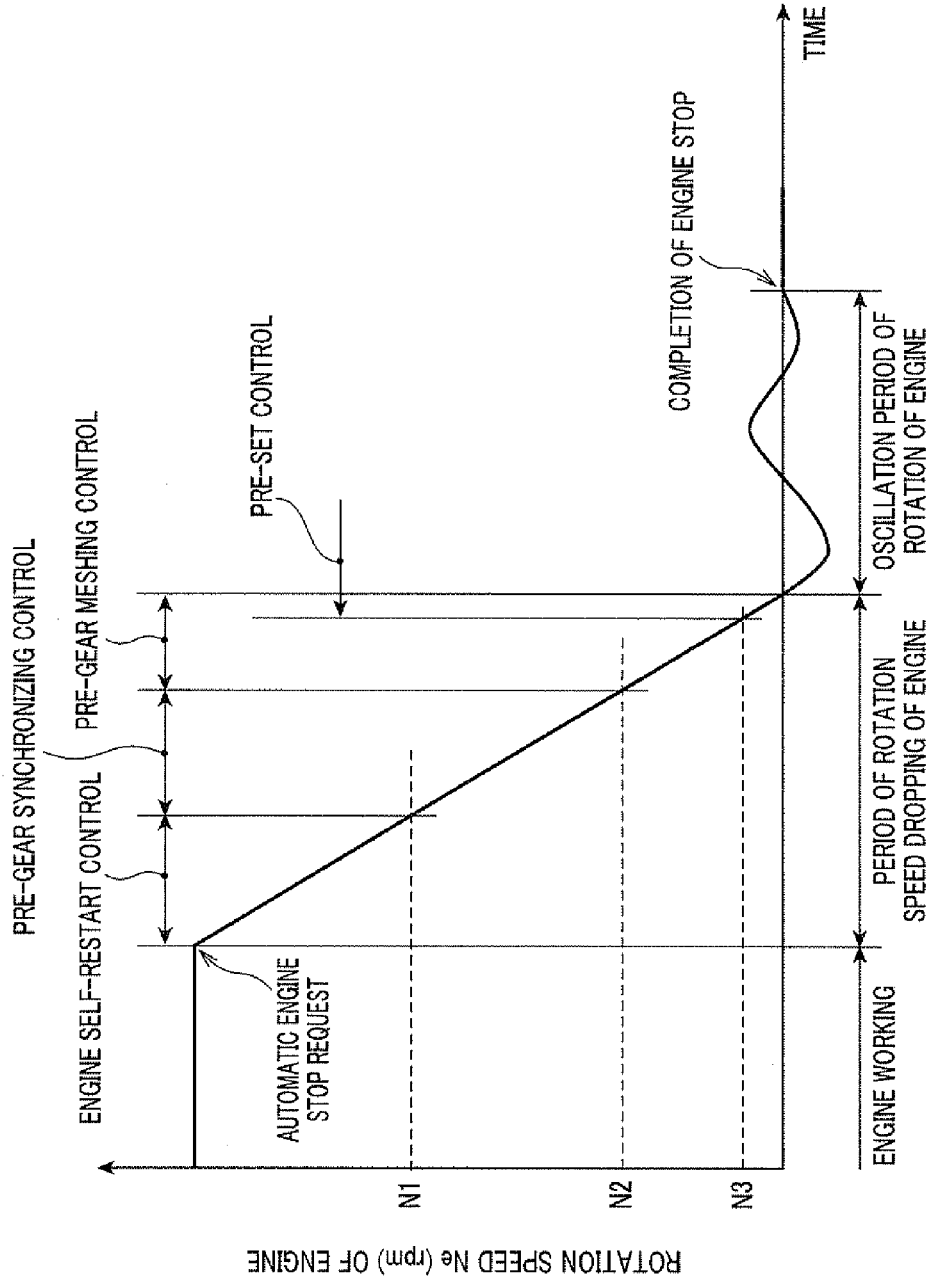
FIG. 12 is a timing chart showing an engine restart control performed by the control device in the engine start control system according to a fifth embodiment of the present invention.

FIG. 12 is a timing chart showing the engine restart control performed by the ECU 20 in the control device according to the fifth embodiment of the present invention. As shown in FIG. 12, when the automatic engine stop request is issued, the fuel combustion in the internal combustion engine 21 is stopped in order to automatically stop the internal combustion engine 21 working.

<Engine Self-Restart Control>

As in the case for the first to fourth embodiments, previously described, while the rotation speed Ne of the internal combustion engine 21 is dropping due to the automatic engine stop of the internal combustion engine 21, when the engine restart request is issued in a first rotation speed range in which the rotation speed Ne of the internal combustion engine 21 is higher than the first rotation speed N1 (e.g. 500 rpm), the ECU 20 judges that it is possible to restart the internal combustion engine 21 without performing the cranking operation by the starter 11, and the ECU 20 executes the engine self-restart control. That is, in the engine self-restart control, the ECU 20 in the control device drives the injectors to inject combustion fuel into the cylinders of the internal combustion engine 21 and ignite the combustion fuel in order to restart the internal combustion engine 21.

This control makes it possible to smoothly restart the combustion of the internal combustion engine 21 immediately when the engine restart request is issued. Because this control does not require any cranking of the pinion gear 13 and the ring gear 23 by the starter 11, it is possible for the starter 11 to have zero power consumption, and to avoid the engagement between the pinion gear 13 and the ring gear 23 when there is a large difference in rotation speed between the pinion gear 13 and the ring gear 23. This control thereby prevents gear meshing noise from being generated.

<Pre-Gear Synchronizing Control>

While the rotation speed of the internal combustion engine 21 is dropping due to the automatic engine stop, when the engine restart request is issued in the second rotation speed range in which the rotation speed Ne of the internal combustion engine 21 is lower than the first rotation speed N1 and higher than the second rotation speed N2 (e.g., 250 rpm), the ECU 20 executes the pre-gear synchronizing control because judging the difficulty of smoothly meshing the pinion gear 13 with the ring gear 23 unless the rotation speed of the pinion gear 13 is synchronized with the rotation speed of the ring gear 23. In the pre-gear synchronizing control, the ECU 20 in the control device executes the following control:

(e1) The starter motor 12 increases the rotation speed of the pinion gear 13 in order to smoothly synchronize the rotation speed of the pinion gear 13 with the rotation speed of the ring gear 23; and (e2) After the step (e1), the ECU 20 drives the electromagnetic actuator 14 to start the cranking in order to mesh the pinion gear 13 with the ring gear 23. After this gear meshing control, the internal combustion engine 21 is restarted.

In particular, as shown in FIG. 3, the ECU 20 drives the starter motor 12 to be electrically turned on in order to rotate the pinion gear 13 at the time t1 when the engine restart request is issued in the second rotation speed range of the rotation speed Ne of the internal combustion engine 21. The ECU 20 judges that the rotation speed of the pinion gear 13 is synchronized with the rotation speed of the ring gear 23 at the time t2 when the difference in rotation speed between the ring gear 23 and the pinion gear 13 is within a range of ±200 rpm. The ECU 20 drives the electromagnetic actuator 14 to be electrically turned on and drives the starter 11 to start the cranking in which the pinion gear 13 is completely meshed with the ring gear 23 in order to restart the internal combustion engine 21. The difference in rotation speed between the ring gear 23 and the pinion gear 13 is equal in meaning to the difference of the rotation speed which is a reduced value of the crank shaft 22.

The above pre-gear synchronizing control makes it possible to decrease the delay counted from the time when the engine restart request is issued to the time when the internal combustion engine 21 is restarted while smoothly meshing the pinion gear 13 with the ring gear 23 and suppressing gear meshing noise from being generated.

Further, the above engine start control does not need to detect the rotation speed of the pinion gear 13 and the ring gear 23 with high accuracy when the ECU 20 judges the synchronization in rotation speed between the pinion gear 13 and the ring gear 23. It is thereby possible for the control device to be equipped with a usual rotation speed sensor without any expensive crank angle sensor and rotation speed sensor with high accuracy. This feature can reduce the manufacturing cost which is a recent important technical issue.

In the fifth embodiment described above in detail, the ring gear is 300 mm in diameter (outer diameter of tooth tip) and the pinion gear 13 is 30 mm in diameter (outer diameter of tooth tip). For example, when the ring gear rotates at the rotation speed of 300 rpm, and the pinion gear 13 rotates at the rotation speed of 1000 rpm, the difference in rotation speed between the ring gear 23 and the pinion gear 13 is 200 rpm, where the difference in rotation speed is the different value which is a reduced value of the rotation speed of the crank shaft 22. Because the ring gear 23 is 300 mm in diameter and rotates at 300 rpm, the circumferential speed at the pitch circle (as a virtual circle which is contacted with the tooth of the pinion gear 13) of the ring gear 23 is approximately 4.7 m/sec.

Further, because the pinion gear 13 is 30 mm in diameter, and rotates at 1000 rpm, the circumferential speed at the pitch circle (as a virtual circle which is contacted with the tooth of the ring gear 23) of the pinion gear 13 is approximately 1.6 m/sec. The difference in circumferential speed between the pitch circle of the ring gear 23 and the pitch circle of the pinion gear 13 is approximately 3.1 m/sec. The following condition (f1) is therefore equal to the following condition (f2):

(f1) The difference in rotation speed between the ring gear 23 and the pinion gear 13 is within a range of ±200 rpm; and
(f2) The difference in circumferential speed between the pitch circle of the ring gear 13 and the pitch circle of the pinion gear 13 is within a range of ±3.1 m/sec.

As previously described in the explanation of the first embodiment, the inventors of the present invention did the experiment of detecting gear meshing noise when the pinion gear 13 is meshed with the ring gear 23.

The experiment detected gear meshing noise generated between the ring gear 13 of 300 mm diameter and the pinion gear 13 of 30 mm diameter by changing the difference in rotation speed between the ring gear 23 and the pinion gear 13 which are meshed together. The gear meshing noise was detected by a microphone which was separated in distance from the pinion gear 13 and the ring gear 23.

The experimental results clearly show that it is possible to adequately reduce the gear meshing noise when the pinion gear 13 is meshed with the ring gear 23 under the following conditions:

(g1) The difference in rotation speed between the ring gear 23 and the pinion gear 13 is within a range of ±250 rpm; and
(g2) More preferably, the difference in rotation speed between the ring gear 23 and the pinion gear 13 is within a range of ±200 rpm (that is, the difference in circumferential speed between the pitch circle of the pinion gear 13 and the pitch circle of the ring gear 23 is within a range of ±3.1 m/sec).

The rotation power of the starter motor 12 is transmitted to the pinion gear 13 in the direction of rotation of the internal combustion engine 21. In a system in which a one-way clutch is placed between the pinion gear 13 and the starter motor 12, it is acceptable for the ECU 20 to judge that the rotation speed of the pinion gear 13 is synchronized with the rotation speed of the ring gear 23 when the rotation speed of the ring gear 23 is higher than the rotation speed of the pinion gear 13 and a difference in rotation speed between the ring gear 23 and the pinion gear 13 is not more than a predetermined value (e.g. 200 rpm) while the ECU 20 executes the pre-gear synchronizing control.

The following condition (f1) is therefore equal to the following condition (f2):
(f1) The difference in rotation speed between the ring gear 23 and the pinion gear 13 is within a range of ±200 rpm; and
(f2) The difference in circumferential speed between the pitch circle of the ring gear 13 and the pitch circle of the pinion gear 13 is within a range of ±3.1 m/sec.

In the case when the ECU 20 judges that the rotation speed of the pinion gear 13 is synchronized with the rotation speed of the ring gear 23, the pinion gear 13 is meshed with the ring gear 23 when the rotation speed of the ring gear 23 is higher than that of the pinion gear 13. It is thereby possible for the one-way clutch to race in order to release a shock applied to the starter 11 when the pinion gear 13 is meshed with the ring gear 23. After this step, the rotation speed of the internal combustion engine 21 (or the rotation speed of the ring gear 23) is decreased by friction, and the rotation speed of the starter motor 12 (or the rotation speed of the pinion gear 13) is increased. When the difference in rotation speed between the ring gear 23 and the pinion gear 13 is thereby zero, the one-way clutch is locked, and the rotation power of the starter motor 12 is transmitted to the pinion gear 13. These steps can smoothly mesh the pinion gear 13 with the ring gear 23 without generating gear meshing noise and suppressing shock to the components of the starter motor 11 from being decreased. This can improve and maintain the durability of the components such as the ring gear 23 and the pinion gear 13 of the starter 11.

<Pre-Gear Meshing Control>

While the rotation speed of the internal combustion engine 21 is dropping due to the automatic engine stop control, when the engine restart request is issued in the third rotation speed range in which the rotation speed Ne of the internal combustion engine 21 is lower than the third rotation speed range which is lower than the second rotation speed N2, the ECU 20 executes a pre-gear meshing control because the rotation speed of the ring gear 23 is low, and the ECU 20 judges that it is possible to smoothly mesh the pinion gear 13 with the ring gear 23 without performing any synchronization between the pinion gear 13 and the ring gear 23.

In the pre-gear meshing control, the ECU 20 in the control device executes the following control. After the ECU 20 drives the electromagnetic actuator 14 to mesh the pinion gear 13 with the ring gear 23 or during the gear meshing operation of the pinion gear 13 and the ring gear 23 by the electromagnetic actuator 14, the ECU 20 drives the starter motor 12 to rotate the pinion gear 13 in order to restart the internal combustion engine 21 by performing the cranking.

Specifically, as shown in FIG. 4, the ECU 20 drives the electromagnetic actuator 14 to be electrically turned on at the time t3 in order to mesh the pinion gear 13 with the ring gear 23. After completion of the gear meshing between them at the time t4 or during the gear meshing operation of the pinion gear 13 and the ring gear 23 by the electromagnetic actuator 14, the electric power is supplied to the starter 11 in order to start the cranking and the internal combustion engine 21 is thereby restarted.

The third engine restart control described above makes it possible to avoid the synchronization in rotation speed between the pinion gear 13 and the ring gear 23 while the pinion gear 13 is smoothly meshed with the ring gear 23 and preventing or suppressing gear meshing noise from being generated. This makes it possible to rapidly perform the cranking by the starter 11 and rapidly restart the internal combustion engine 21, and decrease the power consumption of the starter 11.

When the internal combustion engine 21 is restarted, the ECU 20 estimates the rotation speed Ne of the internal combustion engine 21 by referring to a map showing the relationship between a rotation speed Ne of the internal combustion engine 21 and an elapsed time period counted from the time when the engine restart request is issued. This estimated rotation speed Ne of the internal combustion engine 21 corresponds to the elapsed period of time which is counted from the time when the automatic engine stop request (or the combustion stop request of the internal combustion engine 21) occurs. This map is made in advance on the basis of the experimental data items and statistical data items, and stored in the memory device such as a read only memory (ROM).

In general, because the rotation speed Ne of the internal combustion engine 21 is gradually decreased according to the elapsed time period counted from the time when the combustion of the internal combustion engine 21 is stopped, it is possible to easily estimate the rotation speed Ne of the internal combustion engine 21 on the basis of the elapsed time period counted from the time when the automatic engine stop request is issued.

Still further, the rotation speed of the pinion gear 13 is estimated or calculated corresponding to the relationship between the period of time to supply the electric power to the starter motor 12 and the magnitude of a current flowing through the starter motor 12 by referring the rotation speed map of the pinion gear 13 which shows the relationship between parameters such as the power supplying period of time to the starter motor 13 and the magnitude of current to be supplied (such as a duty ratio). This rotation speed map is made in advance on the basis of experimental data items and design data items. The rotation speed map is stored in the ROM in the ECU 20.

In general, the rotation speed of the starter motor 12 is increased according to the elapsed period of time counted from the time when the electric power is supplied to the starter motor 12, and the rotation speed of the pinion gear 13 is thereby increased. The more the current to be supplied to the starter motor 12 is increased, the more the rotation speed of the starter motor 12 is increased and the more the rotation speed of the pinion gear 23 is thereby increased. It is therefore possible to estimate the rotation speed of the pinion gear 13 on the basis of the electric power supplying period of time and the magnitude of the supplying current to the starter motor 12.

<Pre-Set Control>

In the case where no engine restart request is issued while the rotation speed of the internal combustion engine 21 is dropping due to the automatic engine stop, when the rotation speed Ne of the internal combustion engine is decreased to the third rotation speed N3 (N3 N2), the ECU 20 executes the pre-set control. In the pre-set control, the ECU 20 drives the electromagnetic actuator 14 to mesh the pinion gear 13 with the ring gear 23 when the rotation speed Ne of the internal combustion engine is dropped to the third rotation speed N3. After this, the ECU 20 drives the starter motor 12 to rotate the pinion gear 13 and drives the starter 11 to perform the cranking in order to restart the internal combustion engine 21.

This makes it possible only to rotate the pinion gear 13 when the engine restart request is issued. Accordingly, it is possible to decrease the time period necessary to push the pinion gear 13 when compared with the case where the ECU 20 drives the electromagnetic actuator 14 to push the pinion gear 13 and drives the starter motor 12 to rotate the pinion gear 13 after the engine restart request is issued. This makes it possible for the ECU 20 to quickly restart the internal combustion engine 21.

FIG. 12 is a timing chart showing the engine restart control performed by the ECU 20 in the control device according to the fifth embodiment.

The execution of the pre-set control makes it possible to mesh the pinion gear 13 with the ring gear 23 before the engine speed oscillating period immediately before the rotation speed of the internal combustion engine 21 completely stops. During the engine speed oscillating period, the rotation speed Ne of the internal combustion engine 21 is oscillated, that is, increased and decreased (see FIG. 12).

This control makes it possible to avoid the gear meshing between the pinion gear and the ring gear 23 from being performed during the engine speed oscillating period, and thereby to avoid the starter 11 from being damaged and gear meshing noise from generating. The ECU 20 drives the starter 11 to start the cranking in order to quickly restart the internal combustion engine 21 when the engine restart request is issued after the rotation speed Ne of the internal combustion engine 21 is decreased to not more than the third rotation speed N3.

As described above, the ECU 20 executes the engine restart control routine of restarting the internal combustion engine 21 shown in FIG. 13.

FIG. 13 is a flow chart showing the engine restart control routine executed by the ECU 20 in the control device according to the fifth embodiment.

A description will now be given of the engine restart control routine according to the fifth embodiment with reference to FIG. 13.

The ECU 20 periodically executes the engine restart control routine shown in FIG. 13 with a predetermined period of time during the power-on period of the ECU 20.

First, in step S101, the ECU 20 detects whether or not the current state of the internal combustion engine 21 is under the automatic engine stop control (for example, whether or not the current is within the time period counted from the time when the engine combustion stops to the time when the engine restarts).

When the detection result in step S101 indicates that the internal combustion engine 21 is not under the automatic engine stop control ("NO" in step S101), the ECU 20 completes the engine restart control routine without performing following steps other than step S101 shown in FIG. 13.

On the other hand, when the detection result shows that the ECU 20 is executing the automatic engine stop control ("YES" in step S101), the operation flow goes to step S111. In step S111, the ECU 20 detects whether or not the current rotation speed Ne of the internal combustion engine 21 is higher than the third rotation speed N3 (e.g. 100 rpm).

When the detection result in step S111 indicates that the current rotation speed Ne of the internal combustion engine 21 is higher than the third rotation speed N3, the operation flow goes to step S102.

In step S102, the ECU 20 detects whether or not the engine restart request is issued. When the detection result in step S102 indicates that the engine restart request is issued, the operation flow goes to step S103. In step S103, the ECU 20 detects whether or not the current engine speed of the internal combustion engine 21 is higher than the first rotation speed N1. That is, in step S103, the ECU 20 detects whether or not the current rotation speed Ne of the internal combustion engine 21 is within the first rotation speed range.

For example, the first rotation speed N1 has a value within the range of 300 to 700 rpm. As in the case for the first embodiment, the ECU 20 in the control device according to the fifth embodiment uses the first rotation speed N1 of 500 rpm.

When the rotation speed Ne of the internal combustion engine 21 is higher than the first rotation speed N1 while the rotation speed of the internal combustion engine is dropping, the internal combustion engine 21 can be restarted without performing the cranking and only by restarting its combustion (only by performing its fuel injection and ignition). The current rotation speed Ne is within the range allow to restart the internal combustion engine 21 only by performing the fuel injection and ignition without performing the cranking by the starter 11 because the current rotation speed Ne of the internal combustion engine 21 is higher than the first rotation speed N1 when a value within the rotation speed range of 300 to 700 rpm is set to the first rotation speed N1.

When the judgment result in step S103 indicates that the current rotation speed Ne of the internal combustion engine is higher than the first rotation speed N1, (that is, when the engine restart request is issued when the current rotation speed Ne is within the first rotation speed range), the ECU 20 judges for the internal combustion engine 21 to be restarted without performing the cranking by the starter 11. The operation flow progresses to step S104 (which executes the engine self-restart control).

In step S104, the ECU 20 executes the engine self-restart control in which the ECU 20 performs the fuel injection and ignition in order to restart the internal combustion engine 21 without performing the cranking by the starter 11.

After this, the operation flow goes to step S105. In step S105, the ECU 20 detects whether or not the internal combustion engine 21 is restarted on the basis of the current rotation speed Ne of the internal combustion engine 21. That is, the ECU 20 detects whether or not the current rotation speed Ne of the internal combustion engine 21 exceeds the engine restart completion judgment value Nsc (see FIG. 14).

When the detection result in step S105 indicates that the internal combustion engine 21 is not restarted, the operation flow is returned to step S103. In step S103, the ECU 20 continues the execution of the engine self-restart control when the current rotation speed Ne of the internal combustion engine 21 is still within the first rotation speed range (steps S103 and S104). After this, when the ECU 20 detects that the internal combustion engine 21 has been restarted in step S105, the ECU 20 completes the engine restart control routine shown in FIG. 5.

On the other hand, when the detection result in step S103 indicates that the current rotation speed Ne of the internal combustion engine 21 is not more than the first rotation speed N1, the operation flow goes to step S106.

In step S106, the ECU 20 detects whether or not the current rotation speed Ne of the internal combustion engine 21 is higher than the second rotation speed N2. This detects whether the current rotation speed Ne of the internal combustion engine 21 is within the second rotation speed range or within the third rotation speed range.

In the fifth embodiment, as in the case for the first embodiment, this second rotation speed N2 is within a range of 50 rpm to 450 rpm (the second rotation speed N2 is 250 rpm in the fifth embodiment).

When the rotation speed Ne of the internal combustion engine 21 is decreased to not more than the second rotation speed N2 while the rotation speed of the internal combustion engine 21 is dropping due to the automatic engine stop, it is possible to smoothly mesh the pinion gear 13 with the ring gear 23 without synchronizing the rotation speed of the pinion gear 13 with the rotation speed of the ring gear 23. That is, it is possible to smoothly mesh the pinion gear 13 with the ring gear 23 without synchronizing the rotation speed of the pinion gear 13 to the rotation speed of the ring gear 23 when a value within the range of 50 rpm to 450 rpm is set as the second rotation speed N2. In this case, the third rotation speed range which is not more than the second rotation speed N2 (within the range of 50 rpm to 450 rpm) is the range capable of smoothly meshing the pinion gear 13 with the ring gear 23 without synchronizing the rotation speed of the pinion gear 13 with the rotation speed of the ring gear 23.

In step S106, when detecting that the current rotation speed Ne of the internal combustion engine 21 is higher than the second rotation speed N2 (when the engine restart request is issued while the current rotation speed Ne of the internal combustion engine 21 is within the second rotation speed range), the ECU 20 judges it is difficult to smoothly mesh the pinion gear 13 with the ring gear 23 unless the gear synchronization between the pinion gear 13 and the ring gear 23 is performed because the rotation speed of the ring gear 23 is relatively high. The operation flow thereby goes to step S107. In step S107, the ECU 20 executes the pre-gear synchronizing control.

In the pre-gear synchronizing control, the ECU 20 calculates the elapsed time period counted from the time when the automatic engine stop occurs to the time when the rotation speed of the pinion gear 23 is synchronized with the rotation speed of the ring gear 13 on the basis of the map regarding the rotation speed Ne and the map regarding the rotation speed of the pinion gear 13.

The ECU 20 drives the starter motor 12 to rotate the pinion gear 13 when the automatic engine stop request is issued, and drives the electromagnetic actuator 14 to push the pinion gear 13 to the ring gear 23 in order to mesh the pinion gear 13 with the ring gear 23 at the time to reach the elapsed time period calculated above.

This makes it possible for the starter motor 12 to synchronizing the rotation speed of the pinion gear 13 with the ring gear 23 in order to decrease a difference in rotation speed between these gears 13 and 23. After this, the electromagnetic actuator 14 meshes the pinion gear 13 with the ring gear 23, and the starter 11 starts the cranking. This restarts the operation of the internal combustion engine 21.

After this, the operation flow progresses to step S108. In step S108, the ECU 20 detects whether or not the engine start is completed. When the detection result in step S108 indicates the internal combustion engine 21 has restarted ("YES" in step S108), the ECU 20 completes the engine restart control shown in FIG. 13.

On the other hand, when the detection result in step S108 indicates the internal combustion engine 21 has not restarted ("NO" in step S108), the operation flow goes to step S109. In step S109, the ECU 20 executes the pre-gear meshing control.

By the way, in step S106, when the detection result in step S106 indicates that the current rotation speed Ne of the internal combustion engine 21 is not less than the second rotation speed N2 (that is, when the engine restart request is issued while the current rotation speed Ne of the internal combustion engine 21 is within the third rotation speed range), the ECU 20 judges that it is possible to smoothly mesh the pinion gear 13 with the ring gear 23 without performing any gear synchronization in which the rotation speed of the pinion gear 13 is synchronized with the rotation speed of the ring gear 23 because the rotation speed of the ring gear 23 is relatively low. The operation step progresses to step S109. In step S109, the ECU 20 executes the pre-gear meshing control. In the pre-gear meshing control, the ECU 20 drives the electromagnetic actuator 14 to mesh the pinion gear with the ring gear 23 when the automatic engine stop request is issued. That is, the pinion gear 13 is pushed in the direction of the ring gear 23 side by the electromagnetic actuator 14 in order to mesh them. The ECU 20 drives the starter motor 12 to rotate the pinion gear 13 in order to perform the cranking by the starter 11 after or during the gear meshing process. This restarts the internal combustion engine 21.

After this, the operation flow goes to step S110, the ECU 20 detects whether or not the engine restart operation is completed. When the detection result in step S110 indicates that the engine restart operation has not already be done ("NO" in step S110), the operation flow returns to step S109.

On the other hand, when the detection result in step S110 indicates that the engine restart operation has already be done ("YES" in step S110), the ECU 20 completes the engine restart control routine shown in FIG. 13.

When the detection result in step S102 indicates that the current rotation speed Ne of the internal combustion engine 21 is not less than the third rotation speed N3 (that is, when the current rotation speed Ne of the internal combustion engine 21 is decreased to not more than the third rotation speed N3 without occurring the engine restart request) the operation flow goes to step S112 (which corresponds to the pre-set control means). In step S112, the ECU 20 executes the pre-set control.

In the pre-set control, the ECU 20 drives the electromagnetic actuator 14 to mesh the pinion gear 13 with the ring gear 23 when the current rotation speed Ne of the internal combustion engine 21 is decreased to the third rotation speed N3. After this, the ECU 20 drives the starter motor 12 to rotate the pinion gear 13 and drives the starter 11 to perform the cranking in order to restart the internal combustion engine 21 when the engine restart request is issued.

In summary, when the engine restart request is issued while the rotation speed Ne of the internal combustion engine 21 is dropping due to the automatic engine stop in the engine restart control process shown in FIG. 13, the ECU 20 executes:

(h1) the engine self-restart control when the rotation speed Ne of the internal combustion engine is within the first rotation speed range;

(h2) the pre-gear synchronizing control when the rotation speed Ne of the internal combustion engine is within the second rotation speed range; or (h3) the pre-gear meshing control when the rotation speed Ne of the internal combustion engine is within the third rotation speed range.

Further, the ECU 20 executes (h4) the pre-set control when no engine restart request is issued while the rotation speed Ne of the internal combustion engine 21 is dropping due to the automatic engine stop.

It is thereby possible for the ECU 20 in the control device according to the present invention to execute the optimum engine restart control according to the rotation speed Ne of the internal combustion engine when the engine restart request is issued while the rotation speed of the internal combustion engine 21 is dropping due to the automatic engine stop control. This makes it possible to prevent the engine restart from being delayed when the engine restart request is issued, and gear meshing noise from being generated, and the electric power consumption of the starter 11 from being decreased.

In the engine restart control process shown in FIG. 13, when performing the engine restart control, the ECU 20 estimates the rotation speed of the internal combustion engine 21 on the basis of the elapsed time period counted from the time when the automatic engine stop request (or when the combustion of the internal combustion engine 21 is stopped). This makes it possible for the control device to avoid using any expensive crank angle sensor capable of detecting the rotation speed Ne when the rotation speed Ne is dropping due to the automatic engine stop. Further, because the ECU 20 estimates the rotation speed Ne of the pinion gear 13 on the basis of the current supplying period to supply current into the starter motor 12 and the magnitude of the current. It is thereby possible to avoid any sensor capable of detecting the rotation speed of the starter motor 12 (or the rotation speed of the pinion gear 13). This makes it possible to decrease the manufacturing cost which is one of important technical problems to be solved.

However, there is a possibility of causing failure of the engine restart even if the ECU 20 executes the engine self-restart control because a desired combustion cannot be done. In particular, there is a possibility of causing failure when the rotation speed Ne of the internal combustion engine 21 is rapidly dropped. When the engine restart failure occurs during the execution of the engine restart control shown in FIG. 13, the ECU 20 executes the pre-gear synchronizing control when the rotation speed Ne of the internal combustion engine 21 is dropped to a value within the second rotation speed range.

Figure 14:
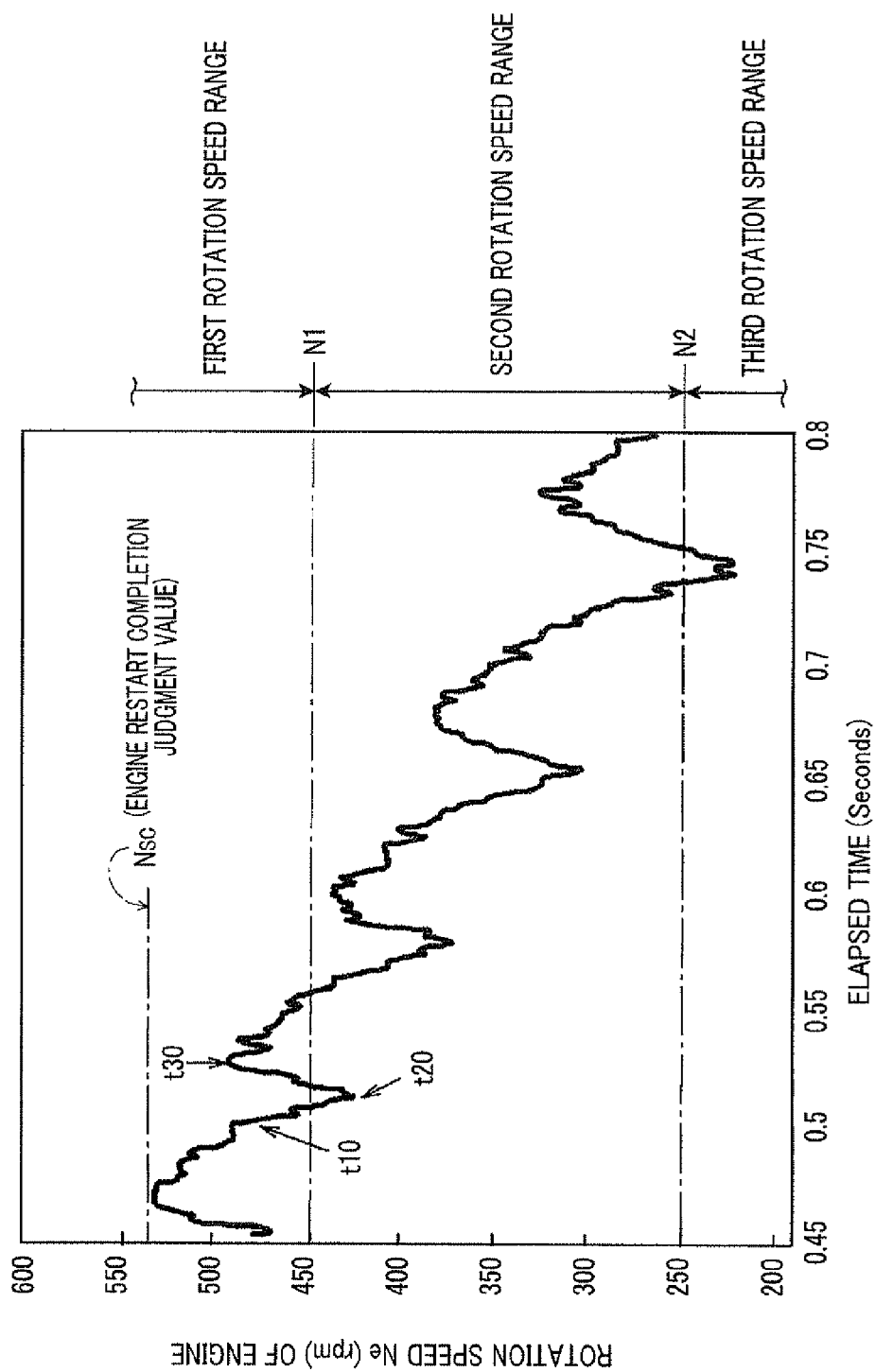
FIG. 14 is a timing chart showing a state in which the rotation speed of the internal combustion engine is oscillated, namely, increased and decreased after an engine restart failure occurs during the engine restart control.

However, the following problem also occurs. FIG. 14 is a timing chart showing a state in which the rotation speed Ne of the internal combustion engine 21 is oscillated and gradually decreased after the engine restart failure occurs under the engine self-restart control.

As shown in FIG. 14, the rotation speed Ne of the internal combustion engine 21 is oscillated by increasing and decreasing after the automatic engine stop. In the case in which the ECU 20 executes the engine self-restart control and then fails in this engine restart while the rotation speed Ne of the internal combustion engine 21 is within the first rotation speed range, when the ECU 20 executes the pre-gear synchronizing control at the time t20 when the rotation speed Ne of the internal combustion engine 21 is within the second rotation speed range, there is a possibility that the rotation speed Ne of the internal combustion engine 21 is higher than the second rotation speed range at the time when the electromagnetic actuator 14 to push the pinion gear 13 to the ring gear 23 during the pre-gear synchronizing control. In this situation, because the rotation speed of the ring gear 23 is higher than the rotation speed of the pinion gear 13 (in the state of not reaching any gear synchronization) and the pinion gear 13 is pushed to the ring gear 23 in order to perform the gear meshing operation, it is difficult to smoothly mesh the pinion gear 13 with the ring gear 23. This causes severe damage to both the ring gear 23 and the pinion gear 13.

In addition, there is a possibility of causing the gear meshing failure between the pinion gear 13 and the ring gear 23 even if the ECU 20 executes one of the pre-gear synchronizing control, the pre-gear meshing control, and the pre-set control.

Because the rotation speed Ne of the internal combustion engine 21 is fluctuated immediately after the failure of these controls, it is difficult for the ECU 20 to estimate the current rotation speed Ne of the internal combustion engine 21. Still further, it is difficult for the ECU 20 to detect the rotation speed of the starter motor because the starter motor 12 rotates by its inertia.

By the way, it is possible to easily detect the rotation speed of the starter motor 12 on the basis of the elapsed time period counted form the start to supply the electric power to the starter motor 12 only when the starter motor 12 starts to rotate after stopped.

It is therefore difficult to synchronize the rotation speed of the pinion gear 13 with the rotation speed of the ring gear 23 by the pre-gear synchronizing control while the rotation speed of the internal combustion engine 21 is dropping or the starter motor rotates by its inertia after the gear meshing failure occurs under the pre-gear synchronizing control.

Further, there is a possibility for the ECU 20 to drive the electromagnetic actuator 14 to push the pinion gear 13 to the ring gear 23 while the rotation speed Ne of the internal combustion engine 21 is within the second rotation speed range when the ECU 20 executes the pre-gear meshing control:

(i1) while the rotation speed of the internal combustion engine 21 is dropping after the gear-meshing failure occurs under the pre-gear synchronizing control or the pre-gear meshing control; or (i2) while the starter motor 12 rotates in its inertia after the above gear meshing failure occurs.

Still further, there is a possibility for the ECU 20 to drive the electromagnetic actuator 14 to push the pinion gear 13 to the ring gear 23 during a time period having a large difference in rotation speed between the pinion gear 13 and the ring gear 23 when the ECU 20 executes the pre-set control:

(j1) while the rotation speed of the internal combustion engine 21 is dropping after the gear-meshing failure occurs under the pre-set control; or (j2) while the starter motor 12 rotates in its inertia after the above gear-meshing failure occurs.

When the engine restart failure occurs under the engine self-restart control or the gear meshing failure occurs under the pre-gear synchronizing control or the pre-gear meshing control, the ECU 20 in the control device according to the fifth embodiment prohibits or halts the engine self-restart control, the pre-gear synchronizing control, and the pre-gear meshing control from being executed during a time period counted from the time when the engine restart failure or the gear meshing failure is detected to the time when the rotation speed Ne of the internal combustion engine 21 decreased to zero. After this, the ECU 20 executes the pre-gear meshing control at the time when the rotation speed Ne of the internal combustion engine 21 reaches zero (Ne=0).

When the gear meshing failure occurs under the pre-set control, the ECU 20 prohibits the execution of the pre-set control during the time period counted from the time when the gear meshing failure occurs to the time when the rotation speed Ne of the internal combustion engine 21 reaches zero (Ne=0).

Figure 15:
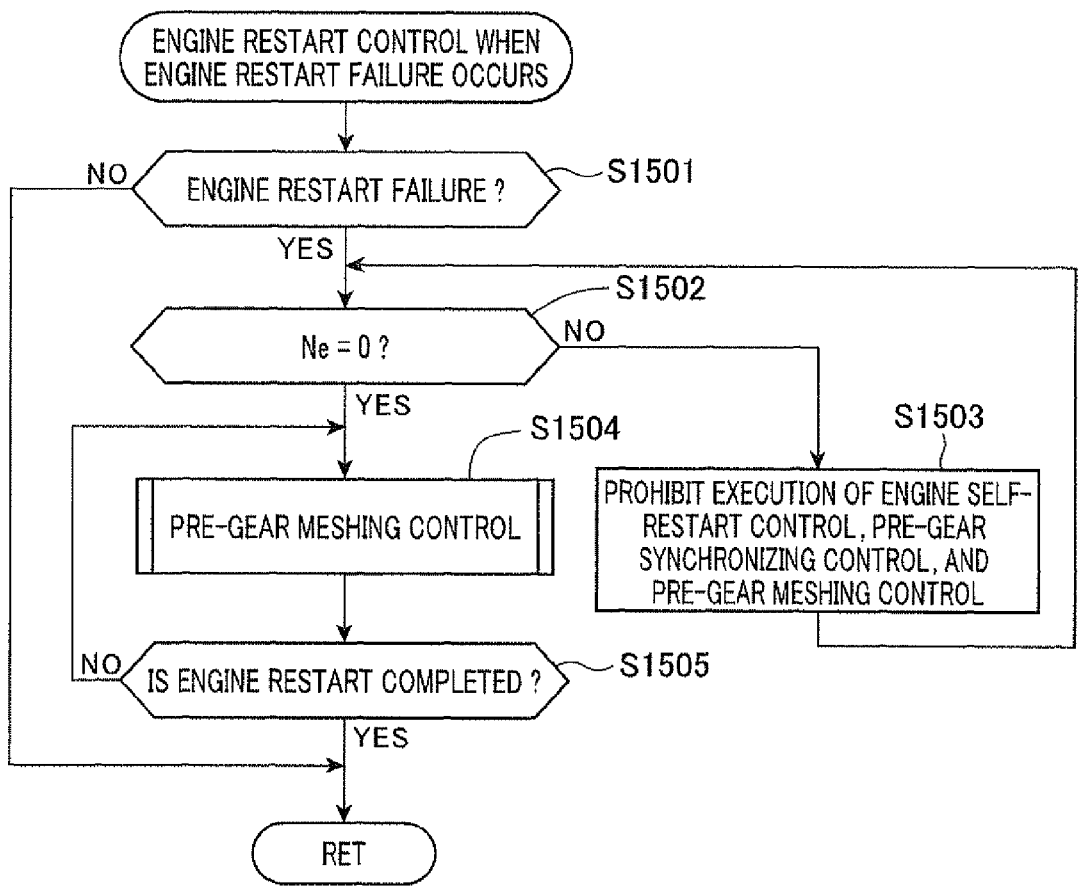
FIG. 15 is a flow chart showing the engine restart control routine executed by the control device according to the fifth embodiment of the present invention when an engine restart failure occurs during the engine restart control.

The ECU 20 executes the engine restart control routine shown in FIG. 15 when the above failures occur.

A description will now be given of the engine restart control routine when the failure occurs.

The ECU 20 executes the engine restart control routine shown in FIG. 15 when the various types of failure occurs under the engine self-restart control, the pre-gear synchronizing control, and the pre-gear meshing control.

On the other hand, the ECU 20 executes other control routine, which is described later, when a failure occurs under the pre-set control.

The ECU 20 repeatedly executes the engine restart control routine shown in FIG. 15 at a predetermined time interval during the turned-on state of the ECU 20 when a failure occurs under the various types of control.

FIG. 15 is a flow chart showing the engine restart control routine executed by the ECU 20 in the control device according to the fifth embodiment when a failure of the engine restart by the engine self-restart control occurs.

When the ECU 20 starts to execute the engine restart control routine shown in FIG. 15, the ECU 20 detects in step S1501 (which corresponds to a detection means) whether or not the engine restart failure occurs under the engine self-restart control, the pre-gear synchronizing control, or the pre-gear meshing control occurs. For example, the ECU 20 detects the occurrence of the engine restart failure when the rotation speed Ne of the internal combustion engine 21 does not exceed the engine restart completion judgment value Nsc:

(k1) until a predetermined time period is elapsed after the ECU 20 starts to execute the engine self-restart control;

(k2) until a predetermined time period is elapsed after the ECU 20 starts to execute the pre-gear synchronizing control; or (k3) until a predetermined time period is elapsed after the ECU 20 starts to execute the pre-gear meshing control.

In the above case, the engine restart failure detection time corresponds to the time when the predetermined time period is elapsed when the ECU 20 detects the occurrence of the failure.

When the detection result in step S1501 indicates that the ECU 20 detects no engine restart failure ("NO" in step S1501), the ECU 20 completes the engine restart control routine shown in FIG. 15 without performing step S1502, step S1503, step S1504, and step S1505.

On the other hand, when the detection result in step S1501 indicates that the ECU 20 detects that a failure of the engine restart occurs ("YES" in step S1501), the operation flow goes to step S1502. In step S1502, the ECU 20 detects whether or not the current rotation speed Ne of the internal combustion engine 21 is decreased and finally reaches zero (Ne=0). In the fifth embodiment, it is possible for the ECU 20 to detect the rotation speed Ne of the internal combustion engine 21 on the basis of a detection signal transferred from a crank angle sensor (not shown). The crank angle sensor is capable of detecting the crank angle of the crank shaft 22 of the internal combustion engine 21. Further, it is also possible for the ECU 20 to detect the rotation speed Ne of the internal combustion engine 21 on the basis of the time which is elapsed by an adequately time period (e.g. 3 seconds) counted from the failure detection time.

When the detection result in step S1502 indicates that the current rotation speed Ne of the internal combustion engine 21 is not equal to zero ("NO" in step S1502), the operation flow goes to step S1503. In step 1503, the ECU 20 prohibits the execution of the engine self-restart control (which corresponds to step S104 shown in FIG. 13), the pre-gear synchronizing control (which corresponds to step S107 shown in FIG. 13), and the pre-gear meshing control (which corresponds to step S109 shown in FIG. 13). The operation flow then returns to step S1502.

On the other hand, when the detection result in step S1502 indicates that the current rotation speed Ne of the internal combustion engine 21 is zero (Ne=0, "YES" in step S1502), the operation flow goes to step S1504. In step S1504, as in the case for step S109 shown in FIG. 13, the ECU 20 executes the pre-gear meshing control. That is, the step S1504 corresponds to step S109 shown in FIG. 13. Specifically, in step S1504, the ECU 20 drives the electromagnetic actuator 14 to be turned on when the rotation speed Ne of the internal combustion engine 21 is zero (Ne=0), and to push the pinion gear 13 to the ring gear 23 in order to make the gear engagement between these gears 13 and 23.

After this, the operation flow goes to step S1505. In step S1505, the ECU 20 detects whether or not the restart of the internal combustion engine 21 has been completed.

When the detection result in step S1505 indicates that no engine restart is completed ("NO" in step S1505), the operation flow returns to step S1504 in order to continue the execution of the pre-gear meshing control.

On the other hand, when the detection result in step S1505 indicates that no engine restart is completed ("YES" in step S1505), namely, the engine restart is completed, the ECU 20 completes the engine restart control shown in FIG. 15.

Next, a description will now be given of the routine which is executed when a failure of the pre-set control occurs with reference to FIG. 16.

Figure 16:
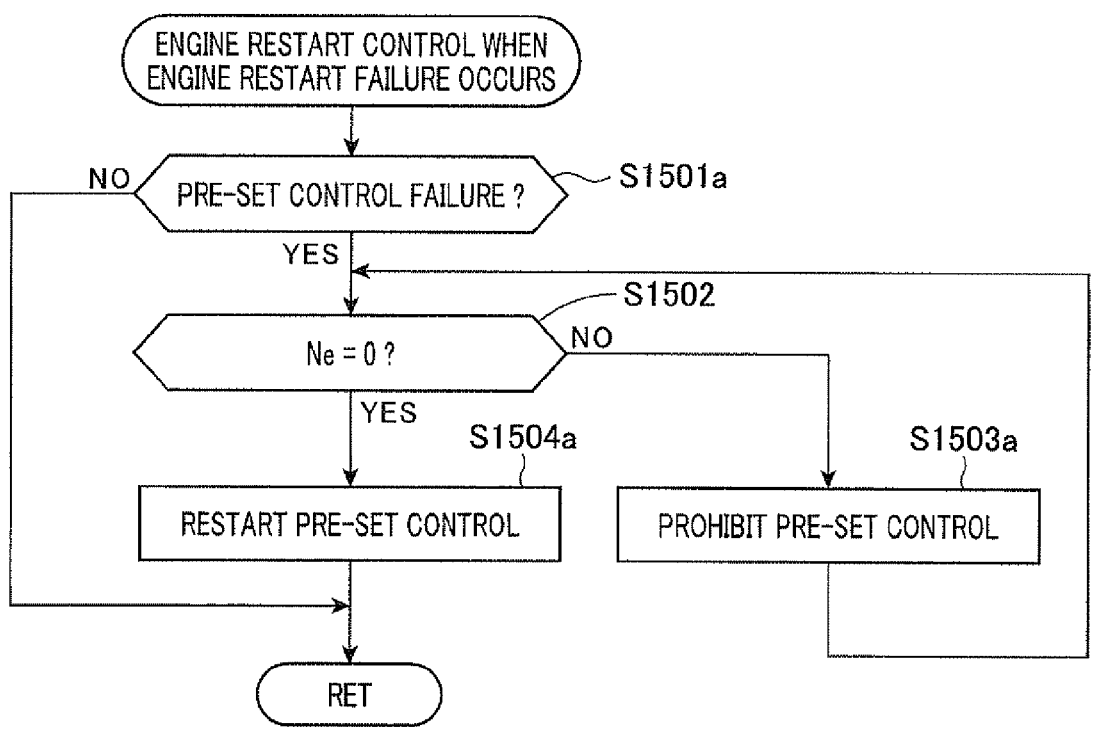
FIG. 16 is a flow chart showing an engine restart control routine executed by the control device according to the fifth embodiment of the present invention when an failure of a pre-gear meshing control occurs.

FIG. 16 is a flow chart showing the engine restart control routine executed by the control device according to the fifth embodiment when a pre-gear meshing control failure occurs;

The ECU 20 periodically executes the control routine shown in FIG. 16 with a predetermined period of time during the power-on of the ECU 20.

When the control routine shown in FIG. 16 is started, the ECU 20 detects whether or not a gear meshing failure (or a pre-set failure) occurs under the pre-set control (step S1501a). For example, a position sensor (not shown) is placed in the system shown in FIG. 1 in order to detect the position of the pinion gear 13. The ECU 20 detects whether or not the pre-set control is completed on the basis of the detection value of the position sensor, where the completion of the pre-set indicates that the pinion gear is pushed to a predetermined position.

When the detection result in step S1501a indicates that no pre-set failure occurs under the pre-set control ("NO" in step S1501a), the ECU 20 completes the control routine shown in FIG. 16 without executing the step S1502, step S1503a, and step S1504a.

On the other hand, when the detection result in step S1501a indicates that the pre-set failure occurs under the pre-set control ("YES" in step S1501a), the operation flow goes to step S1502.

In step s1502, the ECU 20 detects that the rotation speed Ne of the internal combustion engine 21 is decreased to zero (Ne=0) after the pre set failure occurs. It is sufficient for the ECU 20 to detect that the rotation speed Ne of the internal combustion engine 21 is decreased to zero (Ne=0) on the basis of the detection signal transferred from the crank angle sensor (not shown).

When the detection result in step S1502 indicates that the rotation speed Ne of the internal combustion engine 21 is not zero ("NO" in step S1502), the operation flow goes to step S1503a. In step S1503a, the ECU 20 prohibits or halts the execution of the pre-set control. The operation flow then returns to step S1502.

On the other hand, when the detection result in step S1502 indicates that the rotation speed Ne of the internal combustion engine 21 is zero (Ne=0, "YES" in step S1502), the operation flow goes to step S1504a. In step S1504a, the ECU 20 tries to execute the pre-set control again. Step S1504a corresponds to step S112 shown in FIG. 13. Specifically, the ECU 20 drives the electromagnetic actuator 14 to be electrically turned on. The electromagnetic actuator 14 then pushes the pinion gear 13 to the ring gear 23, that is, meshes the pinion gear 13 with the ring gear 23 when detecting that the rotation speed Ne of the internal combustion engine 21 is decreased to zero (Ne=0).

As described above, according to the fifth embodiment, when the engine restart failure occurs under the engine self-restart control, the pre-gear synchronizing control, and the pre-gear meshing control, the ECU 20 prohibits the execution of these control operations. This makes it possible to avoid a gear meshing problem from generating when the ECU 20 tries the engine restart again after the engine restart failure occurs, where the gear meshing problem indicates the difficulty of smoothly meshing the pinion gear 13 with the ring gear 23, and causing abrasion in and causing damage to the pinion gear 13 and the ring gear 23. Still further, it is possible to avoid a failure of the engine self-restart control from occurring immediately after occurrence of the engine restart failure by the engine self-restart control.

Still further, according to the fifth embodiment, because the ECU 20 automatically executes the engine restart by the pre-gear meshing control after the rotation speed Ne of the internal combustion engine 21 is decreased to zero, it is possible to execute the engine restart due to the engine restart request even if the engine restart failure occurs once.

Because the ECU 20 prohibits the execution of the pre-set control from being retried immediately after the gear meshing failure occurs under the pre-set control, it is possible to avoid the gear meshing problem from being occurring, where the gear meshing problem is the difficulty of smoothly meshing the pinion gear 13 with the ring gear 23, and causing abrasion of the pinion gear 13 and the ring gear 23, and causing damage to the pinion gear 13 and the ring gear 23 when the execution of the pre-set control is retried.

Sixth Embodiment

A description will now be given of the engine restart control routine shown in FIG. 17 which is executed by the ECU 20 in the control device according to the sixth embodiment of the present invention.

In the fifth embodiment, the ECU 20 automatically executes the engine restart under the pre-gear meshing control at the time when the rotation speed Ne of the internal combustion engine 21 is decreased to zero (Ne=0) after the engine restart failure occurs.

On the other hand, in the sixth embodiment, the ECU 20 prohibits or halts the automatic engine restart even if the rotation speed Ne of the internal combustion engine 21 is decreased to zero (Ne=0) after the engine restart failure occurs. The ECU 20 permits to execute the engine restart only when the driver of a vehicle performs the engine start operation after the rotation speed Ne of the internal combustion engine 21 is decreased to zero.

The ECU 20 in the control device according to the sixth embodiment executes the engine restart control routine shown in FIG. 17 after the engine restart failure occurs.

A description will now be given of the engine restart control routine when the engine restart failure occurs with reference to the flow chart shown in FIG. 17

FIG. 17 is a flow chart showing the engine restart control routine executed by the ECU 20 in the control device according to the sixth embodiment when an engine restart control failure occurs;

The ECU 20 periodically executes the engine restart control routine shown in FIG. 17 with a predetermined period of time during the power-on period of the ECU 20. In the flow chart shown in FIG. 17, the same steps in the flow chart shown in FIG. 15 will be designated with the same step numbers.

On starting the engine restart control routine shown in FIG. 17, the ECU 20 detects in step S1501 (which corresponds to a detection means) whether or not the engine restart failure occurs under the engine self-restart control, the pre-gear synchronizing control, or the pre-gear meshing control occurs.

When the detection result in step S1501 indicates that the ECU 20 detects no engine restart failure ("NO" in step S1501), the ECU 20 completes the engine restart control routine shown in FIG. 17 without performing step S1502, step S1503, step S1504, step S1505, step S1506, and step S1507.

On the other hand, when the detection result in step S1501 indicates that the ECU 20 detects the occurrence of the engine restart failure ("YES" in step S1501), the operation flow goes to step S1502. In step S1502, the ECU 20 detects whether or not the current rotation speed Ne of the internal combustion engine 21 is decreased and has then reached zero (Ne=0).

When the detection result in step S1502 indicates that the current rotation speed Ne of the internal combustion engine 21 is not equal to zero ("NO" in step S1502), the operation flow goes to step S1503. In step 1503, the ECU 20 prohibits the execution of the engine self-restart control, the pre-gear synchronizing control, and the pre-gear meshing control. The operation flow then returns to step S1502.

On the other hand, when the detection result in step S1502 indicates that the current rotation speed Ne of the internal combustion engine 21 is zero (Ne=0, "YES" in step S1502), the operation flow goes to step S1506. In step S1506, the ECU 20 does not execute any engine restart control until the driver of the vehicle performs the engine start operation.

For example, it is sufficient for the ECU 20 to detect the engine restart operation by the driver, for example, to detect the switching operation of the ignition switch from turn-off to turn-on.

The operation flow goes to step S1507. In step S1507, the ECU 20 detects whether or not the driver performs the engine start operation in order to restart the internal combustion engine 21.

When the detection result in step S1507 indicates that no engine restart operation occurs ("NO" in step S1507), the operation flow returns to step S1506.

On the other hand, when the detection result in step S1507 indicates that the driver of the vehicle performs the engine start operation ("YES" in step S1507), the operation flow returns to step S1508.

In step S1508, as in the case for step S104 shown in FIG. 13, the ECU 20 executes the pre-gear meshing control. Specifically, in step S1504, the ECU 20 drives the electromagnetic actuator 14 to be electrically turned-on when the rotation speed Ne of the internal combustion engine 21 is zero, and to push the pinion gear 13 to the ring gear 23 in order to make the gear engagement between these gears 13 and 23.

After this, the operation flow goes to step S1505. In step S1505, the ECU 20 detects whether or not the restart of the internal combustion engine 21 has been completed.

When the detection result in step S1505 indicates that no engine restart is completed ("NO" in step S1505), the operation flow returns to step S1504 in order to continue the execution of the pre-gear meshing control.

On the other hand, when the detection result in step S1505 indicates that no engine restart is completed ("YES" in step S1.505), namely, the engine restart has been completed, the ECU 20 completes the engine restart control shown in FIG. 17.

As described above, according to the sixth embodiment, when the engine restart failure occurs under the engine self-restart control, the pre-gear synchronizing control, or the pre-gear meshing control, the ECU 20 prohibits the execution of these control processes. As in the case for the effects of the fifth embodiment, this makes it possible to avoid a gear meshing problem from occurring when the ECU 20 tries again the engine restart after the engine restart failure occurs, where the gear meshing problem indicates the difficulty of smoothly meshing the pinion gear 13 with the ring gear 23, and causing abrasion in and causing damage to the pinion gear 13 and the ring gear 23. Still further, it is possible to avoid the engine restart failure under the engine self-restart control from occurring immediately after occurrence of the engine restart failure by the engine self-restart control.

In the engine restart control according to the fifth embodiment in which the ECU 20 executes the automatic engine restart when the rotation speed of the internal combustion engine 21 is zero after the engine restart failure occurs, as previously described, because a delay time period counted from the time when the engine restart request is issued to the time when the ECU 20 executes the second engine restart becomes a long value, this delay time period gives uncomfortable drive to the driver of the vehicle.

On the other hand, according to the engine restart control according to the sixth embodiment, the ECU 20 waits for the driver to execute the engine restart operation. That is, the ECU 20 prohibits or halts execution of the engine restart under the pre-gear meshing control until the driver of a vehicle performs the engine restart operation. This can increase driver comfort.

(Other Modifications)

The concept of the present invention is not limited by the fifth embodiment and the sixth embodiment. It is possible to optionally select and combine the components in the control devices according to the fifth embodiment and the sixth embodiment according to various demands.

When the engine restart request is issued while the rotation speed of the internal combustion engine is dropping due to the automatic engine stop, the control device, namely the ECU according to the fifth embodiment executes:

(h1) the engine self-restart control when the rotation speed of the internal combustion engine is within the first rotation speed range;

(h2) the pre-gear synchronizing control when the rotation speed Ne of the internal combustion engine is within the second rotation speed range; and (h3) the pre-gear meshing control when the rotation speed Ne of the internal combustion engine is within the third rotation speed range.

It is also possible to apply the control device to the engine restart system which does not execute the pre-gear synchronizing control, and executes the pre-gear meshing control when the rotation speed of the internal combustion engine is decreased within the third rotation speed range if the engine restart request is issued while the rotation speed of the internal combustion engine is within the second rotation speed range.

It is also possible to apply the control device to other engine restart system which does not execute the engine self-restart control, and executes the pre-gear synchronizing control when the rotation speed of the internal combustion engine is decreased within the second rotation speed range if the engine restart request is issued while the rotation speed of the internal combustion engine is within the first rotation speed range.

It is also possible to apply the control device to other engine restart system which does not execute the engine self-restart control and the pre-gear synchronizing control, and executes the pre-gear meshing control when the rotation speed of the internal combustion engine is decreased within the first rotation speed range if the engine restart request is issued while the rotation speed of the internal combustion engine is within the first rotation speed range or the second rotation speed range.

As previously described, it is possible for the ECU 20 to detect in step S1502 shown in FIG. 15 whether the rotation speed Ne of the internal combustion engine 21 is decreased to zero (Ne=0) on the basis of the elapsed time by an adequately time period (e.g. 3 seconds or more) counted from the failure detection time.

By the way, because the viscosity of engine oil increases due to the decreasing of the engine temperature, the driving friction of the internal combustion engine 21 is increased when the engine temperature decreases. Accordingly, the dropping rate of the rotation speed Ne of the internal combustion engine 21 is increased after the engine restart failure occurs. In this viewpoint, it is preferred for the ECU 20 to set the predetermined time period Tb so that the more the engine temperature decreases, the more the predetermined time period Tb is decreased. This makes it possible for the pre-gear meshing control in step S1504 to quickly restart the internal combustion engine 21 after occurrence of such an engine restart failure.

As previously described in detail, the ECU 20 executes the engine self-restart control, the pre-gear synchronizing control, and the pre-gear meshing control when an engine restart request is issued while the rotation speed of the internal combustion engine is dropping due to the automatic engine stop.

On the other hand, when the engine restart request is issued while the internal combustion engine 21 does not rotate, namely, is completely stopped, the ECU 20 executes the usual control in which the ECU 20 drives the electromagnetic actuator 14 to push the pinion gear 13 to the ring gear 23 in order to mesh the pinion gear 13 with the ring gear 23, and then drives the starter motor 12 to rotate the pinion gear 13 in order to restart the internal combustion engine 21.

However, there is an engine restart failure due to combustion failure caused by ignition failure, unexpected fuel injection failure, etc. It is possible for the ECU 20 to detect such an engine restart failure on the basis of the detection result whether or not the rotation speed Ne of the internal combustion engine 21 has reached a predetermined value after a predetermined time period is elapsed, which is counted from the engine restart. Further, it is acceptable for the ECU 20 to prohibit the execution of the normal engine restart control while the rotation speed Ne of the internal combustion engine 21 reaches zero after the above engine restart failure occurs.

The above control makes it possible for the ECU 20 to prohibit the usual engine restart control immediately after the usual engine failure restart occurs while the rotation speed of the internal combustion engine is dropping due to the automatic engine stop which has the difficulty of detecting the rotation speed Ne of the internal combustion engine 21 and the rotation speed of the starter motor 12 with high accuracy. This makes therefore it possible to smoothly perform the gear engagement between the pinion gear 13 and the ring gear 23 when the engine restart is tried again after the engine restart failure. This also makes it possible to avoid remarkable wear of the pinion gear 23 and the ring gear 23 and these gears 13 and 23 from being greatly damaged.

(Other Aspects and Features of the Present Invention)

The control device according to the first aspect of the present invention, as previously described, is comprised of at least the engine self-restart control means and the pre-gear meshing control means. When detecting the occurrence of an engine restart failure under the engine restart control performed by the engine self-restart control means, the control means drives the pre-gear meshing control means to execute the pre-gear meshing control when the predetermined time period is elapsed.

This makes it possible to smoothly mesh the pinion gear with the ring gear when the control means uses the predetermined time period which is an adequate time period enough to execute the engine restart control under the pre-gear meshing control by the pre-gear meshing control means when the rotation speed of the internal combustion engine is decreased within the third rotation speed range after the engine restart failure occurs.

Further, the control device according to the first aspect of the present invention, as previously described, is comprised of all the control means, that is, the engine self-restart control means, the pre-gear synchronizing control means, and the pre-gear meshing control means. When detecting the engine restart failure caused by the engine self-restart control means, the control means drives the pre-gear synchronizing control means to prohibit or halt the execution of the engine restart under the pre-gear synchronizing control until the predetermined time period is elapsed.

Because this control prohibits the execution of the pre-gear synchronizing control immediately when the engine self-restart failure occurs, it is possible to avoid the gear engagement between the pinion gear and the ring gear from being performed while the rotation speed of the pinion gear is not synchronized with the rotation speed of the ring gear at the time when the engine rotation speed increases to a value within the first rotation speed range after drops to a value within the second rotation speed range due to the engine restart failure caused by the engine self-restart control.

Further, the control device drives the pre-gear meshing control means to execute the pre-gear meshing control in order to execute the engine restart control at the time when the predetermined time period is elapsed, which is counted from the failure detection time. Accordingly, it is possible to smoothly mesh the pinion gear with the ring gear when the control device sets an adequate time period to the predetermined time period so that the pre-gear meshing control means executes the pre-gear meshing control in order to execute the engine restart control at the time, for example, when the engine rotation speed is decreased within the third rotation speed range after the engine restart failure occurs.

As described above, according to the control device of the first aspect of the present invention, even if the engine self-restart failure occurs under the engine self-restart control, it is possible for the control device to instruct the pre-gear meshing control means to smoothly mesh the pinion gear with the ring gear. This can avoid abrasion of the pinion gear and the ring gear from occurring, and the pinion gear and the ring gear from being damaged.

In the control device according to the first aspect of the present invention, when the temperature of the internal combustion engine more decreases, the control device more decreases the predetermined time period.

In general, the temperature of the internal combustion engine is more decreased, the viscosity of engine oil is more increased, and the engine driving friction is more increased. Accordingly, when an engine restart failure occurs under the engine self-restart control, the dropping rate of the rotation speed of the internal combustion engine more increases, in other words, the rate of decrease of the rotation speed thereof becomes fast.

In addition, because the rotation speed dropping rate is increased after an engine restart failure occurs under the pre-gear synchronizing control means, it is possible for the pre-gear meshing control means to execute the engine restart control under the pre-gear meshing control at an earlier time after this engine restart failure occurs. On the basis of this viewpoint, the control device according to the first aspect of the present invention more decreases the predetermined time period when the engine temperature more decreases.

In the control device according to the second aspect of the present invention, the control device is comprised of at least the engine self-restart control means and the pre-gear meshing control means. The pre-gear meshing control means executes the pre-gear meshing control in order to restart the internal combustion engine when the rotation speed of the internal combustion engine is decreased to the predetermined threshold value after the detection means detects the failure of the engine restart control executed by the engine self-restart control means.

This makes it possible to execute the engine restart control while decreasing the occurrence of the engine restart failure because the control device prohibits the execution of the engine self-restart control, and drives the pre-gear meshing control means to execute the pre-gear meshing control after a failure of the engine self-restart control occurs.

The control device according to the second aspect of the present invention has all the control means such as the engine self-restart control means, the pre-gear synchronizing control means, and the pre-gear meshing control means. The control device drives the pre-gear synchronizing control means to prohibit the execution of the engine restart under the pre-gear synchronizing control until the rotation speed of the internal combustion engine is decreased to less than the predetermined threshold value which is less than the first rotation speed.

Because the control device prohibits the execution of the pre-gear synchronizing control immediately after the engine restart failure occurs under the engine self-restart control, the control device can avoid the gear engagement between the pinion gear and the ring gear from being executed under a bad gear synchronizing condition in while these gears are not synchronized in rotation speed with each other at the time when the rotation speed of the internal combustion engine is increased within the first rotation speed range after the rotation speed of the internal combustion engine is decreased within the second rotation speed range due to the engine restart failure caused by the engine self-restart control. The control device drives the pre-gear meshing control means to execute the pre-gear meshing control in order to perform the engine restart at the time when the rotation speed of the internal combustion engine is decreased to the threshold value which is less than the first rotation speed. It is thereby possible for the control device to smoothly mesh the pinion gear with the ring gear after the engine restart failure occurs.

As described above, even if an engine restart failure occurs under the engine self-restart control, it is possible for the control device to smoothly mesh the pinion gear with the ring gear after the engine restart failure occurs. This makes it possible to avoid abrasion of the pinion gear and the ring gear from occurring, and the pinion gear and the ring gear from being damaged.

In the control device according to the second aspect of the present invention, the predetermined threshold value is higher than the second rotation speed. Still further, the predetermined threshold value is equal to the second rotation speed.

According to the control device of the second aspect of the present invention, it is possible to execute the engine restart control as fast as possible after the engine restart failure occurs. Still further, it is possible for the pre-gear meshing control means in the control device to execute the engine restart control under the pre-gear meshing control with high accuracy at the time when the engine rotation speed is decreased within the third rotation speed range after the engine restart failure.

The control device according to the third aspect of the present invention has the following features when the engine restart request is issued while the rotation speed of the internal combustion engine is dropping due to the automatic engine stop.

That is, in the third aspect of the present invention, as previously described, the control device further has an engine self-restart control means, a pre-gear synchronizing control means, and a pre-gear meshing control means. The engine self-restart control means executes a engine self-restart control of restarting the internal combustion engine by restarting a fuel injection without performing a cranking of the starter when the engine restart request is issued while a current rotation speed of the internal combustion engine is within a first rotation speed range which is higher than a first rotation speed and the rotation speed of the internal combustion engine is dropping due to the automatic engine stop. The pre-gear synchronizing control means executes a pre-gear synchronizing control of restarting the internal combustion engine by performing the cranking by the starter after driving the starter motor to synchronizing a rotation speed of the pinion gear with a rotation speed of the ring gear, and then driving the actuator to mesh the pinion gear with the ring gear when the engine restart request is issued while the current rotation speed of the internal combustion engine is within a second rotation speed range which is not more than the first rotation speed and higher than a second rotation speed and while the rotation speed of the internal combustion engine is dropping due to the automatic engine stop. The pre-gear meshing control means executes a pre-gear meshing control of restarting the internal combustion engine by performing the cranking of the starter in which the pre-gear meshing control means drives the starter motor to rotate the pinion gear after or during a gear meshing between the pinion gear and the ring gear when the engine restart request is issued while the current rotation speed of the internal combustion engine is within a third rotation speed range which is not more than the first rotation speed and while the rotation speed of the internal combustion engine is dropping due to the automatic engine stop.

The control device according to the third aspect of the present invention further has the detection means which detects a failure of the engine restart control performed by one control means in the engine self-restart control means, the pre-gear synchronizing control means, and the pre-gear meshing control means.

When the detection means detects the occurrence of an engine restart failure by the engine restart control, the control device prohibits the execution of the engine restart control performed by the control means which causes the engine restart failure while the time period counted from the time when the detection means detects the occurrence of the engine restart failure to the time when the rotation speed of the internal combustion engine reaches zero.

Accordingly, the control device according to the third aspect of the present invention prohibits the execution of the engine restart control by one of the engine self-restart control, the pre-gear synchronizing control, and the pre-gear meshing control while the rotation speed of the internal combustion engine is dropping immediately after the engine restart failure, during which it is difficult in general for the control device to detect the rotation speed of the internal combustion engine and the rotation speed of the starter motor with high accuracy during the above time period immediately after the engine restart failure. It is therefore possible to perform the smooth gear engagement between the pinion gear and the ring gear, namely, to smoothly mesh the pinion gear with the ring gear when the engine restart control is executed again after the engine restart failure occurs. This makes it possible to avoid abrasion of the pinion gear and the ring gear from occurring and also avoid the pinion gear and the ring gear from being damaged.

Still further, it is also possible for the control device according to the third aspect of the present invention to be comprised of the detection means and the two control means such as the engine self-restart control means and the pre-gear meshing control means. The detection means detects the occurrence of a failure of the engine restart control performed by one of the engine self-restart control means, and the pre-gear meshing control means. In particular, when the detection means detects the occurrence of the engine restart failure caused by the engine restart control, the control device prohibits the execution of the engine restart control performed by each of the engine self-restart control means and the pre-gear meshing control means while the time period counted from the time when the detection means detects the engine restart failure to the time when the rotation speed of the internal combustion engine reaches zero.

Accordingly, the control device according to the third aspect of the present invention prohibits the execution of the engine restart control by the engine self-restart control and the pre-gear meshing control while the rotation speed of the internal combustion engine is dropping immediately after the engine restart failure caused by the engine self-restart control and the pre-gear meshing control. It is generally difficult for the control device to detect the rotation speed of the internal combustion engine and the rotation speed of the starter motor with high accuracy during the above time period immediately after the engine restart failure. This control makes it therefore possible to avoid the smooth gear engagement between the pinion gear and the ring gear, that is, to smoothly mesh the pinion gear with the ring gear when the engine restart control is executed again after the engine restart failure. Further, this makes it possible to avoid abrasion of the pinion gear and the ring gear from occurring and also avoid the pinion gear and the ring gear from being damaged.

Still further, it is also possible for the control device according to the third aspect of the present invention to be comprised of the detection means and the two control means such as the pre-gear synchronizing control means and the pre-gear meshing control means. This detection means detects the occurrence of a failure of the engine restart control performed by one control means in the pre-gear synchronizing control means and the pre-gear meshing control means. In particular, the detection means detects the occurrence of the engine restart failure caused by the engine restart control, the control device prohibits the engine restart control performed by the pre-gear synchronizing control means and the pre-gear meshing control means while the time period counted from the time when the detection means detects the engine restart failure to the time when the rotation speed of the internal combustion engine reaches zero.

Accordingly, the control device according to the third aspect of the present invention prohibits the execution of the engine restart control by the pre-gear synchronizing control means and the pre-gear meshing control while the rotation speed of the internal combustion engine is dropping immediately after the engine restart failure caused by one of the pre-gear synchronizing control means and the pre-gear meshing control. It is generally difficult for the control device to detect the rotation speed of the internal combustion engine and the rotation speed of the starter motor with high accuracy during the above time period immediately after the engine restart failure. It is therefore possible to avoid the smooth gear engagement between the pinion gear and the ring gear, that is, to smoothly mesh the pinion gear with the ring gear when the engine restart control is executed again after the engine restart failure. This makes it possible to avoid abrasion of the pinion gear and the ring gear from occurring and also avoid the pinion gear and the ring gear from being damaged.

Still further, it is also possible for the control device according to the third aspect of the present invention to be comprised of detection means and the pre-gear meshing control means only. The detection means detects the occurrence of a failure of the engine restart control caused by the pre-gear meshing control means. In particular, when the detection means detects the engine restart failure caused by the engine restart control, the control device prohibits the engine restart control performed by the pre-gear meshing control means while the time period counted from the time when the detection means detects the engine restart failure to the time when the rotation speed of the internal combustion engine reaches zero.

Accordingly, the control device according to the third aspect of the present invention prohibits the execution of the engine restart control by the pre-gear meshing control while the rotation speed of the internal combustion engine is dropping immediately after the engine restart failure caused by the pre-gear meshing control. It is generally difficult for the control device to detect the rotation speed of the internal combustion engine and the rotation speed of the starter motor with high accuracy during the above time period immediately after the engine restart failure. It is therefore possible to avoid the smooth gear engagement between the pinion gear and the ring gear and to smoothly mesh the pinion gear with the ring gear when the engine restart control is executed again after the engine restart failure. This makes it possible to avoid abrasion of the pinion gear and the ring gear from occurring and also avoid the pinion gear and the ring gear from being damaged.

Still further, the control device according to the third aspect of the present invention retries the engine restart after the rotation speed of the internal combustion engine reaches zero when the detection means detects the occurrence of the engine restart failure. Further, it is also possible for the control device according to the third aspect of the present invention to retry the engine restart when the driver of a vehicle performs the engine restart operation when the detection means detects the occurrence of the engine restart failure.

That is, because the control device automatically executes the engine restart after the rotation speed of the internal combustion engine is decreased and reaches zero when the engine restart failure occurs, it is possible to correctly execute the engine restart control again even if a failure of the engine restart control occurs once. In this case, because a time period counted from the engine restart failure to the time when the engine restart is executed again is long, this sometimes gives uncomfortable driving to the driver of a vehicle. In order to avoid this uncomfortable driving, it is also possible for the control device according to the third aspect of the present invention not to execute the engine restart control unless the driver of the vehicle performs the engine start operation. This makes it possible to provide comfortable driving to the driver of the vehicle.

By the way, the control device according to the third aspect of the present invention and the modifications thereof, as previously described, executes the engine restart control when the engine restart failure occurs while the rotation speed of the internal combustion engine is dropping due to the automatic engine stop. The present invention is not limited by this. For example, the control device according to the third aspect of the present invention and the modifications thereof executes the engine restart control when a failure of the usual engine restart occurs. That is, the control device according to the fourth aspect of the present invention can prohibit the engine restart control including the usual engine restart control immediately after the occurrence of usual engine restart failure while the rotation speed of the internal combustion engine is dropping due to the automatic engine stop, during which, it is generally difficult to detect the rotation speed of the internal combustion engine and the rotation speed of the starter motor with high accuracy. This engine restart control makes therefore it possible to smoothly perform the gear engagement between the pinion gear and the ring gear when the engine restart is tried again after the engine restart failure. This also makes it possible to avoid remarkable wear of the pinion gear and the ring gear and these gears and from being greatly damaged.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A control device for controlling automatic engine stop and start comprising a starter, a detection means, and at least two control means, wherein the starter is comprised of a starter motor for rotating a pinion gear and an actuator capable of meshing the pinion gear with a ring gear which is fixed to a crank shaft of an internal combustion engine, and the starter independently drives the starter motor and the actuator, respectively, and the control device is capable of stopping the internal combustion engine when an automatic engine stop request is issued, and restarting the internal combustion engine when an engine restart request is issued;

at least the two control means are selected from an engine self-restart control means, a pre-gear synchronizing control means, and a pre-gear meshing control means, the engine self-restart control means executes an engine self-restart control of restarting the internal combustion engine by restarting a fuel injection without performing a cranking of the starter when the engine restart request is issued while a current rotation speed of the internal combustion engine is within a first rotation speed range which is higher than a first rotation speed and the rotation speed of the internal combustion engine is dropping due to the automatic engine stop, the pre-gear synchronizing control means executes a pre-gear synchronizing control of restarting the internal combustion engine by performing the cranking by the starter after driving the starter motor to synchronize a rotation speed of the pinion gear with a rotation speed of the ring gear, and then driving the actuator to mesh the pinion gear with the ring gear when the engine restart request is issued while the current rotation speed of the internal combustion engine is within a second rotation speed range which is not more than the first rotation speed and higher than a second rotation speed and while the rotation speed of the internal combustion engine is dropping due to the automatic engine stop, the pre-gear meshing control means executes a pre-gear meshing control of restarting the internal combustion engine by performing the cranking of the starter in which the pre-gear meshing control means drives the starter motor to rotate the pinion gear after or during a gear meshing between the pinion gear and the ring gear when the engine restart request is issued while the current rotation speed of the internal combustion engine is within a third rotation speed range which is not more than the second rotation speed and while the rotation speed of the internal combustion engine is dropping due to the automatic engine stop, and the detection means detects a failure of the engine restart control performed by one control means in the engine self-restart control means, the pre-gear synchronizing control means, and the pre-gear meshing control means, and when the detection means detects the failure of the engine restart control, the control device instructs the control means of the engine restart failure to prohibit the execution of its engine restart control until a predetermined time period counted from the detection time of the engine restart failure is elapsed.

2. The control device for controlling automatic engine stop and start according to claim 1, wherein the control device has at least the engine self-restart control means and the pre-gear meshing control means, and the pre-gear meshing control means executes the pre-gear meshing control which restarts the internal combustion engine when the predetermined time period is elapsed after the detection means detects the failure of the engine restart control by the engine self-restart control means.

3. The control device for controlling automatic engine stop and start according to claim 2, wherein the control device has the engine self-restart control means, the pre-gear synchronizing control means, and the pre-gear meshing control means, and the control device drives the pre-gear meshing control means to prohibit the execution of the pre-gear meshing control which restarts the internal combustion engine until the predetermined time period is elapsed after the detection means detects the failure of the engine restart control by the engine self-restart control means.

4. The control device for controlling automatic engine stop and start according to claim 1, wherein the more the temperature of the internal combustion engine decreases, the more the predetermined time period is decreased.

5. A control device for controlling automatic engine stop and start comprising a starter, a detection means, and at least two selected from a engine self-restart control means, a pre-gear synchronizing control means, a pre-gear meshing control means, wherein the starter comprised of a starter motor for rotating a pinion gear and an actuator capable of meshing the pinion gear with a ring gear which is fixed to a crank shaft of an internal combustion engine, and the starter independently drives the starter motor and the actuator, respectively, and the control device is capable of stopping the internal combustion engine when an automatic engine stop request is issued, and restarting the internal combustion engine when an engine restart request is issued, the engine self-restart control means executes an engine self-restart control of restarting the internal combustion engine by restarting a fuel injection without performing a cranking of the starter when the engine restart request is issued while a current rotation speed of the internal combustion engine is within a first rotation speed range which is higher than a first rotation speed and the rotation speed of the internal combustion engine is dropping due to the automatic engine stop, the pre-gear synchronizing control means executes a pre-gear synchronizing control of restarting the internal combustion engine by performing the cranking by the starter after driving the starter motor to synchronizing a rotation speed of the pinion gear with a rotation speed of the ring gear, and then driving the actuator to mesh the pinion gear with the ring gear when the engine restart request is issued while the current rotation speed of the internal combustion engine is within a second rotation speed range which is not more than the first rotation speed and higher than a second rotation speed and while the rotation speed of the internal combustion engine is dropping due to the automatic engine stop, the pre-gear meshing control means executes a pre-gear meshing control of restarting the internal combustion engine by performing the cranking of the starter in which the pre-gear meshing control means drives the starter motor to rotate the pinion gear after or during a gear meshing between the pinion gear and the ring gear when the engine restart request is issued while the current rotation speed of the internal combustion engine is within a third rotation speed range which is not more than the second rotation speed and while the rotation speed of the internal combustion engine is dropping due to the automatic engine stop, and the detection means detects a failure of the engine restart control performed by one of the engine self-restart control means, the pre-gear synchronizing control means, and the pre-gear meshing control means, and when the detection means detects the engine restart failure, the control device instructs the control means which causes the engine restart failure to prohibit the execution of its engine restart control until the rotation speed of the internal combustion engine is decreased to less than a predetermined threshold value after the detection time of the engine restart failure.

6. The control device for controlling automatic engine stop and start according to claim 1, wherein the control device has at least the engine self-restart control means and the pre-gear meshing control means, and the pre-gear meshing control means executes the pre-gear meshing control of restarting the internal combustion engine when the rotation speed of the internal combustion engine is decreased to the predetermined threshold value after the detection means detects the engine restart failure during the engine restart control executed by the engine self-restart control means.

7. The control device for controlling automatic engine stop and start according to claim 6, wherein the control device has the engine self-restart control means, the pre-gear synchronizing control means, and the pre-gear meshing control means, and the control device drives the pre-gear synchronizing control means to prohibit the execution of the pre-gear synchronizing control of restarting the internal combustion engine until the rotation speed of the internal combustion engine is decreased to less than the predetermined threshold value which is less than the first rotation speed.

8. The control device for controlling automatic engine stop and start according to claim 7, wherein the predetermined threshold value is higher than the second rotation speed.

9. The control device for controlling automatic engine stop and start according to claim 7, wherein the predetermined threshold value is equal to the second rotation speed.

10. A control device for controlling automatic engine stop and start comprising a starter and a detection means, wherein the starter is comprised of a starter motor for rotating a pinion gear and an actuator capable of meshing the pinion gear with a ring gear which is fixed to a crank shaft of an internal combustion engine, and the starter independently drives the starter motor and the actuator, respectively, and the control device is capable of stopping the internal combustion engine when an automatic engine stop request is issued, and restarts the internal combustion engine when an engine restart request is issued, the detection means detects an engine restart failure, when the detection means detects the engine restart failure, the control device prohibits the execution of the engine restart of the internal combustion engine while a time period counted from the time when the detection means detects the engine restart failure to the time when the rotation speed of the internal combustion engine reaches zero.

11. The control device for controlling automatic engine stop and start according to claim 10, further comprising:

an engine self-restart control means executes an engine self-restart control of restarting the internal combustion engine by restarting a fuel injection without performing a cranking of the starter when the engine restart request is issued while a current rotation speed of the internal combustion engine is within a first rotation speed range which is higher than a first rotation speed and the rotation speed of the internal combustion engine is dropping due to the automatic engine stop;

a pre-gear synchronizing control means executes a pre-gear synchronizing control of restarting the internal combustion engine by performing the cranking by the starter after driving the starter motor to synchronizing a rotation speed of the pinion gear with a rotation speed of the ring gear, and then driving the actuator to mesh the pinion gear with the ring gear when the engine restart request is issued while the current rotation speed of the internal combustion engine is within a second rotation speed range which is not more than the first rotation speed and higher than a second rotation speed and while the rotation speed of the internal combustion engine is dropping due to the automatic engine stop; and a pre-gear meshing control means executes a pre-gear meshing control of restarting the internal combustion engine by performing the cranking of the starter in which the pre-gear meshing control means drives the starter motor to rotate the pinion gear after or during a gear meshing between the pinion gear and the ring gear when the engine restart request is issued while the current rotation speed of the internal combustion engine is within a third rotation speed range which is not more than the first rotation speed and while the rotation speed of the internal combustion engine is dropping due to the automatic engine stop, wherein the detection means detects a failure of the engine restart control performed by one of the engine self-restart control means, the pre-gear synchronizing control means, and the pre-gear meshing control means, and when the detection means detects the engine restart failure during the engine restart control, the control device prohibits the execution of the engine restart control performed by each of the engine self-restart control means, the pre-gear synchronizing control means, and the pre-gear meshing control means while the time period counted from the time when the detection means detects the engine restart failure to the time when the rotation speed of the internal combustion engine reaches zero.

12. The control device for controlling automatic engine stop and start according to claim 10, further comprising:

an engine self-restart control means executes an engine self-restart control of restarting the internal combustion engine by restarting a fuel injection without performing a cranking of the starter when the engine restart request is issued while a current rotation speed of the internal combustion engine is within a first rotation speed range which is higher than a first rotation speed and the rotation speed of the internal combustion engine is dropping due to the automatic engine stop; and a pre-gear meshing control means executes a pre-gear meshing control of restarting the internal combustion engine by performing the cranking of the starter in which the pre-gear meshing control means drives the starter motor to rotate the pinion gear after or during a gear meshing between the pinion gear and the ring gear when the engine restart request is issued while the rotation speed of the internal combustion engine is within a third rotation speed range which is not more than the first rotation speed and while the rotation speed of the internal combustion engine is dropping due to the automatic engine stop, wherein the detection means detects a failure of the engine restart control performed by one of the engine self-restart control means, and the pre-gear meshing control means, and when the detection means detects the engine restart failure during the engine restart control, the control device prohibits the execution of the engine restart control performed by each of the engine self-restart control means, and the pre-gear meshing control means while the time period counted from the time when the detection means detects the engine restart failure to the time when the rotation speed of the internal combustion engine reaches zero.

13. The control device for controlling automatic engine stop and start according to claim 10, further comprising:

a pre-gear synchronizing control means executes a pre-gear synchronizing control of restarting the internal combustion engine by performing the cranking by the starter after driving the starter motor to synchronizing a rotation speed of the pinion gear with a rotation speed of the ring gear, and then driving the actuator to mesh the pinion gear with the ring gear when the engine restart request is issued while the current rotation speed of the internal combustion engine is within a second rotation speed range which is more than a second rotation speed and while the rotation speed of the internal combustion engine is dropping due to the automatic engine stop; and a pre-gear meshing control means executes a pre-gear meshing control of restarting the internal combustion engine by performing the cranking of the starter in which the pre-gear meshing control means drives the starter motor to rotate the pinion gear after or during a gear meshing between the pinion gear and the ring gear when the engine restart request is issued while the current rotation speed of the internal combustion engine is within a third rotation speed range which is not more than the second rotation speed and while the rotation speed of the internal combustion engine is dropping due to the automatic engine stop, wherein the detection means detects a failure of the engine restart control performed by one of the pre-gear synchronizing control means and the pre-gear meshing control means, and when the detection means detects the engine restart failure by the engine restart control, the control device prohibits the execution of the engine restart control performed by each of the pre-gear synchronizing control means and the pre-gear meshing control means while the time period counted from the time when the detection means detects the engine restart failure to the time when the rotation speed of the internal combustion engine reaches zero.

14. The control device for controlling automatic engine stop and start according to claim 10, further comprising:

a pre-gear meshing control means executes a pre-gear meshing control of restarting the internal combustion engine by performing the cranking of the starter in which the pre-gear meshing control means drives the starter motor to rotate the pinion gear after or during a gear meshing between the pinion gear and the ring gear when the engine restart request is issued while the current rotation speed of the internal combustion engine is within a third rotation speed range and while the rotation speed of the internal combustion engine is dropping due to the automatic engine stop, wherein the detection means detects a failure of the engine restart control performed by the pre-gear meshing control means, and when the detection means detects the engine restart failure by the engine restart control, the control device prohibits the execution of the engine restart control performed by the pre-gear meshing control means while the time period counted from the time when the detection means detects the engine restart failure to the time when the rotation speed of the internal combustion engine reaches zero.

15. The control device for controlling automatic engine stop and start according to claim 10, wherein the control device retries the engine restart when the rotation speed of the internal combustion engine reaches zero after the detection of the engine restart failure by the detection means.

16. The control device for controlling automatic engine stop and start according to claim 10, wherein the control device retries the engine restart when the driver of a vehicle performs the engine restart operation after the detection of the engine restart failure by the detection means 17. A control device for controlling automatic engine stop and start comprising a starter, a pre-set control means, and a detection means, wherein the starter comprises a starter motor for rotating a pinion gear and an actuator capable of meshing the pinion gear with a ring gear which is fixed to a crank shaft of an internal combustion engine, and the starter independently driving the starter motor and the actuator, respectively, and the control device is capable of stopping the internal combustion engine when an automatic engine stop request is issued, and restarts the internal combustion engine when an engine restart request is issued, the pre-set control means which executes a pre-set control which drives the electromagnetic actuator to mesh the pinion gear with the ring gear when the rotation speed of the internal combustion engine is decreased to a predetermined value which is close to zero before the engine restart request is issued while the rotation speed of the internal combustion engine is dropping due to the automatic engine stop, and the detection means detects a failure of the gear engagement between the pinion gear and the ring gear by the preset control, wherein when the detection means detects the engine restart failure, the control means drives the pre-set control means to execute the pre-set control during a time period counted form the detection time engine restart failure to the time when the rotation speed of the internal combustion engine reaches zero.

\* \* \* \* \*